(12) United States Patent
Charles

(10) Patent No.: US 6,449,103 B1
(45) Date of Patent: Sep. 10, 2002

(54) SOLID CATADIOPTRIC OMNIDIRECTIONAL OPTICAL SYSTEM HAVING CENTRAL COVERAGE MEANS WHICH IS ASSOCIATED WITH A CAMERA, PROJECTOR, MEDICAL INSTRUMENT, OR SIMILAR ARTICLE

(76) Inventor: Jeffrey R. Charles, 2454 E. Washington Blvd., Pasadena, CA (US) 91104

(*) Notice: Subject to any disclaimer, the term of this patent is extended or adjusted under 35 U.S.C. 154(b) by 0 days.

(21) Appl. No.: 09/060,653

(22) Filed: Apr. 15, 1998

Related U.S. Application Data

(60) Provisional application No. 60/043,701, filed on Apr. 16, 1997, and provisional application No. 60/055,876, filed on Aug. 15, 1997.

(51) Int. Cl.⁷ .............................................. G02B 13/06
(52) U.S. Cl. ..................... 359/725; 359/366; 359/729; 359/859
(58) Field of Search ................................ 359/364, 365, 359/366, 725, 859, 858, 729, 731

(56) References Cited

U.S. PATENT DOCUMENTS

| | | | |
|---|---|---|---|
| 2,638,033 A | 1/1953 | Ruchele et al. | |
| 3,229,576 A | 1/1966 | Rees | |
| 3,822,936 A | 7/1974 | Pinzone et al. | |
| 3,846,809 A | 11/1974 | Pinzone | |
| 4,012,126 A | 3/1977 | Rosendahl et al. | |
| 4,045,116 A | 8/1977 | La Russa | |
| 4,078,860 A | 3/1978 | Globus et al. | |
| 4,395,093 A | 7/1983 | Rosendahl et al. | |
| 4,484,801 A | 11/1984 | Cox | |
| 4,566,763 A | 1/1986 | Greguss | |
| D312,263 S | 11/1990 | Charles | |
| 5,115,266 A | 5/1992 | Troje | |
| 5,185,667 A | 2/1993 | Powell | |
| 5,384,588 A | 1/1995 | Martin et al. | |
| 5,473,474 A | * 12/1995 | Powell | .................... 359/725 |
| 5,631,778 A | 5/1997 | Powell | |
| 5,854,713 A | * 12/1998 | Kuroda et al. | .............. 359/850 |

OTHER PUBLICATIONS

Versacorp Omnidiectional (360°) and Other Wide Angle Optical Instrumentation Brochure; First Distributed at Siggraph Conference on Aug. 5, 1997, (Copy Enclosed).
Popular Science; Mar. 1998; Top of Page 32; Camera in the Round.
Arizona News—Sun; Feb. 7, 1998; p. B6; Camera Gives Buyers Virtual View.

* cited by examiner

*Primary Examiner*—Cassandra Spyrou
*Assistant Examiner*—Mark A. Robinson

(57) ABSTRACT

The present invention relates to an omnidirectional wide angle optical system, which is associated with a sensor, camera, projector, medical instrument, surveillance system, flight control system, robotic command and control or sensing system, home entertainment system, conference area, virtual reality suite, theater, or similar article. The optical system consists of an external refracting surface which may be strongly curved, an strongly curved internal primary reflector surface, a secondary reflector surface (in most embodiments), central wide angle refracting optics (in some embodiments), a modular or integral imaging and correcting lens system which may have aperture adjustment means, and mounting components. Optical surfaces associated with the formation of an omnidirectional virtual image are typically integrated into a single solid catadioptric optic in some embodiments, but central or peripheral wide angle refracting optics which may provide supplemental coverage are separate optical elements in other embodiments.

137 Claims, 37 Drawing Sheets

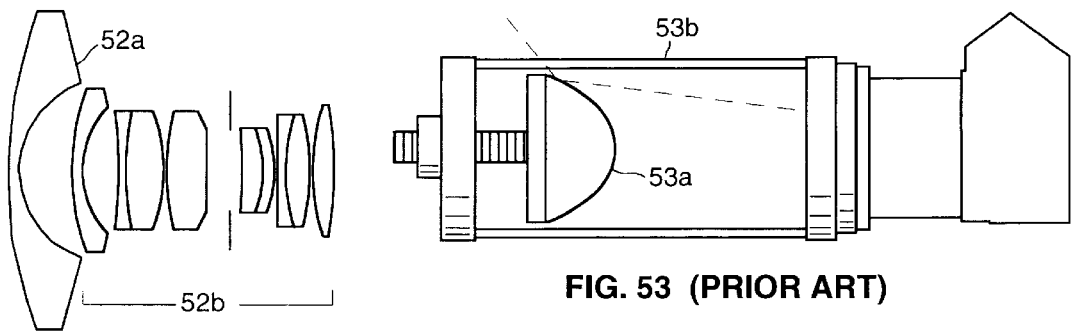
FIG. 52 (PRIOR ART)
FIG. 53 (PRIOR ART)
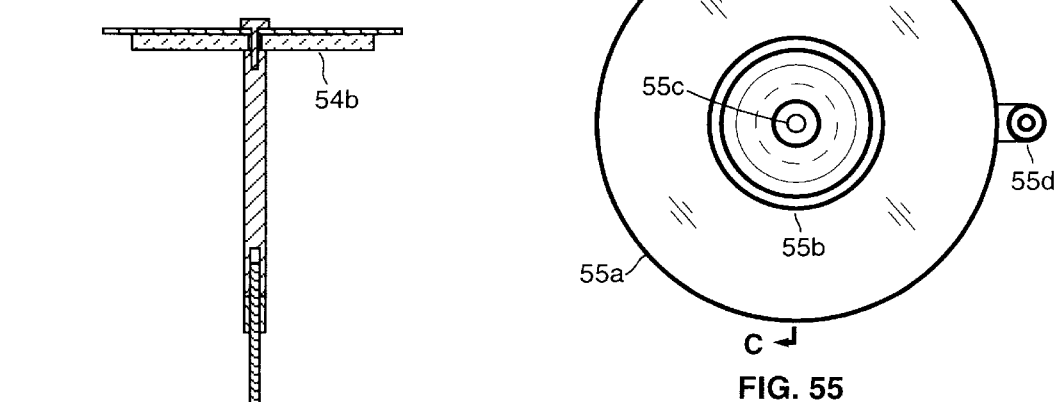
FIG. 54 (PRIOR ART)
FIG. 55
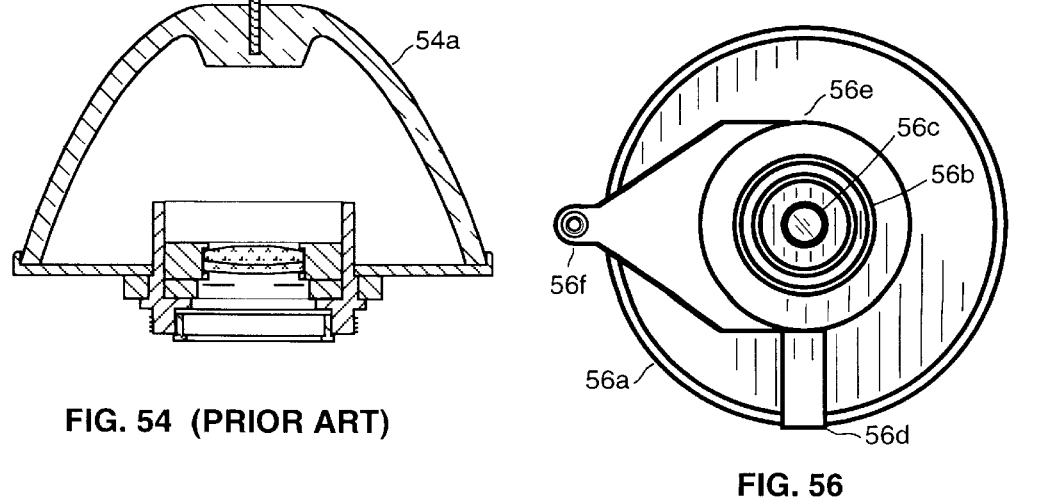
FIG. 56

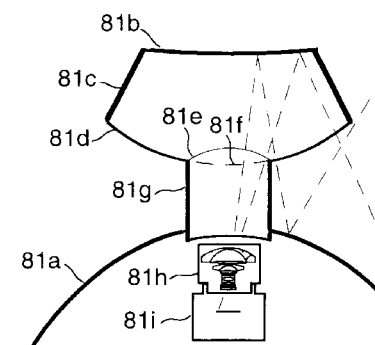
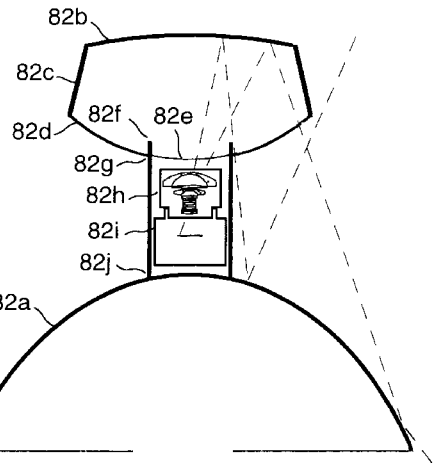
FIG. 81  FIG. 82
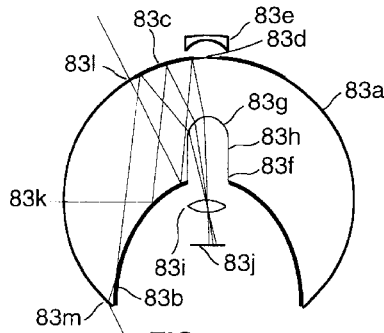
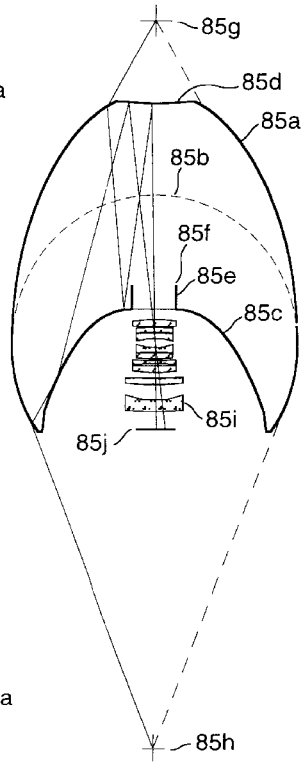
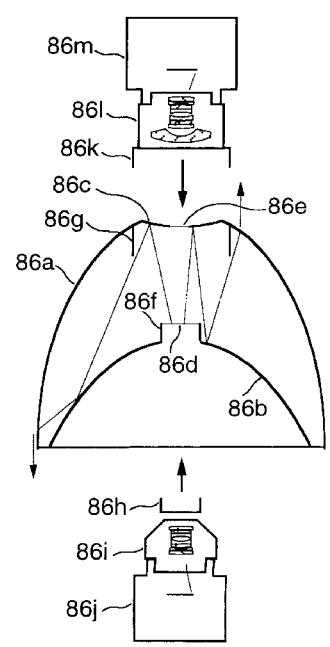
FIG. 83
FIG. 84  FIG. 85  FIG. 86

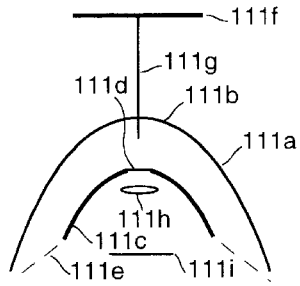
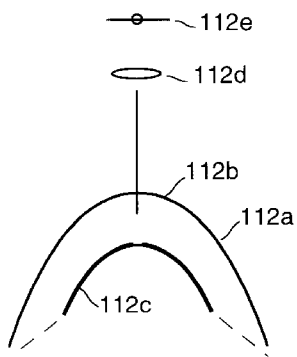
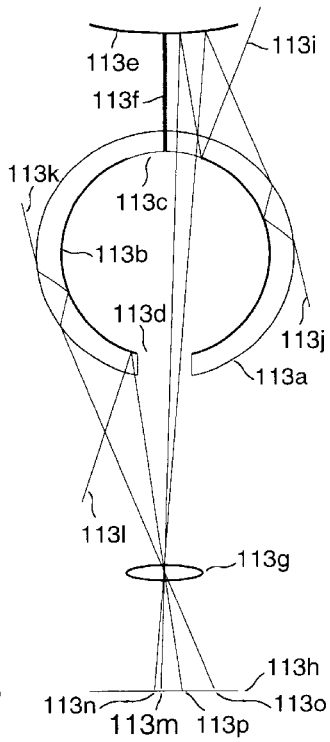
FIG. 111
FIG. 112
FIG. 113
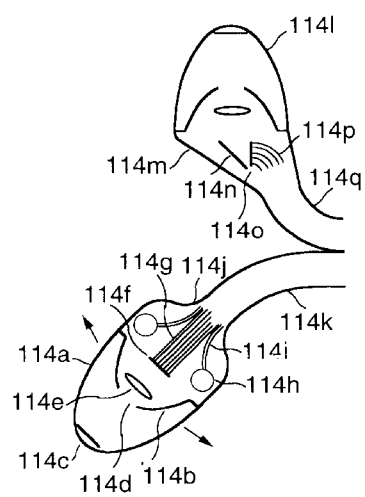
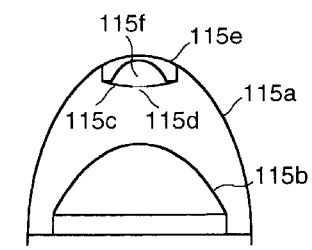
FIG. 114
FIG. 115
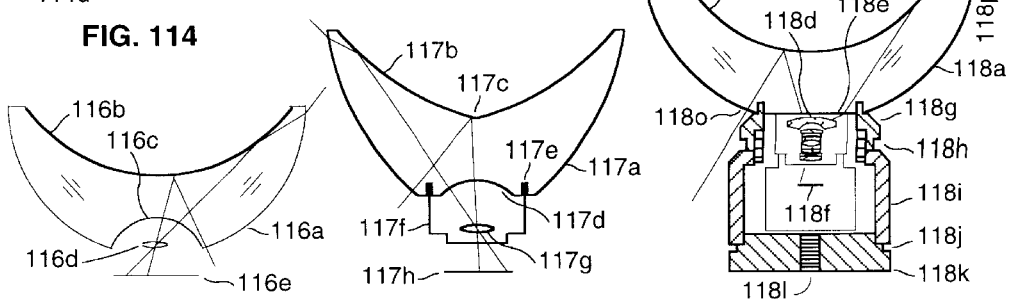
FIG. 116
FIG. 117
FIG. 118

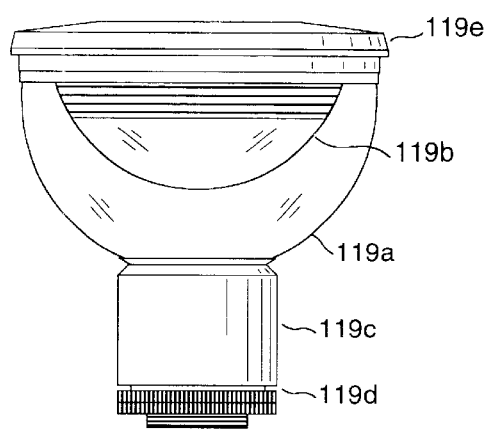
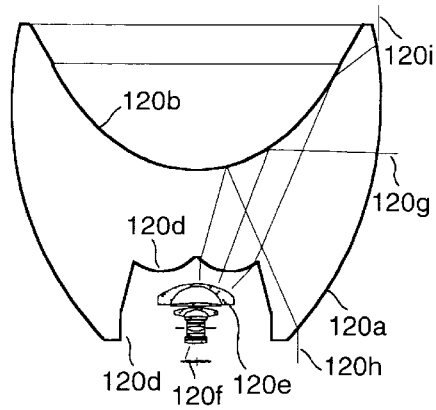
FIG. 119
FIG. 120
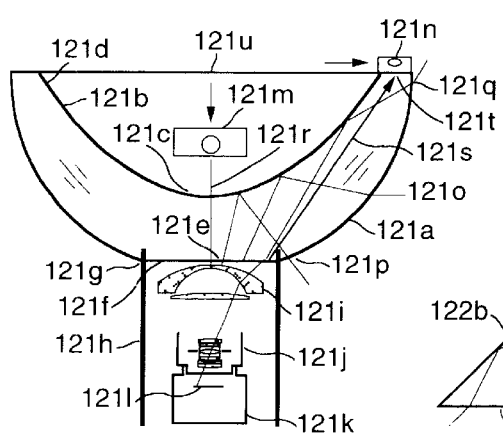
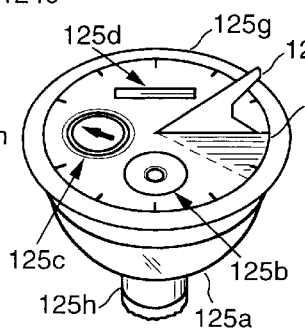
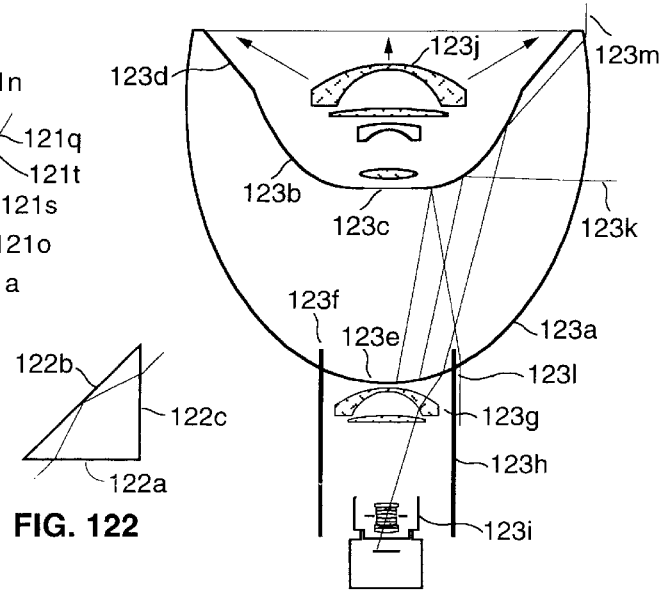
FIG. 121
FIG. 122
FIG. 123
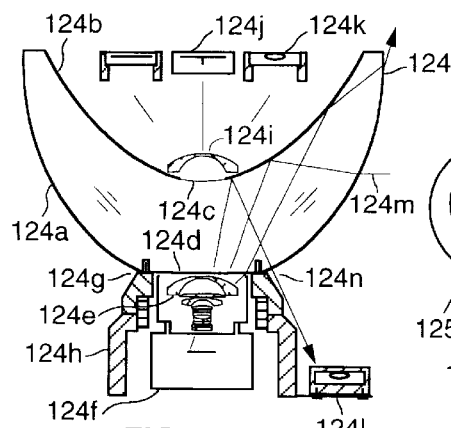
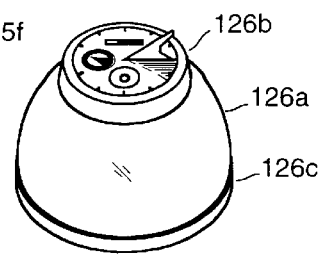
FIG. 124
FIG. 125
FIG. 126

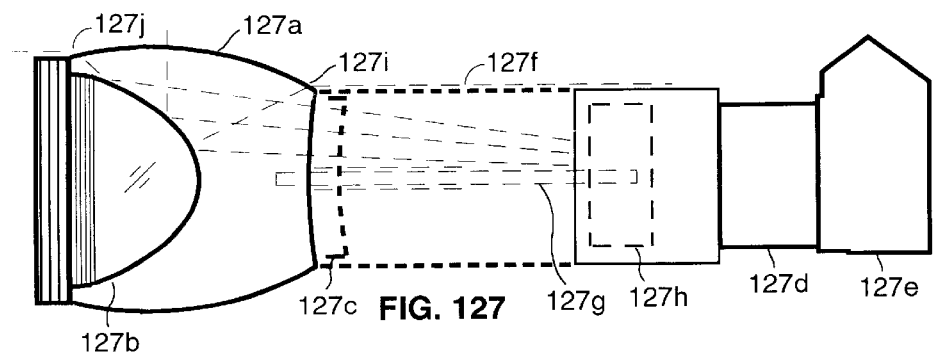
FIG. 127
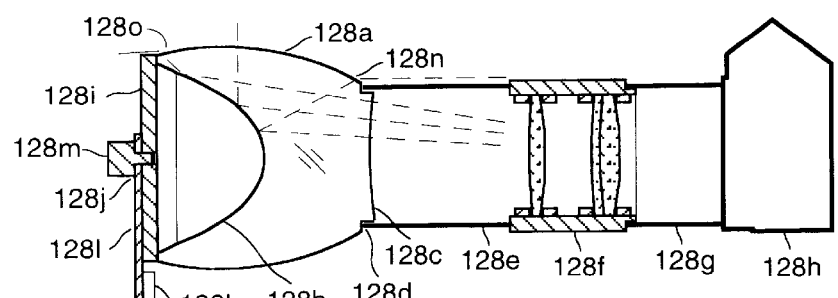
FIG. 128
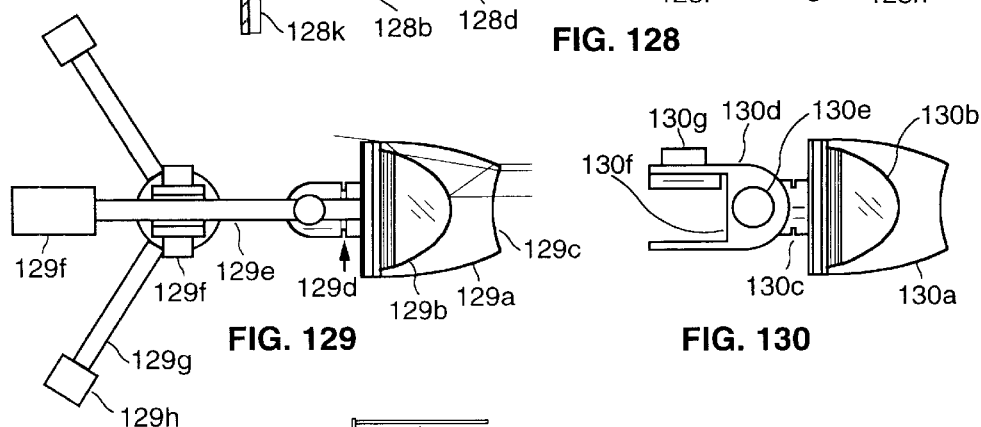
FIG. 129    FIG. 130
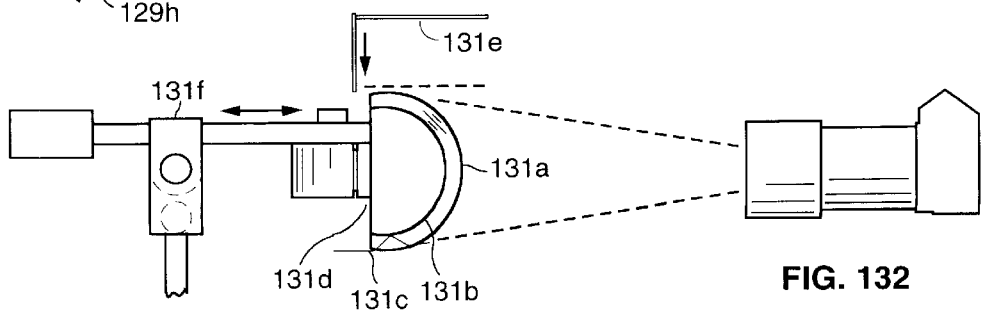
FIG. 132
FIG. 131

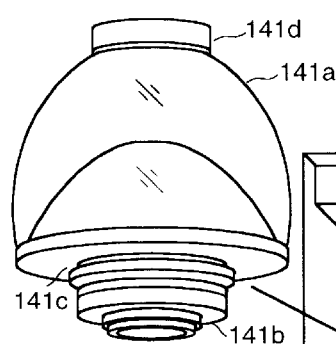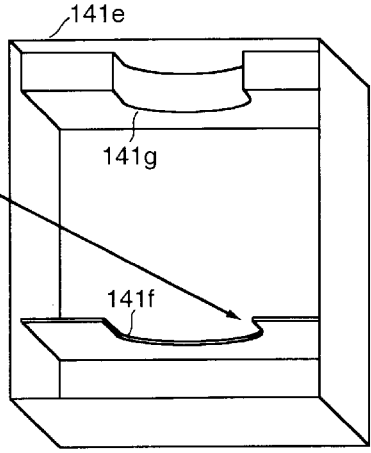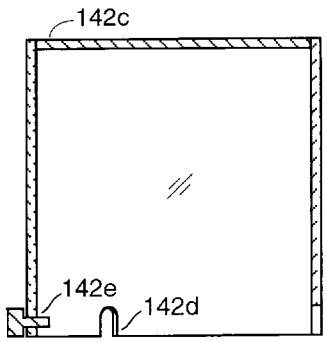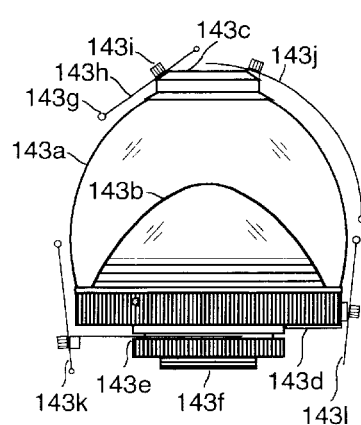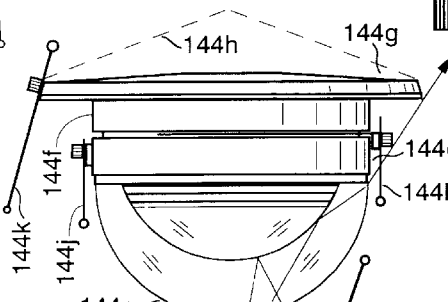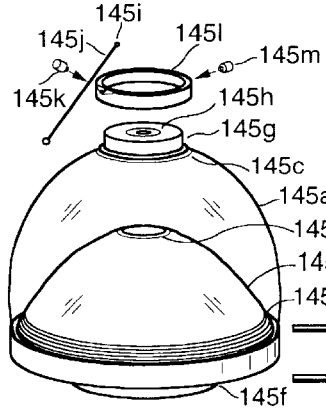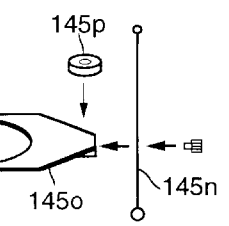

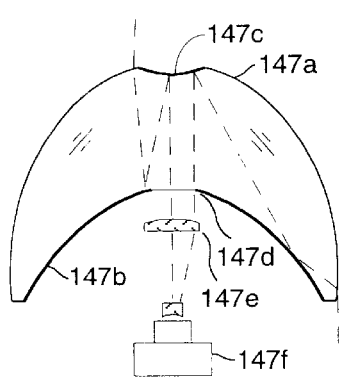
FIG. 147
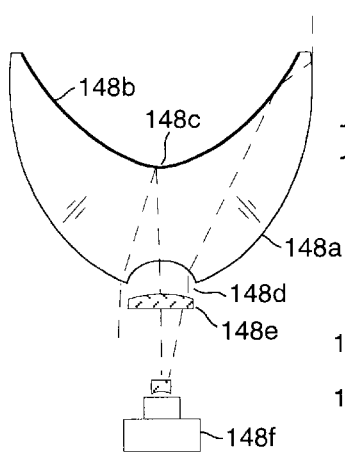
FIG. 148
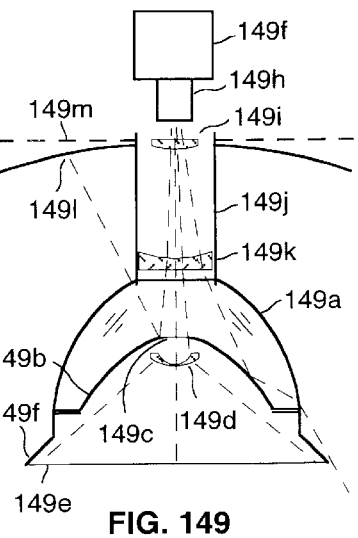
FIG. 149
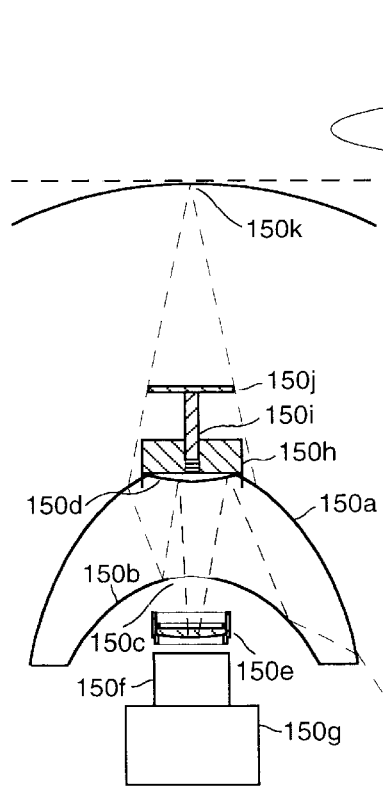
FIG. 150
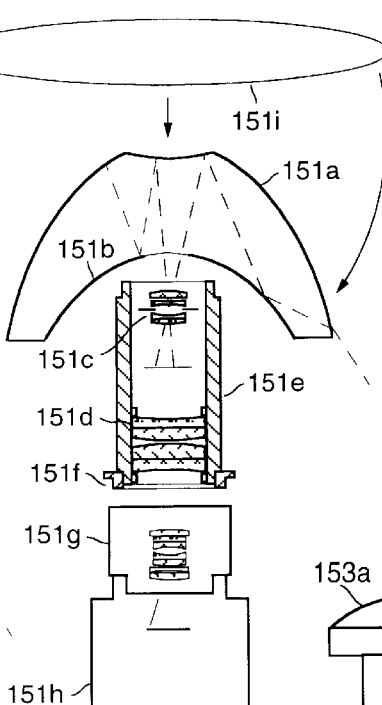
FIG. 151
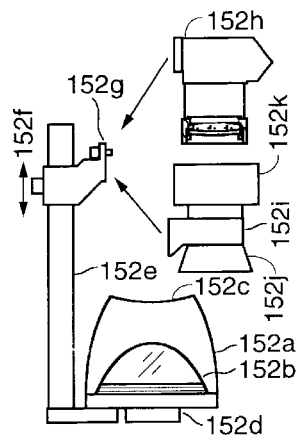
FIG. 152
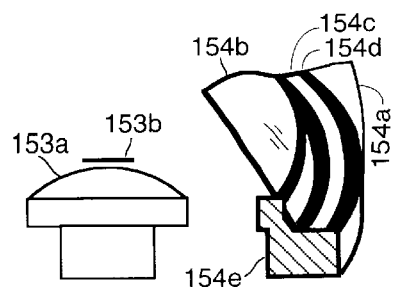
FIG. 153     FIG. 154

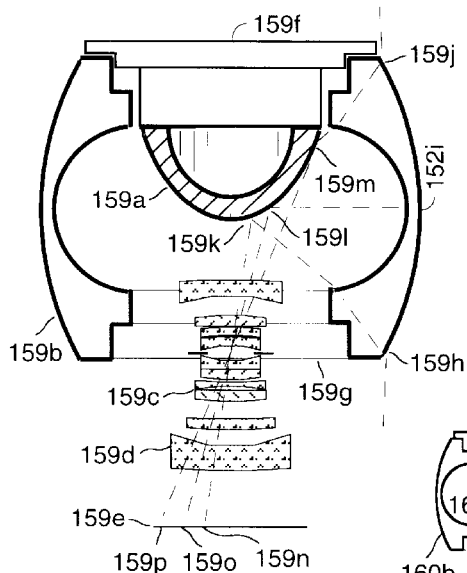
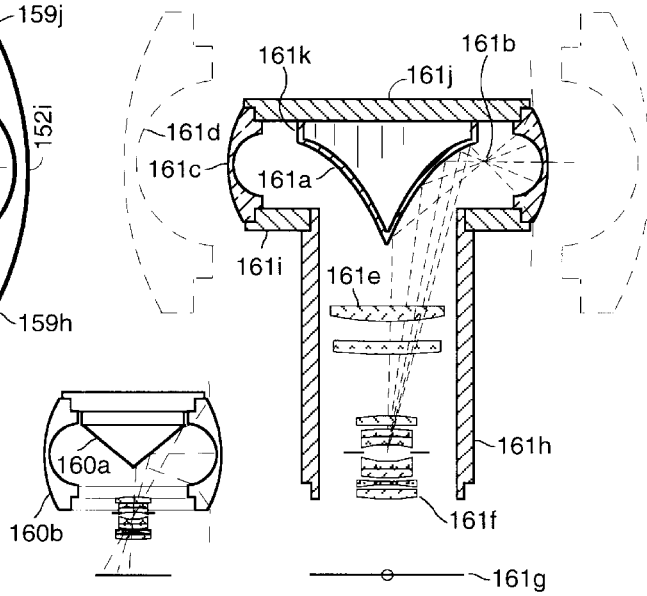
FIG. 159
FIG. 160
FIG. 161
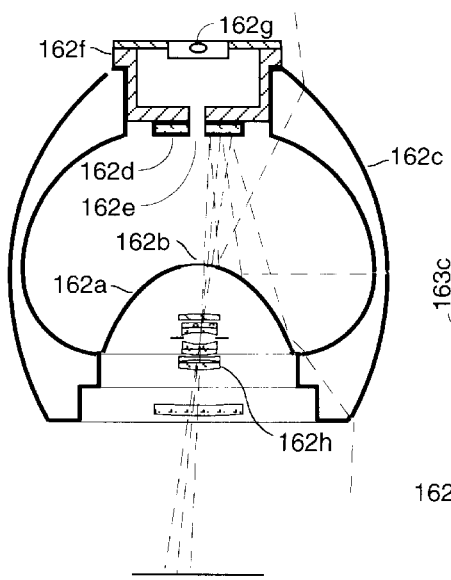
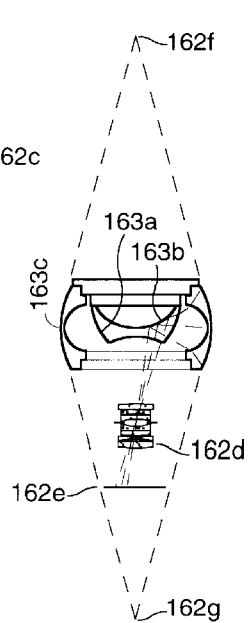
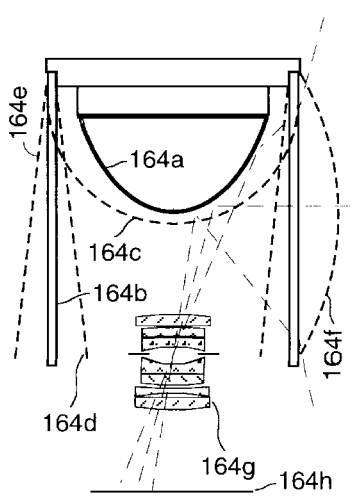
FIG. 162
FIG. 163
FIG. 164

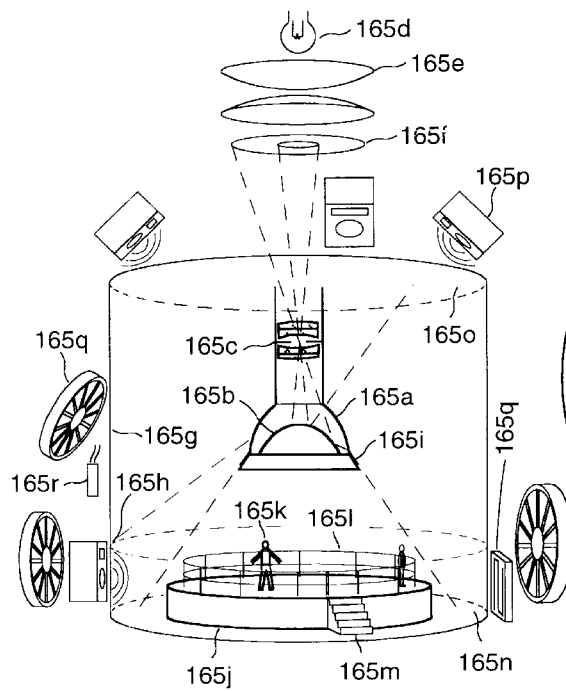
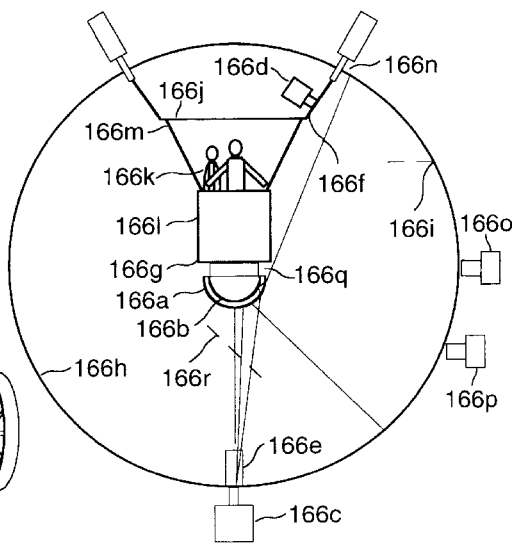
FIG. 165
FIG. 166
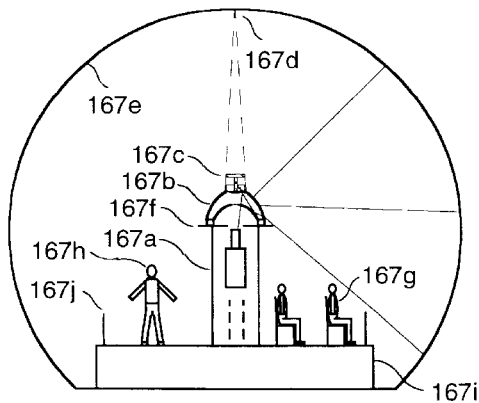
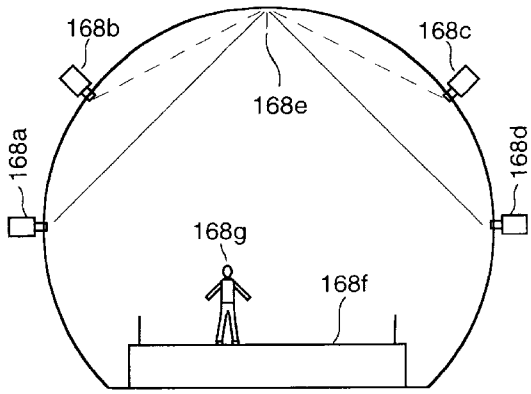
FIG. 167
FIG. 168

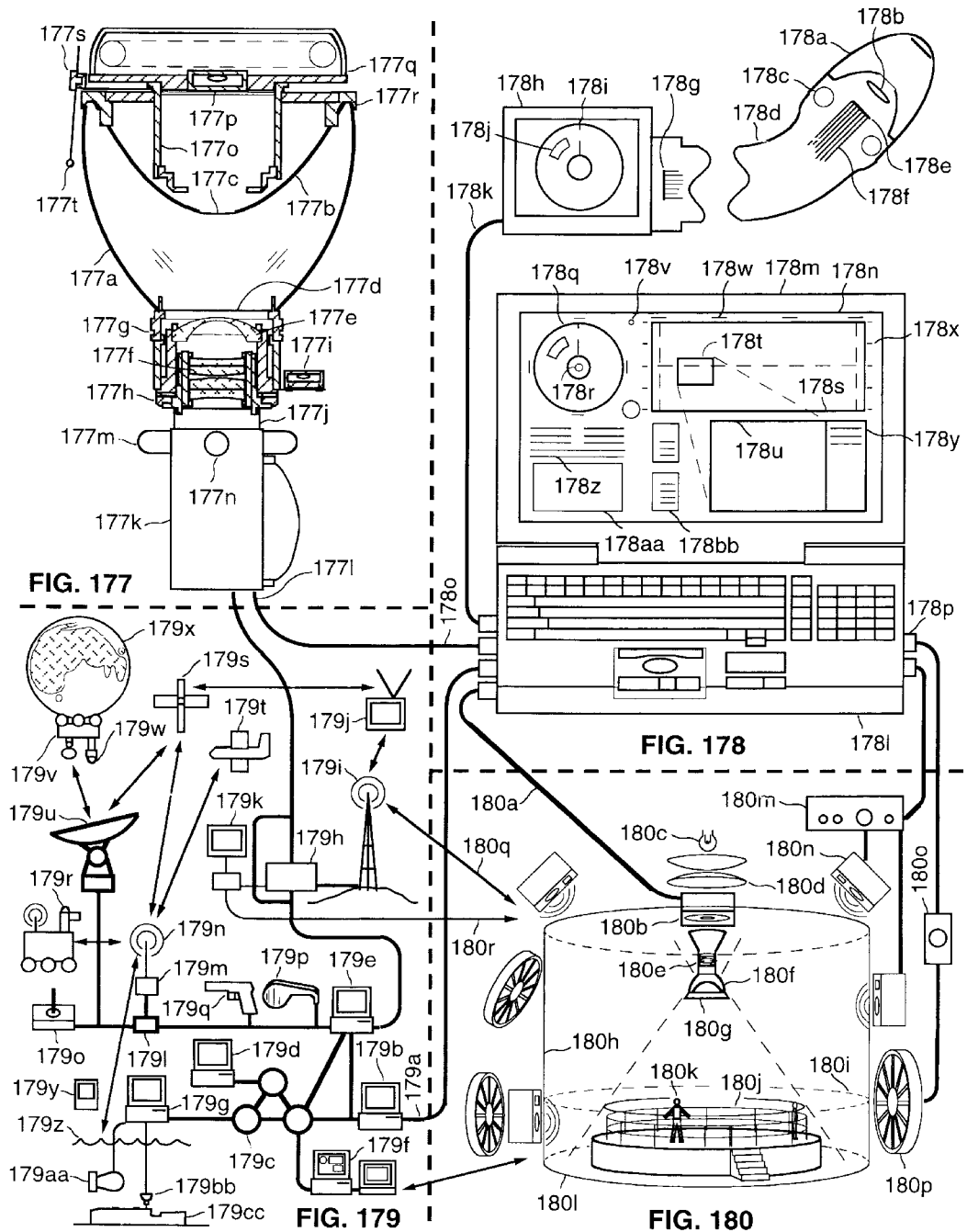

SOLID CATADIOPTRIC OMNIDIRECTIONAL OPTICAL SYSTEM HAVING CENTRAL COVERAGE MEANS WHICH IS ASSOCIATED WITH A CAMERA, PROJECTOR, MEDICAL INSTRUMENT, OR SIMILAR ARTICLE

PRIORITY

This application claims the benefit of U.S. provisional application Ser. No. 60/043,701, filed Apr. 16, 1997. This application also claims the benefit of U.S. provisional application Ser. No. 60/055,876, filed Aug. 15, 1997.

FIELD OF THE INVENTION

The present invention relates to a wide angle optical system providing means for the simultaneous and seamless imaging of the entire great circle perpendicular to its optical axis, said imaging also encompassing a wide angular area on either side of the plane of said great circle, whereby three dimensional space surrounding the invention is transformed into a to dimensional annular or circular image, or whereby a two dimensional annular or circular image is projected onto a surrounding three dimensional surface or into surrounding three dimensional media. The invention may be associated with or incorporated into a film camera, electronic camera, electronic sensor, projector, medical instrument, surveillance system, robotic system, flight command and control system, simulator, or similar article. The invention further relates to distribution of still or motion picture image elements by optical or electronic means, whereby the image or any subset thereof is converted to or from a two dimensional annular or circular polar coordinate image or a segment thereof and a horizontal format rectangular or Cartesian coordinate image or a subset thereof. Further, the present invention relates to the capture, integration, and display of images having three dimensional information and to other characteristics of real or artificially generated subject matter which may include but not necessarily be limited to temperature, sound, odor, and wind.

DESCRIPTION OF THE RELATED ART

Many means for imaging a great circle around a particular vantage point are presently known. Assembly of a plurality of discrete images to form a fixed or moving panoramic image is common in the prior art. Assembly of two opposing images, each alternately taken with a fisheye lens having at least 180 degrees of coverage to image the entire sphere around the camera in two separate images is also known in the prior art. Alternate use of a single hemispherical fisheye lens to capture images in opposing directions, where said fisheye lens is used in combination with an indexing bracket having means to index the 180 degree zone of the typically distorted entrance pupil of said fisheye lens in the same spatial position when recording each of the opposing still images is also known, and is embodied in the IPIX (R) imaging system. Simultaneous use of two opposing cameras, each having a fisheye lens of at least 180 degrees coverage is also known, and is embodied in Dan Slater's Spherecam. The Spherecam facilitates instantaneous imaging of the entire sphere around the camera pair in two separate images.

Presently known panoramic motion picture systems include the multiple projector Circle Vision 360 theater at Disneyland (R) and other systems having various degrees of coverage such as planetariums equipped with Omnimax (TM) projectors. The disadvantage of these systems is that each image has insufficient coverage to provide a 360 degree panorama having a wide vertical field of view in a single original image. Therefore, assembly of two or more images is required to provide a complete 360 degree panoramic image.

The use of a single refractive optical system in hyper hemispherical and panoramic imaging is common in the prior art. Systems utilizing refractive means include rotating panoramic cameras, fisheye lenses having more than 180 degrees of coverage, and J. M. Slater's whole sky lens, as shown on page 582 of the October 1932 issue of American Photographer. The system by Slater is difficult to manufacture with conventional optical fabrication equipment due to the deep internal curvature and delicate nature of its outer elements.

Reflectors are widely used in hyper hemispherical or panoramic imaging and projection. Systems of this type are shown in U.S. Pat. No. 5,631,778 (Panoramic fish-eye imaging system), U.S. Pat. No. 5,115,266 (Optical system for recording or projecting a panoramic image), U.S. Pat. No. 4,395,093 (Lens system for panoramic imagery), U.S. Pat. No. 4,012,126 (Optical system for 360 degree image transfer), U.S. Pat. No. 3,846,809 (Reflectors and mounts for panoramic projection), U.S. Pat. No. 3,822,936 (Optical system for panoramic projection), and Design Pat. No. 312,263 (Wide angle reflector attachment for a camera or similar article), and as embodied in disclosures of the Columbia University Omnicamera, the Be Here panoramic lens prototype, and the Versacorp Omnirama (TM) axial strut omniramic (TM) reflector. These systems have various advantages and disadvantages, with excessive size, vulnerability of optical surfaces, weak mechanical components, or complexity versus image quality being the most common disadvantages.

Optical reflector configurations include a simple reflector disposed directly in front of a camera lens and supported by a glass tube, as embodied in the Spiratone Birds Eye Attachment, a Cassegrain system having integral imaging optics as shown in U.S. Pat. No. 4,012,126 (Optical system for 360 degree image transfer) and FIGS. 6 through 12 of the applicant's Design Pat. No. 312,263 (Wide angle reflector attachment for a camera or similar article); or a system having three or more reflectors, as shown in U.S. Pat. No. 5,627,675 (Optics assembly for observing a panoramic scene).

Support means for a camera or reflective optical element include a tripod or multiple vane spider; support rods on opposing sides of an optical system, a transparent cylinder, as embodied in the Spiratone Birds Eye Attachment; a transparent hollow semi-sphere of the type shown in U.S. Pat. No. 4,395,093 (Lens system for panoramic imagery), U.S. Pat. No. 4,012,126 (Optical system for 360 degree image transfer), a transparent annular window combined with a short retaining fixture, as shown in U.S. Pat. No. 5,627,675 (Optics assembly for observing a panoramic scene), a transparent strut of the type shown in U.S. Pat. No. 5,115,266 (Optical system for recording or projecting a panoramic image), an axial strut of the types shown in U.S. Pat. No. 3,846,809 (Reflectors and mounts for panoramic projection) and Design Pat. No. 312,263 (Wide angle reflector attachment for a camera or similar article), or pages 74 to 80 of the 1988 Riverside Telescope Makers Conference proceedings and pages 68 and 69 of the April, 1987 issue of Astronomy magazine; and a solid optical substrate of the type used in the Peri-Apollar lens.

Systems having a tripod or other off-axis structures to provide support means for a camera or secondary reflector have a disadvantage in that part of the subject matter is obstructed by said off-axis support means. Some prior systems having axial strut supports have the disadvantage of a strut which either influences an excessively large central portion of the image or is long or thin enough to be subject to damage or excessive flexure or vibration. Prior systems having outer refractive surfaces or enclosures have the disadvantage of having a limited vertical field of view or being subject to flare from the additional exposed optical surface.

Reflective surfaces in the prior art consist of a metallic coating on an external reflector surface, as shown in U.S. Pat. No. 5,115,266 (Optical system for recording or projecting a panoramic image), U.S. Pat. No. 3,846,809 (Reflectors and mounts for panoramic projection), and Design Pat. No. 312,263 (Wide angle reflector attachment for a camera or similar article), and as shown on pages 79 and 80 of the proceedings of the 1988 Riverside Telescope Makers Conference; an internal optical surface having a reflective coating as shown in the JPL Radial Profilometry paper by Gregus and Matthys; and internal optical surfaces which utilize total internal reflection, as shown in U.S. Pat. No. 4,566,763 (Panoramic imaging block for three-dimensional space), and as embodied in the Peri-Apollar lens.

Reflector substrates include spun, machined, polished and conventionally plated metal surfaces as embodied in the applicant's larger reflector system which is shown on page 186 of the August 1986 issue of Sky and Telescope, page 68 of the April 1987 issue of Astronomy, and as shown and described on pages 74 through 80 of the proceedings of the 1988 Riverside Telescope Makers Conference; electrolytically replicated metal surfaces, including those having an outer coating of rhodium, as embodied in Melles Griot concave light multipliers on page 12–17 of the Optics Guide 5 catalog; glass having an external reflective coating, as embodied in the Spiratone Birds Eye attachment; transparent refractive material having an exterior reflective coating, as shown in the applicant's Design Pat. No. 312,263 (Wide angle reflector attachment for a camera or similar article); and plastic having a reflective coating, as embodied in the applicant's smaller reflector system on page 186 of the August 1986 issue of Sky and Telescope. These optical surfaces have various advantages and disadvantages, with most of the disadvantages relating to trades between cost, optical quality, and durability An internal reflector surface within a transparent substrate that does not have a separate physical obstruction in front of the reflector surface are less common, but are embodied in the Peri-Apollar and the applicant's unpublished prior art.

Some of the prior art consists of or incorporates refracting optics to eliminate field curvature, as shown U.S. Pat. No. 4,484,801 (Panoramic lens with elements to correct Petzval curvature), and field flattening systems for astronomical telescopes. Used alone, reflector systems can produce aberrations, with the most severe aberrations typically being off-axis.

Some prior art may utilize refracting optics to reduce aberrations, as is shown in U.S. Pat. No. 4,012,126 (Optical system for 360 degree image transfer). Other prior art utilizes a second reflective surface to control aberrations, as embodied in Cassegrain telescopes.

Use of a second reflector to control aberrations is applicable to the field of the present invention. Some of the principles related to aberrations from reflectors can be more elegantly addressed through examination of prior art in the more mature field of Cassegrain telescopes and telephoto catadioptric camera lens systems. In these optical systems, the relative figures of the primary and secondary mirrors can be manipulated in order to reduce imaged on-axis aberrations to a size smaller than the Airy disk. In addition, the figures of the primary and secondary mirrors can be manipulated to affect off-axis aberrations in a way which reduces the severity of aberrations or results in an aberration which is relatively practical to correct by means of comparatively small auxiliary refracting optics which are located relatively near the focal plane.

Cassegrain telescope systems include the Ritchey-Chrétien, a telescope having a concave hyperboloidal primary mirror and a convex hyperboloidal secondary mirror. This combination results in off-axis astigmatism, an aberration relatively difficult to correct with refracting optics if they are located in close proximity to the focal plane. Another Cassegrain system is the Classical Cassegrain, a telescope having a concave paraboloidal primary mirror and a convex hyperboloidal secondary mirror. Coma is the predominant aberration with this system, but coma is relatively easy to correct or reduce with refracting optics, even if they are located relatively near the focal plane. Accordingly, refractive coma correctors are commonly available for commercial Cassegrain telescopes. Simpler published coma corrector designs include those by Brixner, Jones, and Jones-Bird. These simpler corrector systems are designed for Newtonian telescopes and they correct coma at the expense of introducing other aberrations; however, these correctors are advantageous when their use will reduce the overall size of the combined imaged aberrations to an acceptable level.

An effective corrector for Classical Cassegrain and Schmidt-Cassegrain telescopes is a four element system offered by Celestron, and more recently, by Meade Instruments. This optical system has substantial positive optical power which results in a faster numerical focal ratio at the focal plane than that of the telescope alone. More sophisticated corrector lenses are utilized in compact Catadioptric telephoto camera lenses. These include the Nikon 500 mm telephoto mirror lens and the Vivitar 800 mm Solid Catadioptric telephoto lens for a 35 mm camera. In catadioptric telephoto lenses, correcting lenses are occasionally used in combination with reflective optics in which imaging aberrations roughly equal and opposite to the residual aberrations of said correcting lenses have been deliberately introduced.

In the case of a convex wide angle reflector, a virtual image typically exists on an imaginary curved surface that is usually disposed behind the apex of said convex reflector. When a real image is produced by means of imaging the virtual image with a conventional imaging lens system, aberrations present in said virtual image are typically repeated in the real image. In addition, the curvature of the virtual image results in curvature of the surface of best focus for the real image.

Therefore, a quality wide angle reflector system must incorporate or otherwise utilize means for correcting field curvature and reducing or correcting or counteracting aberrations in the virtual image if the real image is to be of high overall resolution and still facilitate the use of a flat focal surface such as that which is common in most cameras and image sensors. Imaging lens systems having means to correct field curvature and at least some aberrations exist in the prior art. Imaging lens systems of this type are shown in U.S. Pat. No. 4,484,801 (Panoramic lens with elements to correct Petzval curvature), U.S. Pat. No. 4,395,093 (Lens system for panoramic imagery), and U.S. Pat. No. 4,012,126 (Optical system for 360 degree image transfer).

Corrective optics not previously associated with wide angle imaging include some of the concepts mentioned above for telescope optics, corrector lenses, and telephoto lenses or curved field lens systems of the type used to sharply image the curved surface of a cathode ray tube CRT, as embodied in older oscilloscope cameras. Use of such optics and other optics based on similar principles is applicable to the practice of some embodiments of the present invention, where such use does not infringe on other prior claims.

Primary wide angle reflector figures include concave, as shown in U.S. Pat. No. 5,631,778; convex spherical, as shown in the hubcap used in the applicant's larger reflector system on page 186 of the August 1986 issue of Sky and Telescope; and aspheric, as shown in the applicant's Design Pat. No. 312,263 (Wide angle reflector attachment for a camera or similar article).

Secondary reflector figures include flat, as shown in U.S. Pat. No. 5,115,266 (Optical system for recording or projecting a panoramic image), and Design Pat. No. 312,263 (Wide angle reflector attachment for a camera or similar article); concave, as shown in U.S. Pat. No. 4,012,126 (Optical system for 360 degree image transfer); and convex, as in the applicant's U.S. provisional patent applications Nos. 60/043,701 and 60/055,876.

Means for accurately indicating the boundaries of coverage include a flat plate behind the primary reflector, as shown in pages 78 through 80 of the proceedings of the 1988 Riverside Telescope Makers Conference; a curved mask behind the convex reflector having its concave side toward the rear surface of the reflector, as shown in U.S. Pat. No. 5,627,675 (Optics assembly for observing a panoramic scene); a sudden change in the reflectivity of the reflector surface, as in Design Pat. No. 312,263; and a cell which retains the outer perimeter of the reflector, as shown in Design Pat. No. 312,263.

In his prior Design Pat. No. 312,263 and in a subsequent publication, the applicant has shown means for imaging a field of view which encompasses the entire great circle surrounding a particular vantage point. The first embodiment shown in Design Pat. No. 312,263 (FIGS. 1 through 5) consists of a simple convex reflector, with support means for a camera and imaging optics. The second embodiment (FIGS. 7 through 12) consists of two external reflectors and a small imaging lens system. In the second embodiment, the incoming light is reflected by a strongly curved convex reflector having a prolate aspheric figure to a smaller flat secondary mirror which is centered on the optical axis directly in front of said primary reflector, said secondary mirror being supported by an axial strut. From the secondary mirror, light is reflected through a transparent area in the center of the primary reflector substrate, where it is refracted by an imaging lens to produce a real image of the virtual image formed by the primary reflector at the focal plane. The end of the axial strut closest to the camera is supported by the transparent area in the center of the primary reflector substrate. Disadvantages of these systems include a relatively long axial strut and a conventional or simplified imaging lens system which does not adequately correct off-axis aberrations.

Prior art in the field of electronic redistribution of an image includes the "polar coordinates" filter in Adobe Photoshop (TM), which is capable of converting an entire circular or annular image into a square image which can then be scaled in one dimension to provide a rectangular panoramic image having relatively normal image proportions. Disadvantages of this system include the fact that several additional image processing steps are required if the image elements are to be redistributed in a way that provides an undistorted result from original images captured with a wide angle optical system that is not used in almost an exactly a vertical orientation. Additional steps are required in order to provide normal proportions in elements of the image which are a significant distance above or below the horizon. A further disadvantage of the polar coordinates filter is that the entire circumference of a circular or annular image must be converted to a rectangular format in order to view any part of it in true rectangular coordinates. This can be inefficient at times when only part of the original image contains the subject matter of interest.

In the field of the present invention, it is important to distinguish between two definitions which are often applied to the concept of an "omnidirectional" field of view or a 360 degree angle of view:

In the context of this patent application, the most accurate definition of "omnidirectional" relates to the actual angle of view of an optical system, where the specified angle of view is determined by the true angular coverage of the optical system relative to its optical axis; meaning that if an optical system is truly has 360 degree omnidirectional coverage, it must cover the entire sphere around itself. According to this definition, the present invention is capable of omnidirectional imaging in that it some embodiments are capable of covering an entire sphere in a contiguous annular or circular image. Other embodiments which are intended for applications that include panoramic imaging with limited vertical coverage may have a conical exclusion zone toward the front or back.

The more inaccurate definition of omnidirectional relates to the fact that a great circle (such as the horizon) can be imaged by an optical system having a field of view greater than 180 degrees. Such a system is not truly omnidirectional in that it does not have a true 360 degree angle of view. This definition is often used in promotional material for optics which have an angle of view less than 360 degrees, when in fact such optics may only cover something like 240 degrees. According to this definition, all embodiments of the present invention (including those having a central obscuration or conical exclusion zone) cover 360 degrees. In order to eliminate confusion, the applicant's term "Omniramic" (TM) shall be used to indicate this type of coverage.

BRIEF SUMMARY OF THE PRESENT INVENTION

The applicant has shown in U.S. provisional application Ser. No. 60/043,701 an improved means for imaging a field of view which is omnidirectional.

It is an object of the present invention to provide means for simultaneously and seamlessly imaging the entire 360 degrees of a great circle that surrounds said invention and which is perpendicular to the optical axis thereof, said imaging also including a substantial angular area on either side of the plane of said great circle, whereby three dimensional space surrounding the invention is transformed into one or more two dimensional annular, circular, or sectored images or whereby a two dimensional annular, circular, or sectored image is projected onto a surrounding three dimensional surface or into surrounding three dimensional media. A preferred embodiment of the invention relates to an omnidirectional imaging system providing means for the simultaneous and seamless imaging of up to the entire sphere around itself with the exception of a narrow conical area extending from the rear perimeter of said optical system to an axial point disposed a finite distance behind said optical system.

Images produced or projected by the invention are applicable to many fields, including still, time lapse, or full motion indoor and outdoor panoramic photography with various format film or electronic cameras, sensors or other devices utilizing a focal surface; omniramic and omnidirectional recording of subjects for virtual reality applications with a film camera, electronic camera, or similar article; omniramic or omnidirectional projection of recorded, artificially generated, or hybrid images in applications or settings which include planetariums, theaters, theme parks, corporate presentations, conference rooms, virtual reality suites, booths, goggles, or home entertainment and maintenance systems; videography; live broadcast including that via radio carrier waves, closed circuit systems, or the Internet; underwater imaging including imaging of shipwrecks at great depths; surveillance; minimally invasive omnidirectional observation and imaging of difficult to access subjects, as applicable to covert surveillance, dry or immersion bore scopes, endoscopy, laparascopic and other medical procedures which may include colonoscopy and intravascular procedures; conventional and immersion wide angle microscopy; the enabling and enhancement of conventional or micro assembly and inspection techniques; omnidirectional expansion or reception of lasers and other light sources for applications including illumination, optical communication, or optical motion sensing; robotic vision systems including that for rovers, and manned and unmanned air vehicles (UAVs); vision and subject recognition for autonomous and other flight or vehicle command and control or simulation systems, including virtual reality systems and missile systems; and for viewing, observing, measuring, imaging, recording, broadcasting, projecting, or simulating defined or diffuse subject matter, including that which is of large angular subtense, including crowds, architecture, landscapes, weather related events, or the boundary of the lunar umbra as projected on the earth's atmosphere during a total solar eclipse.

The invention is applicable to both original imaging of a subject and for projection of photographic or artificially generated images which include those which are electronically generated, processed, enhanced, or combined.

Many uses of the invention relate to the simultaneous imaging and projection of an entire 360 degree panorama which includes a great circle that surrounds the invention and is perpendicular to its optical axis. This is typically accomplished by using the invention in a vertical orientation (i.e where it is pointed up or down) for 360 degree panoramic (i.e. "omniramic") applications.

When so used, a basic embodiment of the invention images the entire horizon and a substantial angle above and below the horizon as a two dimensional annular image. In this case, a great circle perpendicular to the optical axis corresponds to a flat horizon. The widest embodiment of the present invention is truly omnidirectional in that it can cover the entire sphere around itself on a single focal surface. Some three dimensional imaging embodiments also cover up to an entire sphere, providing two or more sectored, segmented or concentric images of the subject matter in said sphere on one or more focal surfaces, whereby elements of each imaged point are imaged from differing vantage points.

The invention further comprises or relates to the reception or transmission of light or other frequencies in the electromagnetic spectrum for purposes other than imaging, including where the invention comprises, is associated with, or is incorporated into antennas and transducers.

The invention also comprises or is applicable to the distribution of still or motion picture image elements by optical or electronic means, whereby the image or any subset thereof is converted to or from a two dimensional annular image or a segment thereof and a horizontal format image or a subset thereof. Further, the present invention comprises or relates to the capture, integration, and display of images having three dimensional information and to other characteristics of real or artificially generated subject matter which may include but are not necessarily be limited to temperature, sound, odor, and wind.

The practice of the invention also comprises or is associated with microphonics and sound recording, transmission, or distribution in media including air and liquid. Applications include those where the invention is associated with integral or separate microphones which are used in recording or monitoring single or multiple channels of sound from the subject matter. The invention further comprises or is associated with sound generation or simulation means which may include speakers, as well as systems which simulate wind, smell, and other attributes of real or artificially generated subject matter.

The invention may be used in any orientation; however, for the sake of clarity, the invention will typically be described in terms of an imaging system such as that used with or incorporated into a film or electronic camera and which is used in a vertical orientation for acquiring panoramic images of outdoor scenes having a flat horizon.

Obviously, directions traveled by light or other energy or particles or media or waves will be reversed where the invention is used for projection, and, in the case of either imaging or applications other than imaging, the subject energy or material or waves will propagate according to the same laws of physics regardless of the direction and whether or not imaging applications are involved.

According to the present invention, the optical system thereof includes reflecting and refracting optical surfaces or elements, said optical surfaces or elements providing means for the geometric transformation of three dimensional space surrounding the invention into one or more two dimensional annular, circular, or sectored images or, the transformation of one or more two dimensional annular or sectored images into one or more three dimensional projected images. The optical system may be associated with or incorporated into a film camera, electronic camera, electronic sensor, projector, medical instrument, surveillance system, robotic system, flight control system, simulator, or similar article.

More particularly, a preferred embodiment of the omnidirectional optical system typically consists of an optical substrate having an outer refracting surface which may be cylindrical or curved, an internal convex primary reflector surface having sufficient curvature to image a field of view greater than 180 degrees, thereby providing means to image a great circle surrounding it; a secondary reflector surface (in most embodiments); central refracting optics or surfaces which provide supplemental or redundant coverage (in some embodiments), an imaging and correcting lens system which is optically disposed between and in optical communication with the reflector and a focal surface; light baffles, an aperture stop which may have adjustment means, and mechanical mounting components.

In a basic embodiment, all optical surfaces are integrated into a single solid catadioptric optical substrate, but in most embodiments, the imaging and correcting lens system and any other refracting optics consist of separate optical elements which are attached to or otherwise associated with said solid optical substrate.

In the case of embodiments having a secondary reflector surface, the primary and secondary reflectors are typically internal surfaces of the solid optic. In these embodiments, the entire space between said secondary surface and the primary reflector surface is usually occupied by the optical substrate. This protects and maintains alignment of the reflective surfaces. An embodiment of the optical system not having a secondary reflector may utilize an axial tube or strut to support it in front of the lens of a camera or similar article.

Other embodiments of the invention may incorporate or utilize central wide angle refracting optics which are disposed in front of a hole in the secondary reflector coating, whereby said wide angle refracting optics provide means for imaging the area directly in front of the overall optical system, said imaged area being redundant in some embodiments and merged with the annular image produced by other optical surfaces in different embodiments.

Where a focal surface is associated with the invention, said focal surface is in optical communication with up to the entire sphere around the optical system by means of refraction through the outer refracting surface, reflection from the primary reflector, reflection from the secondary reflector (in embodiments having one), and refraction by imaging and correcting optics. The widest embodiment of the present invention images the entire sphere around itself by utilizing its outer refracting surface to extend the effective coverage of its primary reflector.

The present invention provides images containing three dimensional data by means of opposing reflectors or reflector surfaces, concentric reflectors or surfaces, scalloped reflecting or refracting surfaces, or any combination thereof. Embodiments having both scalloped and concentric or opposing reflectors provide three dimensional information in multiple axes. Three dimensional images produced by the invention typically consist of concentric, sectored, or hybrid annular images which may be disposed on a single focal surface or on separate focal surfaces. These images may be analyzed, transformed and displayed as flat or curved three dimensional panoramas or immersive whole scene images or segments thereof, or projected back through an appropriate embodiment of the invention or other optical system to provide a projected three dimensional "stereo" image which surrounds the invention or viewing participants.

Features of the present invention may be interchanged or combined with prior art to optimize it for various applications without departing from the applicant's inventive concept. Degrees of freedom resorted to in different embodiments of the invention may include a.) the materials and manufacturing techniques used to make the invention, b.) the size of the invention, c.) the eccentricity (i.e. the degree of aspheric figure, if not spherical) and degree of curvature of the outer refracting surface of the solid optic, including the existence or degree of radial modification or offset, compression, enlargement, or torroidal attribute of the outer refractive surface figure or the presence of a radially discontinuous or scalloped surface; d.) the relative size of the primary reflector surface, including the degree of curvature and figure of the primary reflector surface, the eccentricity of an aspheric figure or the presence of a scalloped surface, the radial offset, compression, enlargement, or torroidal attribute of the primary reflector surface figure; e.) the existence, size and figure of a nonreflective transparent area in the center of the primary reflector surface; f.) the existence, size, or optical figure of a transparent central entrance or exit aperture in the front of the optical substrate, and whether or not said optical substrate supports an axial tube or strut; g.) the existence, size and figure of the secondary reflector or secondary reflector surface, said figures including flat, concave, convex, spherical, aspheric, continuous or radially modified or discontinuous curvature; h.) the existence, size, and figure of additional reflectors which may oppose or surround the invention's other reflector surfaces; i.) the existence, size, and figure of scallops on any of the optical surfaces; the existence, size and figure of refractive surfaces for any reflectors not incorporated into a solid substrate; j.) the spacing between optical surfaces; k.) the existence, size, and figure of a nonreflective transparent area in the center of the secondary reflector; l.) the existence, size, and figure of front central refracting optics; m.) the existence, size, and figure of separate optics or optical surfaces which may be between reflector surfaces; n.) the existence, size, configuration, and figure of fixed or steerable periscopic optics to supplement the field of view or provide redundant imaging; o.) the existence and configuration of imaging and correcting optics, including whether or not some or all of the imaging optics are an integral part of the solid optical substrate and whether or not they or other surfaces of the invention are utilized in the correction of field curvature, astigmatism, or chromatic aberration; p.) whether the imaging optics are interchangeable or are a permanent part of the overall optical system; whether the imaging optics provide a real image in an interchangeable lens camera or serve as an afocal interface for a fixed lens or other optic which may be associated with a camera, projector, laser, or other article; q.) the size and configuration of bored, attached, or applied light baffles; r.) the existence, position and shape of the focal surface relative to the invention, including whether or not the final focal surface is in proximity to the optical system or the image is relayed to it by fiber optics or relay lenses; s.) the existence and configuration of aperture adjustment means; t.) the existence and configuration of a side support vane and any wire and fixture routing it may provide; and, u.) any combination of these degrees of freedom.

Radially compressed, enlarged, or torroidal optical figures are applicable to a variety of applications and optical systems, including those other than the described embodiments of the present invention.

The primary differences between various embodiments of the invention include overall size; relative sizes of different optical surfaces; materials used; the presence or configuration of moisture and contaminant seals; optimization of the optical figure for immersion, where applicable; the existence and relative size and longitudinal position of a focal surface or focal surfaces, integral or attachable means for providing illumination, sensing, recording, transmitting, or distributing sound, indication of tilt, and other simulated or real environmental factors.

Improvements of the present invention over the applicant's prior art relate primarily to improved durability; improved compatibility with high air speed environments including use on missiles or aircraft; miniaturization; increased off-axis resolution; increased vertical coverage; improved compatibility with low cost modes of production, improved durability, and compatibility with a wider array of sensors, cameras, projectors, and other instrumentation.

The primary differences between embodiments having and not having a conical exclusion zone in front of the primary reflector surface is the figure of the outer refracting surface of the solid optical substrate, the figure of said primary reflector surface, the size of any central transparent area in said primary reflector surface, and the size and proximity of a central obstruction such as a secondary reflector surface and its baffle, a sensor, or a separate article such as a camera.

Some embodiments having little or no conical exclusion area utilize a radially enlarged primary reflector, said reflector being torroidal in the most extreme of the embodiments. Other embodiments utilize the outer refracting surface of the solid optical substrate, and others utilize a combination of said refracting surface and the primary reflector surface. For a given exclusion zone, radial enlargement of the primary reflector surface results in an angle of reflection which is closer to perpendicular with its optical surface, thereby allowing the angle of refraction of the outer refracting surface to be closer to perpendicular, thereby minimizing or eliminating lateral chromatic aberration from said refracting surface at the affected zones.

In order for the optical system to cover the full sphere around itself when the subject matter is at a finite distance, the annular image produced by said optical system must actually exceed 180 degrees of radial coverage, and thereby exceed 360 degrees of overall coverage. This facilitates the imaging of axial points which are disposed at a finite distance in front and behind the optical system, whereby the axial point in front of the primary reflector surface is imaged as a ring which defines the inner boundary of the annular image formed by said optical system and the axial point behind said primary reflector surface is imaged as a ring which defines the outer boundary of said annular image. This results in overlapping coverage for subjects at greater distances from the optical system. Where the optical system is utilized under water and the widest possible coverage is required, an internal primary reflector surface having wider coverage is utilized in order to compensate for reduced refraction from the outer surface of the optical substrate.

The percentage of the image occupied by a central obscuration is also important, since a larger imaged obscuration will result in reduced radial image scale for the rest of the image on a given format. Some embodiments of the optical system reduce the imaged size of any central obscuration by utilizing a radially compressed figure which results in a pointed apex on the reflector surface having the least optical distance from a focal surface. Where the pointed apex is relatively pronounced, the central obscuration is not imaged at all, resulting in a circular image rather than an annular one, and an axial point a finite distance in front of the primary reflector surface (or, in embodiments having less coverage, an annular zone in front of the primary reflector surface) is imaged as a point in the center of the circular image. Where the optical system utilizes front central imaging optics in addition to an optical configuration providing means for central coverage within an annular image, the image from said central refracting optics provides redundant coverage of the central area in a circular image which is located within the inner boundary of said annular image.

The invention will be more clearly understood from consideration of the following description in connection with accompanying drawings that form a part of this specification.

BRIEF DESCRIPTION OF THE DRAWINGS

FIGS. (e.g. FIGS) 1 through 28 are renderings of the angular distribution of circular, annular, and sectored images which may be produced with the present invention or reflection from reflectors having various figures. The first several figures are renderings of virtual images which may be produced by a simple optical systems such as convex reflectors. A real image results at a focal surface when the virtual image is imaged by conventional or specialized imaging optics. Obviously, other suitable optical systems of varying complexity may be used to provide the same results. The detailed description addresses the specific characteristics of each figure.

In the case of most of the illustrations, it is assumed that the optical axis of the reflector or other optical system is pointing straight up. Accordingly, zero degrees in a figure is considered to be the zenith, or straight up, and the angles indicated on the concentric circles are for the included angle of view at each indicated zone of the image. Therefore, for indicated angles of less than 180 degrees, the angle from the optical axis in front of the invention is half that indicated. For indicated angles larger than 180 degrees, the angle from the optical axis is in relation to an extension of the optical axis behind (or below) the invention. Here, the angle from the optical axis is half of the result of 360 degrees minus the indicated angle. Concentric circles and numbers shown in the field of view indicate the local radial coverage at their respective zones for illustrative purposes only. The concentric circles and numbers are not features of the invention except in rare embodiments where it is desirable to indicate or index the angular size of subject matter in the image.

FIG. 52 is a cross sectional view of the elements in a 180 degree fisheye lens such as that which is common in the prior art.

FIG. 53 is a side view of the Spiratone (R) Birds Eye (TM) attachment which is common in the prior art.

FIG. 54 is a cross sectional view of a Cassegrain axial strut wide angle reflector similar to that which is the subject of FIGS. 6 through 12 of the applicant's prior Design Pat. No. 312,263.

FIG. 55 is a front (or top) view of a Cassegrain embodiment of the present invention having a solid optical substrate.

FIG. 56 is a rear (or bottom) view of the apparatus of FIG. 55.

FIGS. 65 through 90 are cross sectional and pictorial views of more complex embodiments of the present invention. Some of the figures also show approximate ray traces.

FIGS. 91 through 113 are cross sectional views, front views, and pictorial views of embodiments of the present invention which provide images having three dimensional information, also showing approximate ray traces. Cross section lines are shown only in the optical material of the solid optical substrate in FIG. 94 in order to permit approximate ray traces in other figures to be illustrated more clearly.

FIG. 114 is a side view of an embodiment of the invention having two independently positionable optical systems which may have electronic image sensors or fiber optic cables.

FIG. 115 is a simplified cross sectional view of an embodiment of the present invention having a flush mounted central front element.

FIGS. 116 through 120 are cross sectional and simplified profile views of embodiments of the present invention which have only one reflector surface.

FIG. 121 is a simplified cross sectional view of an embodiment of the present invention having one reflector surface.

FIG. 122 is a cross sectional view of a right angle prism which is used as a rhomboid prism to illustrate the concept of substantial correction of chromatic aberration.

FIGS. 123 through 126 are cross sectional and pictorial views of the present invention, also showing means for imaging instruments, displays, indicators, or other articles.

FIGS. 127 through 128 are side views of omnidirectional embodiments of the present invention which may be imaged from a distance, thereby reducing the imaged size of a camera or similar article which may be in front of the primary reflector. An axial tube and an axial strut (either of which may be used to support the optical system) are shown in broken lines. FIG. 128 further shows a tilt indicator and a close up lenses which facilitates afocal imaging.

FIGS. 129 through 132 are side views of omnidirectional embodiments of the present invention which may be imaged from a distance, also showing an adjustable stand and a bracket which facilitates mounting of the reflector on a door or other protrusion.

FIGS. 141 through 146 are pictorial views of the invention with integral means to indicate limits of coverage and indicate tilt, along with accessory systems including a case, transparent cover, occulting objects, and tilt indicators.

FIGS. 147 and 148 are side views showing the application of the invention to omnidirectional expansion of laser light or other energy.

FIG. 149 is a side view showing the association of the optical system of the invention with a projector, further comprising means to illuminate or project part of an image onto a surface on the opposite side of said optical system from said projector.

FIG. 150 is a side view showing the association of the optical system of the invention with a camera or projector, also showing close up lenses and an adjustable central mask.

FIG. 151 is a side view showing the association of the optical system of the invention with a camera or projector, also showing a relay lens system which facilitates afocal imaging.

FIG. 152 is a side view of the optical system on a mounting having a side support strut.

FIG. 153 is a side view of a fisheye lens having a central mask.

FIG. 154 is an oblique view of image boundary indication means.

FIGS. 159 through 163 are side cross sectional views of embodiments of the invention having annular lenses which extend or otherwise modify the field of view of a reflector, said figures also showing imaging and correcting lens systems which may be used with articles such as those having focal surfaces.

FIG. 164 is a side cross sectional view showing a variety of forms and locations for Fresnel optics or surfaces which surround a reflector.

FIG. 165 is a perspective view illustrating an embodiment of the invention having a cylindrical projection surface to provide a virtual reality display which surrounds the participants. Many other shapes are also applicable to the projection surface. Also shown are temperature control means and sound, wind, and odor generation means. The relative size of the optics and some fixtures are exaggerated for clarity.

FIGS. 166 through 172 are interior side views of virtual reality projection embodiments of the invention. Many shapes are applicable to the projection surfaces, but spherical projection surfaces are shown for illustrative purposes. FIG. 170 shows means to suspend a participant and broken lines illustrate a retractable ledge and removable floor sections or coverings which may be replaced if soiled by a participant's feet or by motion sickness.

FIG. 177 is a side cross sectional view of the optical system of the present invention, showing afocal imaging optics and a video camera having multiple microphones and interface means for image distribution.

FIG. 178 is a cross sectional view of an embodiment of the invention having electronic imaging sensor, also showing an image display and interface means for image processing and distribution which further comprise the invention.

FIG. 179 illustrates the optical system of the invention with of image capture and distribution means which comprise the invention. Also shown are illustrations representing articles which may be used for image capture, distribution, and display with the invention, including computers, intranets, the Internet, closed circuit, cable, and broadcast television, control means for games and robotic devices, interactive input devices, goggles, underwater exploration, and monitoring, command and control for terrestrial, and interplanetary rovers, aircraft, spacecraft.

FIG. 180 is a perspective view illustrating an embodiment of the invention which is interfaced to elements of FIGS. 177, 178, or 179 and having a projection surface to provide a virtual reality display of the appropriate size to surrounds participants in a home or theater setting.

DETAILED DESCRIPTION OF THE PREFERRED EMBODIMENTS

A description of the invention will now be given that references the drawings and reference numbers marked thereon.

Figure 1:
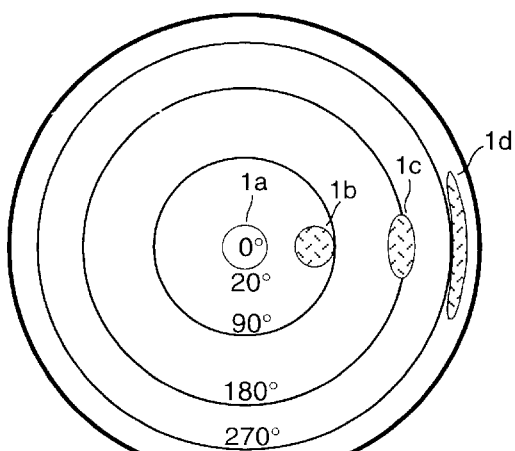
FIGS. 1 through 5 are renderings of circular and annular virtual and real images obtained by spherical and aspheric reflective optics, also showing the appearance of spherical objects as imaged within the field of view.

Referring to FIG. 1, a rendering of the angular distribution in a virtual or real image such as that formed by reflection in a convex spherical reflector or a basic embodiment of the optical system of the present invention. Also shown is the imaged appearance of spherical objects or areas in the field of view that each occupy about 20 degrees of angle as seen from the center of the primary wide angle surface of the optical system. The illustration shows that the angular distribution of the virtual reflected image from a spherical reflector provides an image in which the radial scale decreases toward the outer edge, as can be seen by comparing images of the spherical objects which are disposed at the center of the image 1a, the 70 degree coverage zone (35 degrees off-axis) 1b, the 180 degree zone (90 degrees off-axis) 1c, and the 290 degree coverage zone (145 degrees from the optical axis at the front of the invention and 35 degrees from the optical axis behind the invention) 1d.

Figure 2:
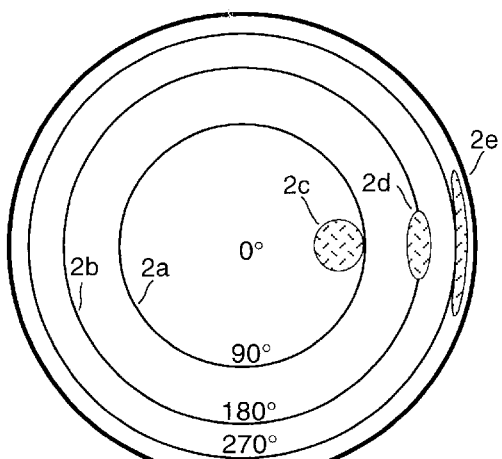

FIG. 2 shows the angular distribution of a virtual image from reflection in a convex oblate aspheric reflector, also showing the imaged appearance of spheres in the field of view 2c, 2d, 2e that each occupy about 20 degrees of angle as seen from the center of said reflector.

Figure 3:
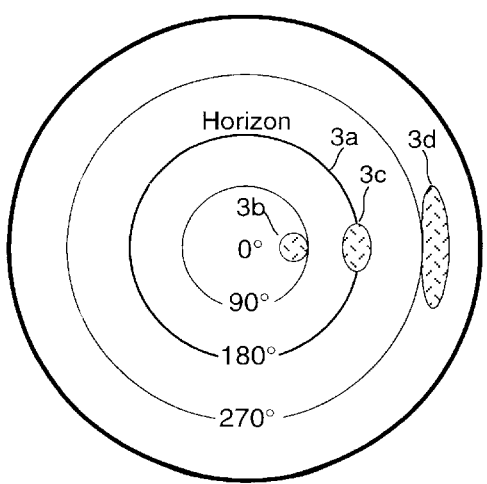

FIG. 3 shows the angular distribution of a theoretical 360 degree virtual image having constant radial image scale, said virtual image resulting from reflection in a convex prolate aspheric reflector when said reflector is viewed from an infinite distance. Also shown is the imaged appearance of spheres in the field of view 3b, 3c, 3d that each occupy 20 degrees of angle as seen from the center of said reflector.

Figure 4:
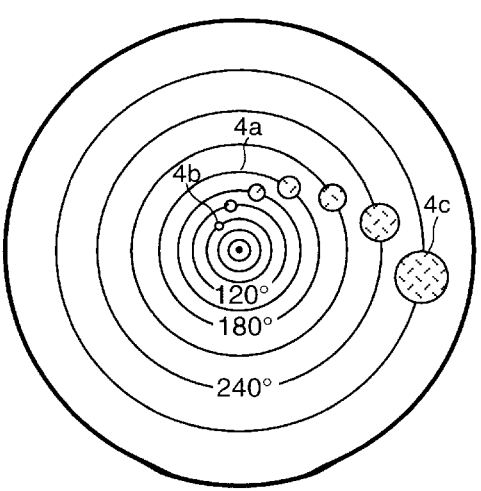

FIG. 4 shows the angular distribution of a virtual image from reflection in a convex reflector having a strong hyperboloidal figure, also showing the imaged appearance of spheres in the field of view 4b, 4c that each occupy about 15 degrees of angle as seen from the center of said reflector. This projection provides a relatively undistorted image of any given point at the expense of increased image scale toward the outer zones of the image. The size of the imaged horizon circle 4a in this image is substantially smaller in relation to the overall image than the equivalent zones of coverage 2b, 3a in the previous two figures.

Figure 5:
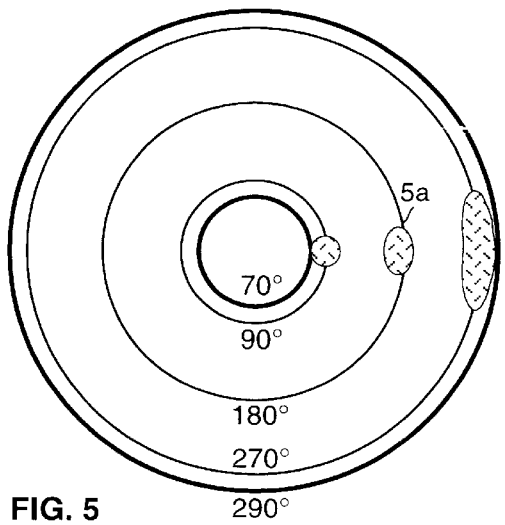

FIG. 5 shows the angular distribution of a virtual image from reflection in a convex prolate aspheric parabolic reflector, also showing the imaged appearance of spheres in the field of view 5a that each occupy about 20 degrees of angle as seen from the center of said reflector.

Figure 6:
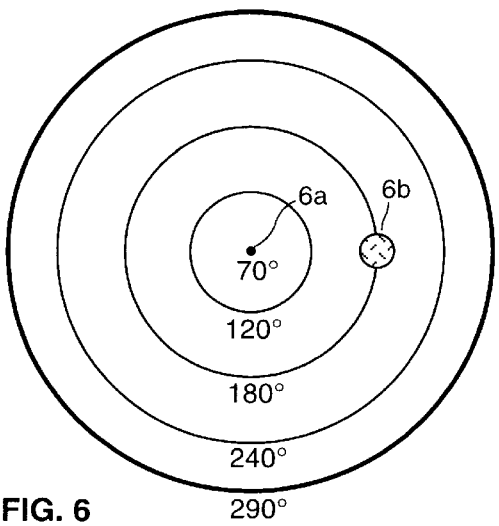
FIG. 6 is a rendering of a virtual circular image obtained by reflection in a reflector having a radially compressed optical figure which results in a pointed apex.
Figure 41:
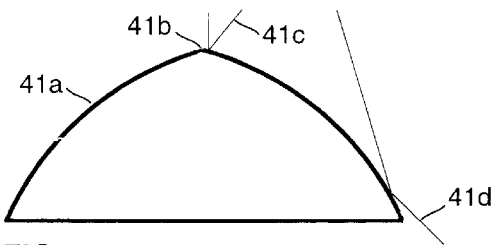

FIG. 6 shows the angular distribution of an annular virtual image from reflection in a convex prolate aspheric reflector in which the figure is radially compressed so that its apex forms a point like that of feature 41b in FIG. 41 and images the inner annular zone of covered subject matter as a point in the center 6a. Also shown is the relatively undistorted imaged appearance of a sphere in the field of view 6b that occupies about 15 degrees of angle as seen from the center of said reflector.

Figure 7:
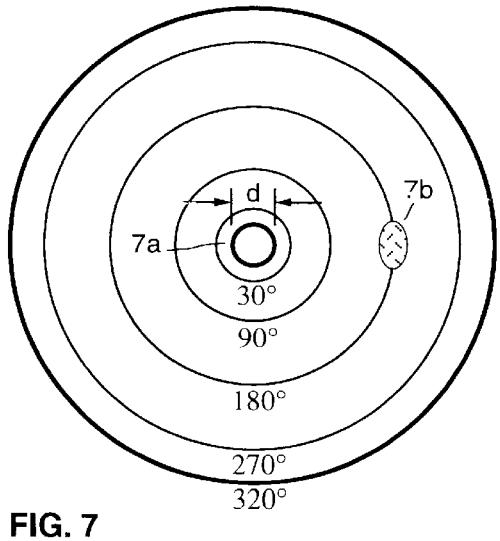
FIGS. 7 through 9 are renderings of annular images obtained by reflection in reflectors having radially enlarged optical figures.

FIG. 7 shows the angular distribution of an annular virtual image from reflection in a convex prolate aspheric reflector having a figure that is radially enlarged to a slight degree. As a result of radial enlargement of the optical figure according to distance "d" in FIGS. 7 and 43, the former center and apex of the reflector surface has now become zone 7a.

Figure 8:
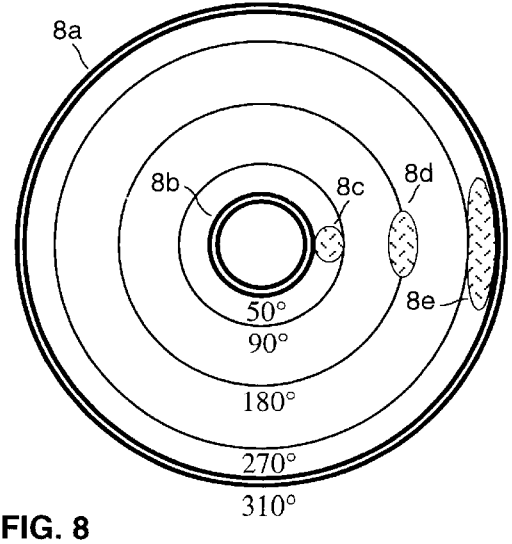

FIG. 8 shows the angular distribution of an annular virtual image from reflection in a convex prolate aspheric reflector in which the figure is radially enlarged to a moderate degree, thereby permitting the excluded angle inside of zone 8b to be less than what would be proportional to the size of zones 8a and 8b the relative to the angle of coverage at each zone.

Figure 9:
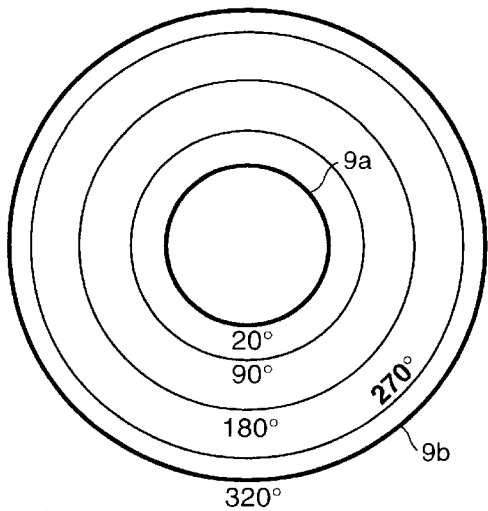

FIG. 9 shows the angular distribution of an annular virtual image from reflection in a convex prolate aspheric reflector in which the figure is radially enlarged to an extreme degree, permitting coverage up to within only a few degrees of the optical axis even though the area inside inner limit of coverage 9a in the image is relatively large.

Figure 10:
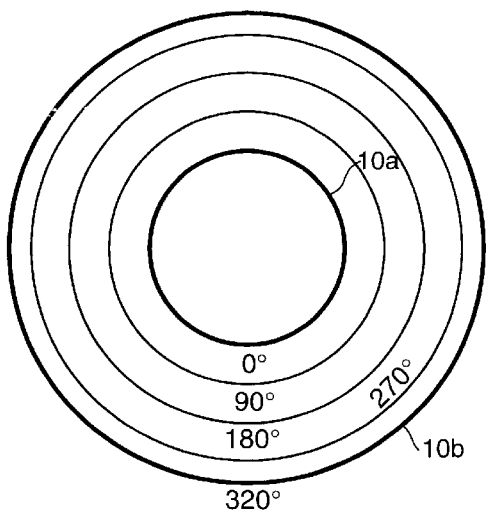
FIGS. 10 through 12 are renderings of annular images obtained by reflection in convex reflectors having figures which are radially enlarged and in which the enlarged figure is continued toward the center, resulting in a torroidal figure.

FIG. 10 shows the angular distribution of an annular virtual image from reflection in a prolate aspheric reflector in which the figure is radially enlarged to such an extent that the surface is torroidal when the optical figure is continued toward the center, thereby causing part of its central profile to be repeated around the inner zones 10a.

Figure 11:
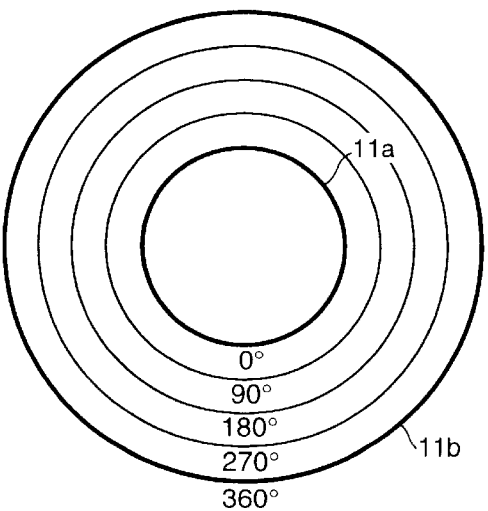

FIG. 11 shows the angular distribution of an annular virtual image from reflection in a prolate aspheric reflector which comprises the inside surface of an optical substrate and in which the figure is radially enlarged to such an extent that the surface is torroidal, the inner zone 11a being capable of imaging subject matter directly in front of itself, the outer optical surface of said substrate extending the field of view behind the reflector perimeter to facilitate full sphere 4 pi steradian coverage 11b.

Figure 12:
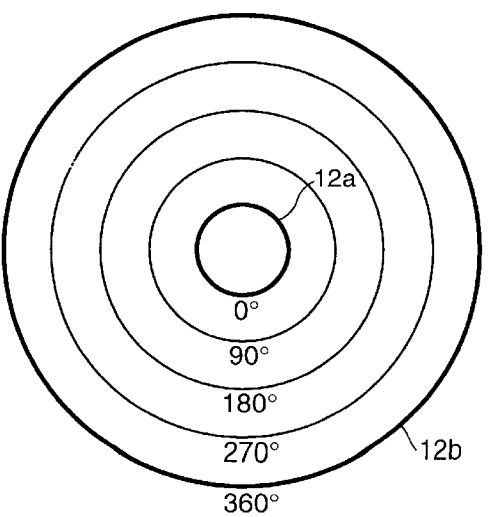

FIG. 12 shows the angular distribution of an annular virtual image from reflection in a prolate aspheric reflector which comprises the inside surface of an optical substrate, or is inside of a separate optical substrate, and in which the figure of said reflector is radially enlarged, the outer optical surface of said substrate extending the field of view toward the front and back in order to facilitate full sphere four pi steradian coverage.

Figure 13:
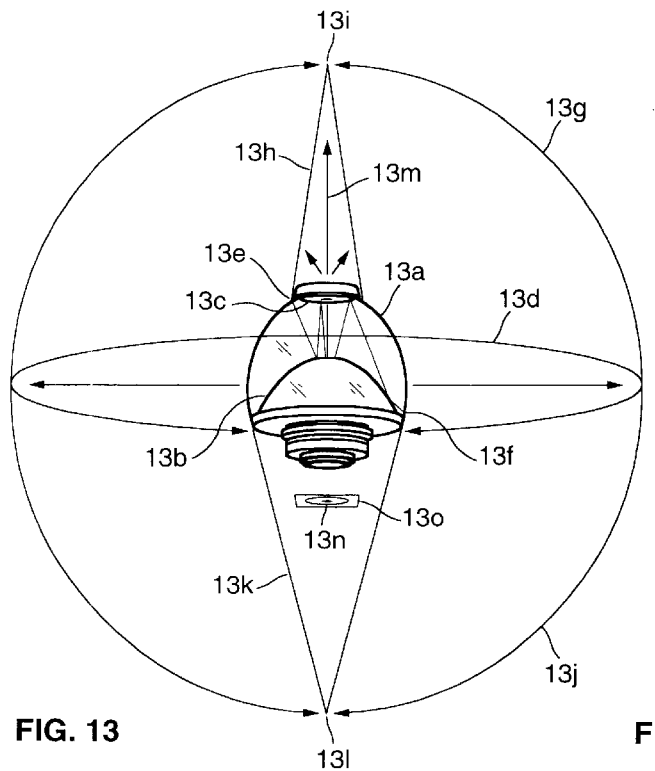
FIG. 13 illustrates coverage which encompasses the entire sphere around a preferred wide angle embodiment of the optical system of the invention.

FIG. 13 illustrates coverage of a preferred embodiment of the optical system of the present invention having a solid optical substrate with an outer refracting surface 31a, a primary reflector surface 13b, a secondary reflector surface 13c, imaging optics, mounting components, and interface means for a camera or similar article, the field of view of said optical system encompassing the entire 360 degrees of a great circle 13d surrounding said optical system, the plane of said great circle being perpendicular to the optical axis 13m of said optical system; the angular coverage of said optical system further encompassing a wide angular area above 13g and below 13j the plane of said great circle, wherein the radial field of view on each side of the optical system exceeds 180 degrees, thereby encompassing the entire sphere around said optical system except for a conical area between the perimeter of its front obstruction 13e and an axial point 13i disposed a finite distance in front of the optical system, and conical area between the outer perimeter 13f of said optical system and an axial point 13l disposed a finite distance in behind said optical system, the image 13n of said covered area being formed on a focal surface 13o that is disposed around an axial point behind said optical system. Axial subject matter beyond the axial points in front 13i and behind 13l the optical system is imaged redundantly.

Figure 14:
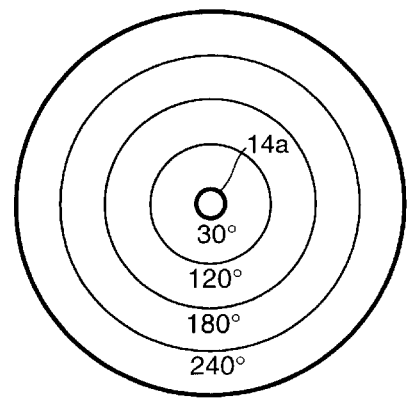
FIGS. 14 through 19 are renderings of circular and annular wide angle images obtained by reflectors and optical systems having various characteristics.

FIG. 14 shows the angular distribution of an annular virtual image from reflection in a Cassegrain wide angle reflector in which the primary reflector has a radially enlarged convex prolate aspheric figure and the secondary reflector is radially compressed, resulting in a small image 14a of the central obscuration.

Figure 15:
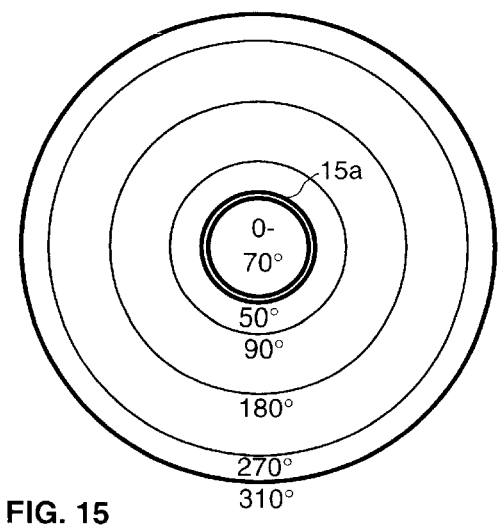

FIG. 15 shows the angular distribution of an annular virtual image from reflection in an upward pointing convex reflector having a hole in its center, also showing central coverage 15a provided by a central lens which is also pointing upward.

Figure 16:
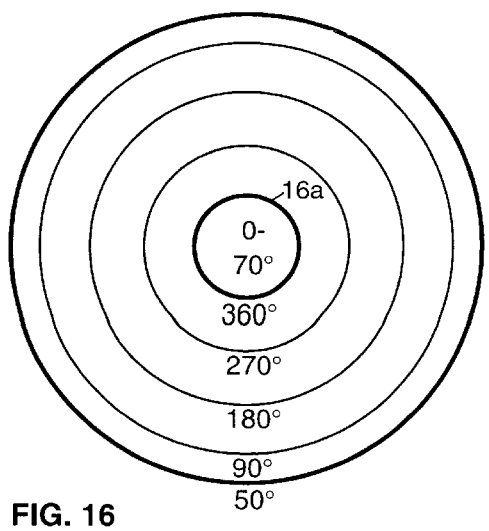

FIG. 16 shows the angular distribution of an annular virtual image from reflection in a downward pointing torroidal reflector, also showing central coverage 16a provided by a central lens which is pointing upward.

Figure 17:
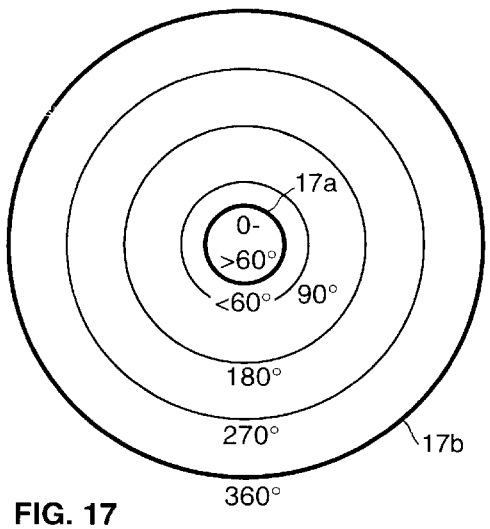

FIG. 17 shows the angular distribution of an annular virtual image from reflection in an upward pointing convex reflector, solid catadioptric, or hybrid optical system having a hole in the center or its primary reflector coating or surface, also showing central coverage 17a provided by a central lens which is also pointing upward, said central coverage being merged with the surrounding annular image 17a at the 60 degree zone of coverage to provide a continues full sphere 4 pi steradian image.

Figure 18:
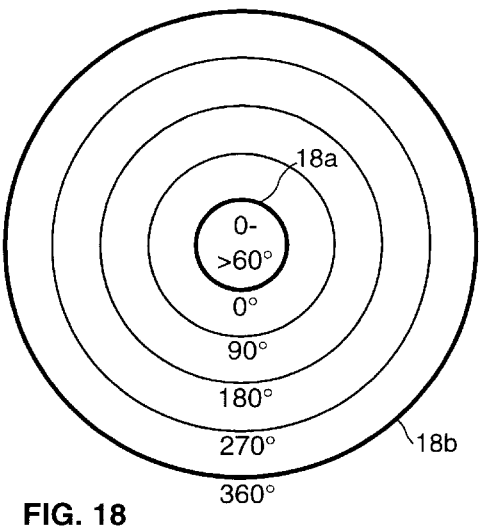

FIG. 18 shows the angular distribution of an annular virtual image from reflection in an upward pointing torroidal reflector or a solid catadioptric, or hybrid optical system having a hole in the center or its primary reflector coating or surface, also showing central coverage 18a provided by a central lens which is also pointing upward, said central coverage being redundant for the inner 60 degrees of coverage of the surrounding annular full sphere image 18b.

Figure 19:
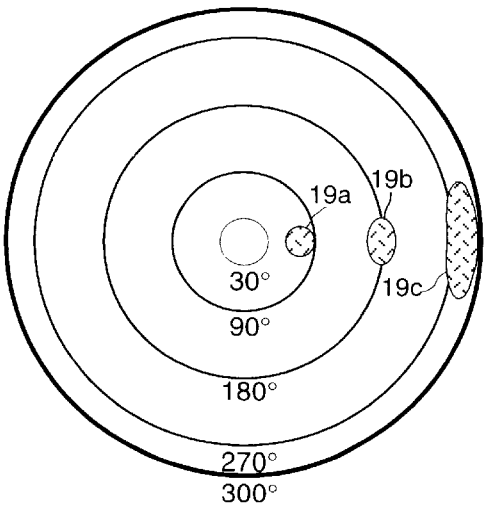

FIG. 19 shows the angular distribution of a circular virtual image from reflection in an upward pointing prolate aspheric convex reflector or solid catadioptric or hybrid optical system, the coverage thereof being 300 degrees and the radial image scale being linear. The central 30 degrees is shown in thin lines. Also shown is the imaged appearance of spheres 19a 19b 19c in the field of view which each occupy an angle of about 20 degrees as seen from the center of the optical system.

Figure 20:
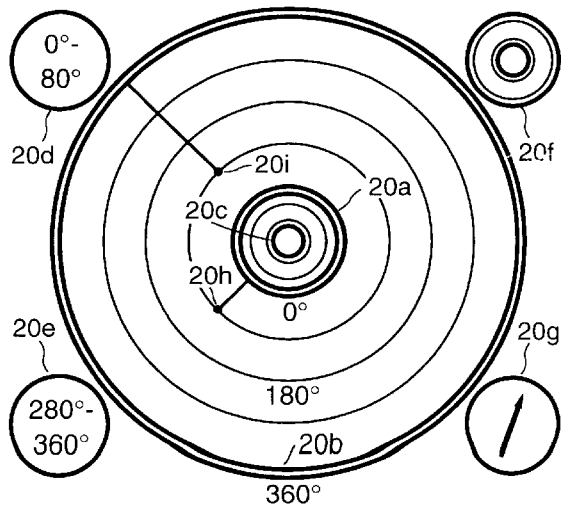
FIGS. 20 through 22 are renderings of annular wide angle images and the appearance and location of imaged instruments, displays, indicators, or supplemental images from auxiliary optical systems.

FIG. 20 shows the angular distribution of an annular virtual image from reflection in a convex prolate aspheric reflector surface or the optical system of the invention, also showing supplemental angular coverage in front 20d and behind 20e the optical system which is imaged on the same focal surface by means of fixed or steerable auxiliary optics 139a, 139g, 139n, the drawing figure further showing instrumentation displays such as an axial tilt indicator 20c, an off-axis level indicator or sensor 20f, a compass 20g, and other articles which may comprise part of the invention and be imaged on the same focal surface as the image from said optical system, said supplemental images being provided by auxiliary optics or imaging optics having a field of view greater than that which is required to image the virtual image from the wide angle reflector alone. Also shown is the imaged appearance of occulting objects 20h, 20i which also comprise part of the invention and locally block the refraction or specular reflection of a bright light source to reduce flare. The figure further shows the imaged appearance of concentric light and dark or colored areas on the optical assembly, said concentric areas comprising part of the invention indicating the inner 20a and outer 20b boundaries of the field of view, said boundaries and tilt indicators being useful for manual and automated processing of still and motion picture images associated with the optical system.

Figure 21:
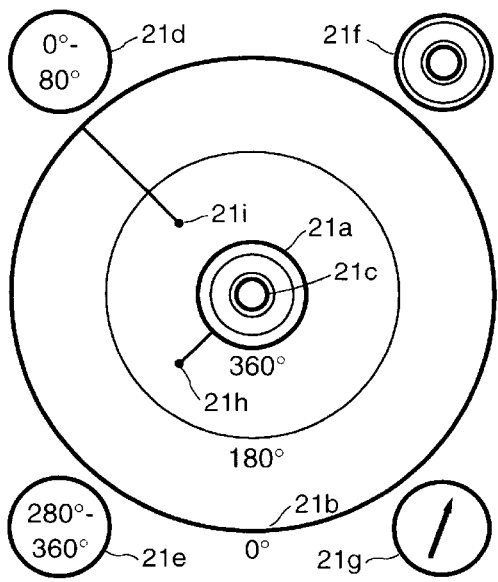

FIG. 21 shows the angular distribution of an annular virtual image from reflection in a convex prolate aspheric reflector or the optical system of the present invention, also showing supplemental angular coverage in front 21d and behind 21e said reflector, said supplemental imaging being provided on the same or a different focal surface by means of fixed or steerable auxiliary optics 139a, 139g, 139n. The figure further shows instrumentation displays which may include a level 21f, clock, and other articles 21g which are imaged on the same focal surface, said supplemental images being provided by auxiliary optics of imaging optics having a field of view greater than that which is required to image the virtual image from the wide angle reflector alone.

Figure 22:
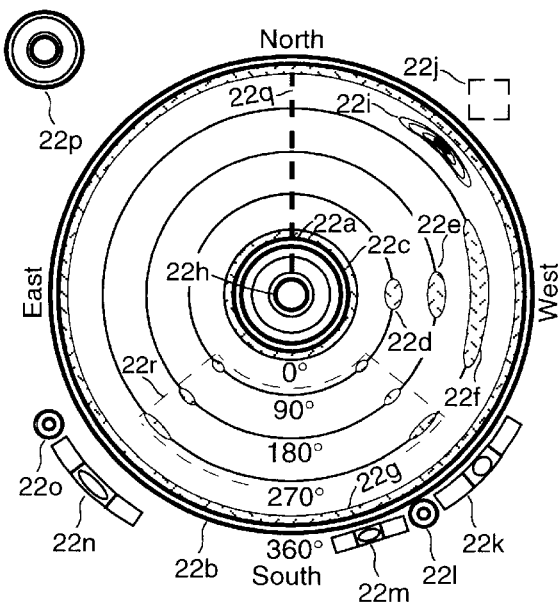

FIG. 22 shows the angular distribution of an annular virtual image from reflection in a convex prolate aspheric reflector or the optical system of the present invention, also showing images of instrumentation displays, said supplemental images being provided by auxiliary optics, the integration of said displays into the optical assembly, or imaging optics having a field of view greater than that which is required to image the virtual image from the wide angle reflector alone. An imaginary radial line 22q represents the right 31q and left boundaries of the image shown in FIG. 31 which results from transforming or "unwrapping" the image of FIG. 22 into a rectangular format. Also shown is the imaged appearance of spheres 22c, 22d, 22e, 22f, 22g in the field of view which each occupy an angle of about 20 degrees as seen from the center of the optical system. Spheres on the optical axis in front 22c and behind 22g the optical system are imaged as annular zones near the inner 22a and outer 22b limits of coverage.

Figure 23:
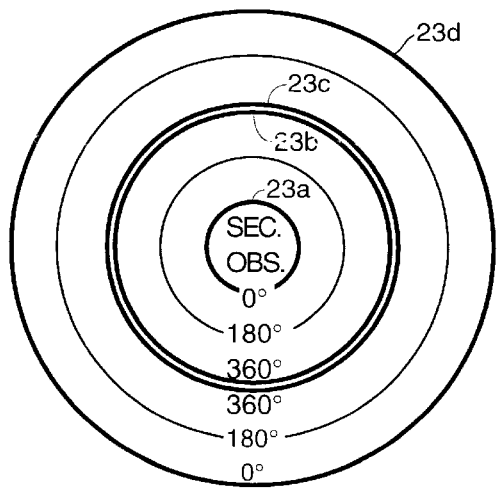
FIG. 23 is a rendering of redundant omnidirectional full sphere coverage having three dimensional information which is provided by an embodiment of the present invention having two wide angle reflector surfaces that face each other.

FIG. 23 is a rendering of redundant omnidirectional full sphere coverage 23a, 23c, having three dimensional information which is provided by an embodiment of the present invention 92a having two wide angle reflector surfaces 92b, 92g, that face each other, the second wide angle reflector surface 92g thereof being annular and radially enlarged and surrounding the secondary reflector 92e of a compound two reflector, or "Cassegrain" system.

Figure 24:
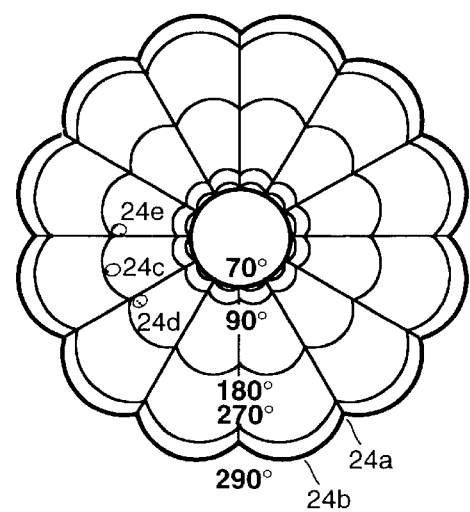
FIGS. 24 through 28 are renderings of redundant panoramic or full sphere coverage having three dimensional information in up to all three axes which is provided by embodiments of the present invention having scalloped or multiple wide angle reflectors.

FIG. 24 is a simplified rendering of the redundant angular distribution and panoramic coverage in a sectored 24a and scalloped 24b annular image which is provided by an embodiment of the present invention having a scalloped reflector surface, said image having three dimensional information through imaging the same subject matter 24c multiple times 24c, 24d, 24e from different vantage points 47e, 47f, 47g, on the optical system.

Figure 25:
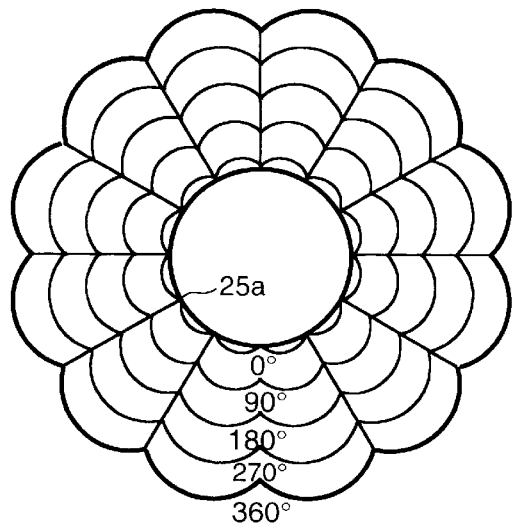

FIG. 25 is a simplified rendering of the redundant angular distribution and full sphere coverage in a sectored and scalloped annular image which is provided by an embodiment of the present invention having a torroidal 25a and scalloped reflector surface 101b, said image having three dimensional information.

Figure 26:
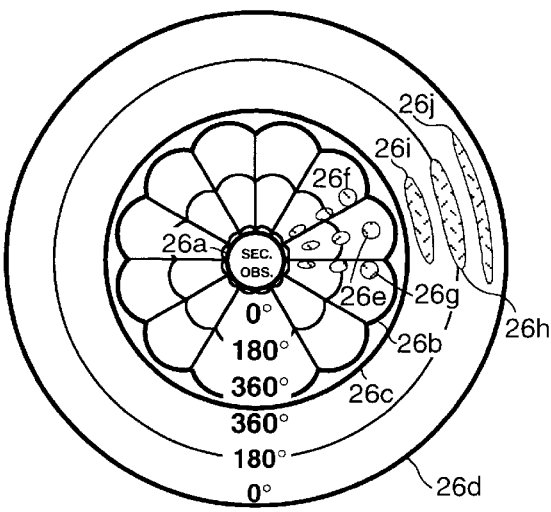

FIG. 26 is a rendering of triple redundant full sphere coverage having three dimensional information in all axes which is provided by a Cassegrain embodiment of the present invention having a torroidal scalloped primary reflector 26a, 100b or refracting surface 95a, 96a, 103a and a radially enlarged annular wide angle reflector surface 26d, 46c around its secondary reflector surface 26c, 100c also showing the imaged appearance of spherical objects in the field of view which each occupy about 30 degrees when seen from the center of the optical system, each of said objects being imaged three to four times depending on their location, as illustrated by features 26e, 26f, 26g, and 26j.

Figure 27:
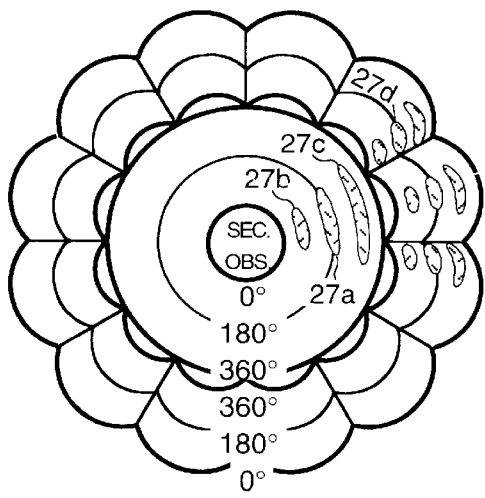

FIG. 27 is a rendering of redundant full sphere coverage having three dimensional information in all axes which is provided by a Cassegrain embodiment of the present invention having a primary reflector surface 27a, 99a and radially enlarged annular torroidal scalloped reflector 27d, 99e or set of reflector surfaces which surround the secondary reflector 99c, also showing the image appearance of spherical objects 27a which each occupy about 30 degrees when observed from the center of the optical system.

Figure 28:
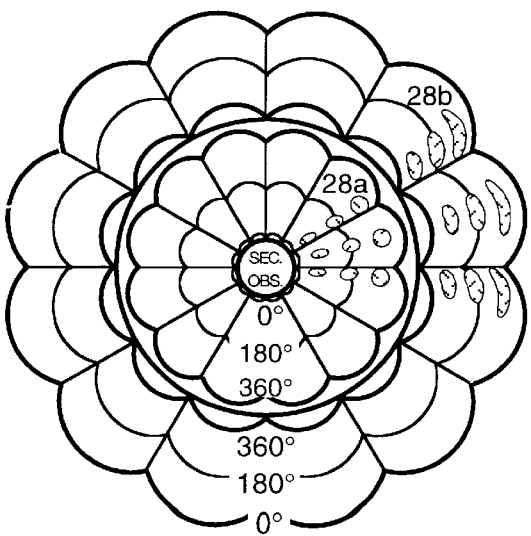

FIG. 28 is a rendering of the quadruple redundant full sphere coverage having three dimensional information in all axes which is provided by a Cassegrain embodiment of the present invention having a scalloped primary reflector 28a, 100b and a radially enlarged annular torroidal scalloped reflector 28b, 100e or set of reflector surfaces which surround the secondary reflector 100c, also showing the redundantly imaged appearance of spherical objects in the mutual fields of view which each occupy about 30 degrees when observed from the center of the optical system, said objects being imaged four to six times, depending on their location.

Figure 29:
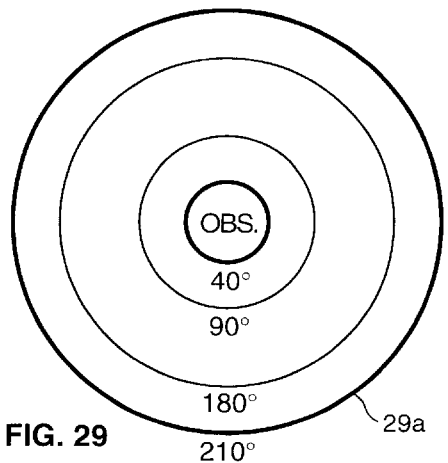
FIG. 29 is a rendering of an annular image provided by prior art. In this case, a convex reflector in a glass tube.

FIG. 29 is a rendering of an annular image provided by prior art. In this case, a relatively shallow convex reflector in a glass tube, as in the apparatus of the presently known Spiratone Birds Eye attachment.

Figure 30:
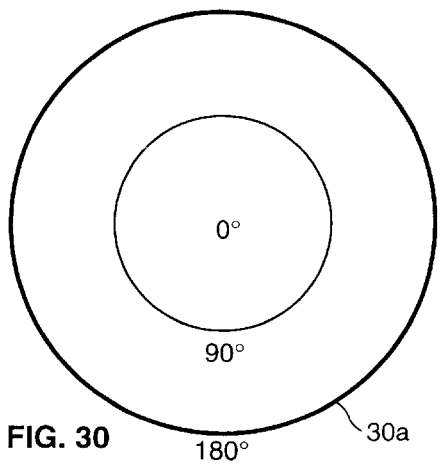
FIG. 30 is a rendering of a circular image provided by prior art. In this case, a 180 degree fisheye lens.

FIG. 30 is a rendering of a circular image provided by prior art. In this case, a typical 180 degree fisheye lens having equidistant projection characteristics.

Figure 31:
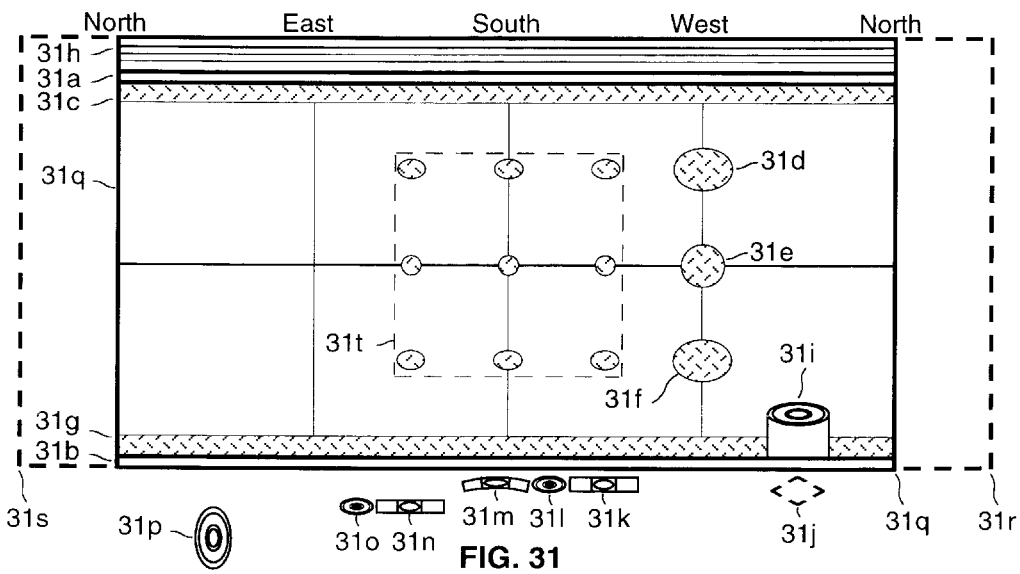
FIG. 31 is a rendering of the angular distribution and subject matter of FIG. 22 after it is transformed from a circular to a rectangular format.

FIG. 31 is a rendering of the angular distribution and subject matter and instrumentation from the image of FIG. 22 after said image is transformed from a circular to a rectangular format, showing the imaged appearance of said subject matter and instrumentation. Line 31q in the present figure corresponds to line 22q in FIG. 22. Broken lines 31r and 31s illustrate how the 360 degree image can be extended by repeating image data from opposite ends of the image.

Figure 32:
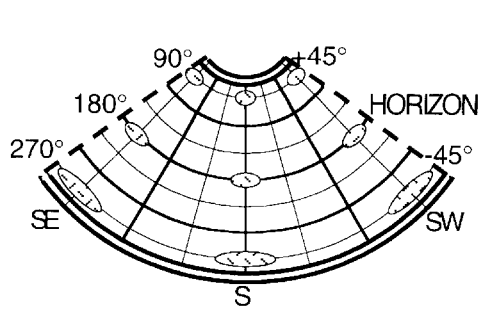
FIG. 32 is a rendering of the angular distribution of a 110 degree segment of FIGS. 5 or 22, also showing the field limit indication provisions of FIGS. 8 or 22.

FIG. 32 is a rendering of the angular distribution of a 110 degree segment of the image of FIGS. 5 or 22, also showing the field limit indication provisions shown in FIGS. 8 or 22 and the imaged appearance of spherical objects which each subtend an angle of about 10 degrees relative to the center of the optical system.

Figure 33:
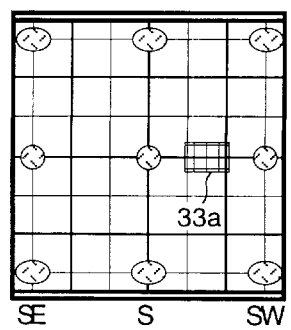
FIG. 33 is a rendering of the angular distribution and subject matter of FIG. 32 after it is transformed from a circular to a rectangular format.

FIG. 33 is a rendering of the angular distribution and subject matter of area 31t from FIG. 31 or the angular distribution of the subject matter of FIG. 32 after it is transformed from a circular to a rectangular format.

Figure 34:
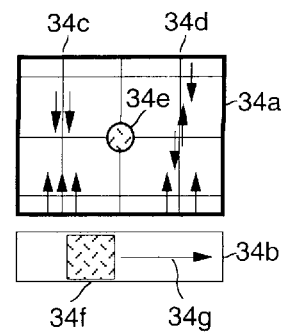
FIG. 34 is a rendering of a small segment of the angular distribution of a small section of any of FIGS. 1 through 29 after transformation from a circular to a rectangular format. Arrows represent interlaced and progressive frame update scanning of all or part of a full motion transformed image from the referenced figures.

FIG. 34 is a rendering of the angular distribution of a small section of any of FIGS. 1 through 29 after transformation from a circular or annular polar coordinate image to rectangular coordinate image. The arrows in the top and bottom parts of the figure represent some interlaced and progressive frame update scanning methods which also form a part of the invention and are applicable to all or part of a full motion or lap dissolve image which results from transforming a series of images from the optical system of the present invention or from any of the images represented in FIGS. 1 through 29.

Figure 35:
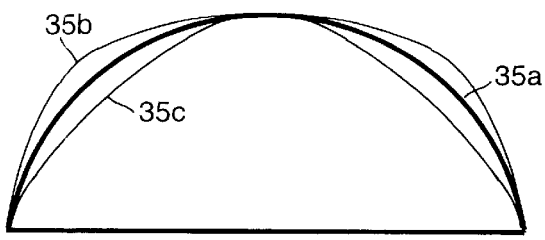
FIGS. 35 through 43 are simplified side outline views of spherical, aspheric, and radially compressed or expended reflector figures. These figures are applicable to refracting and reflecting surfaces, but reflector surfaces are typically described due to their application to many embodiments of the present invention.

FIG. 35 is a side outline view of a hemispherical reflector surface 35a. Also shown are is a comparison to other optical figures which may be used in the optical system of the present invention, said optical figures having local radii of curvature which effectively decrease 35c or increase 35b inside and outside of the zone used to image the plane of a flat horizon when the optical system is used vertically, whereby subject matter near the horizon may be emphasized or de-emphasized in the reflected image.

Figure 36:

FIG. 36 is a side outline view of an oblate aspheric reflector. A virtual image formed by the reflection of subject matter in this type of a reflector surface has an angular distribution similar to that of FIG. 2.

Figure 37:
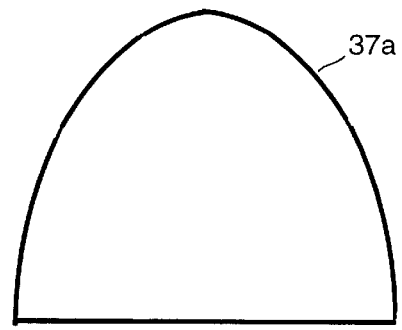

FIG. 37 is a side outline view of a convex prolate aspheric reflector having a large included angle of curvature. When imaged from an infinite distance, a suitable prolate aspheric reflector will provide a reflected image having an angular coverage and distribution similar to that shown in FIG. 3.

Figure 38:
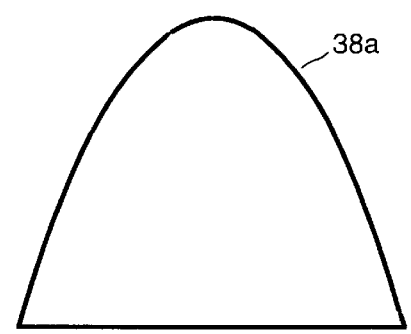

FIG. 38 is a side outline view of a strong convex hyperboloidal reflector. A virtual image formed by the reflection of subject matter in this type of a reflector surface has an angular distribution similar to that of FIG. 4.

Figure 39:
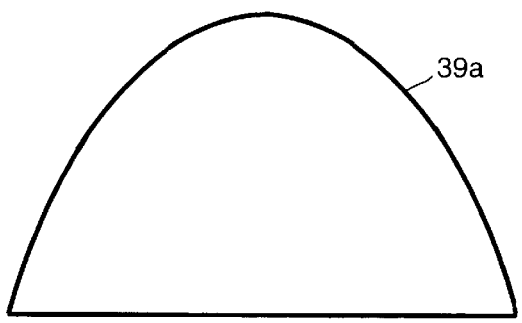

FIG. 39 is a side outline view of a convex paraboloidal reflector. A virtual image formed by the reflection of subject matter in this type of a reflector surface has an angular distribution similar to that of FIG. 5.

Figure 40:
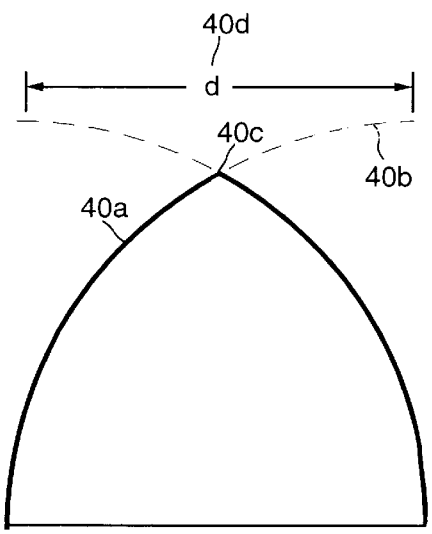

FIG. 40 is a side outline view showing the concept of a radially compressed optical figure. The shown reflector figure is radially compressed by the distance "d" 40d, and has a point 40c at its apex. An imaginary extension of outline 40a is indicated by broken line 40b.

FIG. 41 is a side outline view of a radially compressed reflector 41a having a point 41b at its apex and having a front 41c and rear 41d reflected field of view less than that of a reflector having more included curvature, thereby providing a virtual image having greater radial image scale, wherein subject matter at zones away from the center 6b is imaged with minimal distortion. A virtual image formed by reflection of subject matter in this type of a reflector surface has an angular distribution similar to that of FIG. 6.

Figure 42:
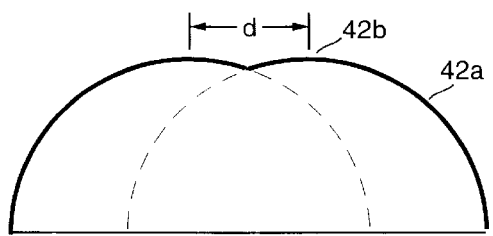

FIG. 42 is a side outline view showing the concept of a radially enlarged optical figure. The figure of the shown reflector 42a is radially enlarged by the distance "d".

Figure 43:
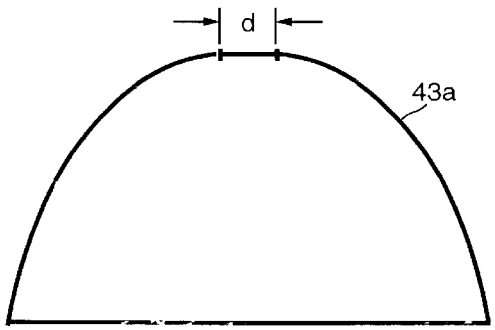

FIG. 43 is a side outline view of a prolate aspheric reflector having a radially enlarged figure. The shown reflector 43a is radially enlarged by the distance "d".

Figure 44:
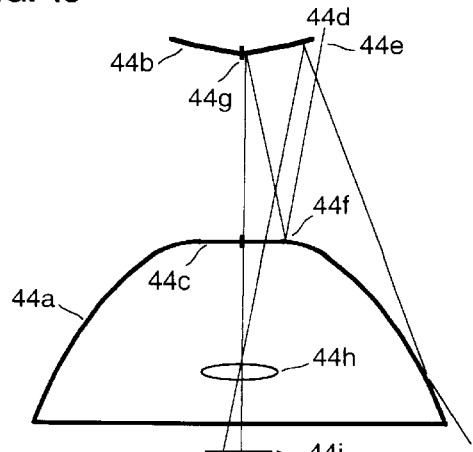
FIGS. 44 through 46 are side outline views of compound (e.g. "Cassegrain") wide angle optical systems which include reflectors having radially compressed or enlarged figures.

FIG. 44 is a side outline view of reflective elements of a Cassegrain wide angle reflector system having a radially enlarged primary reflector FIG. 44a and a radially compressed secondary reflector FIG. 44b with a point 44g at its apex. This embodiment is capable of providing an image such as that of FIG. 6, wherein the secondary reflector obstruction is not imaged. When a sufficiently small secondary reflector having a suitable degree of radial compression is used with a torroidal primary reflector 45a or reflector surface 69b, 73i having an inner limit of coverage 44f, 45e that is larger than said secondary reflector, the resulting image may have uninterrupted frontal coverage 45c all the way to an axial point 13i a finite or infinite distance from the front of said primary reflector, said axial point being imaged as a point in the center of the image, thereby providing continuous central coverage like that of a conventional lens, said coverage being part of the contiguous wide angle coverage of the overall optical system.

Figure 45:
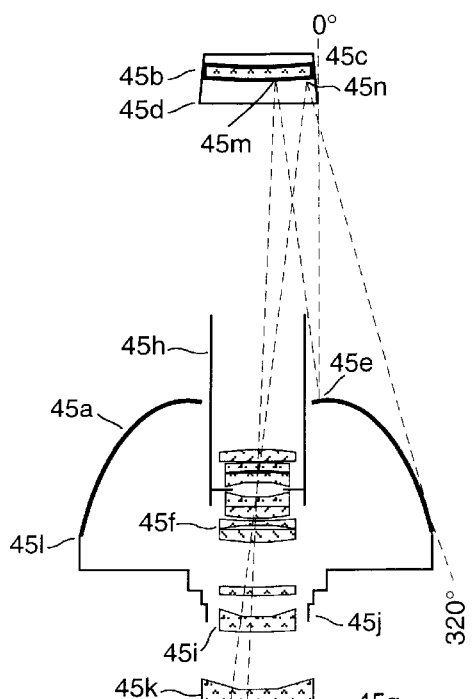

FIG. 45 is a side cross sectional view showing major elements of a Cassegrain wide angle reflector having a torroidal primary reflector 45a, a small convex secondary reflector 45b, imaging 45f and correcting 45i optics, and a field flattening element 45k near the focal surface 45g. The shown secondary reflector 45c and its baffle 45d are smaller than the zone 45e of the primary reflector 45a which corresponds to the inner limit of coverage, thereby facilitating uninterrupted coverage all the way to an axial point 13i in front of said primary reflector.

Figure 46:
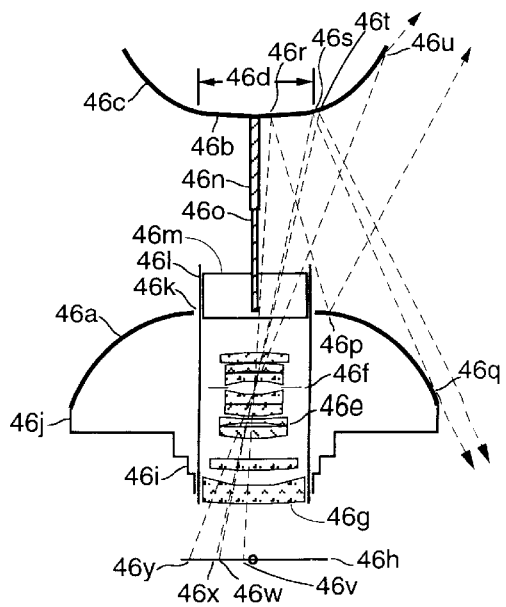

FIG. 46 is a side cross sectional view showing major elements of a Cassegrain wide angle reflector having a convex radially enlarged primary reflector 46a, a secondary reflector 46b, an annular radially enlarged reflector 46c surrounding said secondary reflector, large aperture or fast f/ratio imaging optics 46e having aperture adjustment means 46f, and a field flattening element 46g near the focal surface 46h. Subject matter reflected from zone 46p on the primary reflector 46a is reflected from zone 46r on the secondary reflector and imaged at zone 46v in the annular image at the focal surface 46h. Subject matter reflected from zone 46q on the primary reflector is reflected from zone 46s on the secondary reflector and imaged at zone 46w in the annular image. Subject matter reflected from zone 46t on the annular reflector surface having a figure that is radially enlarged by distance 46d and which surrounds the secondary reflector 46b is imaged at zone 46x in the annular image. Subject matter reflected from zone 46u on the annular reflector is imaged at zone 46y in the annular image. In the shown embodiment, the combination of the secondary reflector and annular reflector is supported by an axial strut 46n having more than one diameter 46o, said strut being supported by an optically clear substrate 46m in a cell 46l and baffle tube which protrude through a hole in the center of the primary reflector surface. Alternate support means for the secondary and annular reflector surfaces include an off-axis structure of a solid optical substrate.

Figure 47:
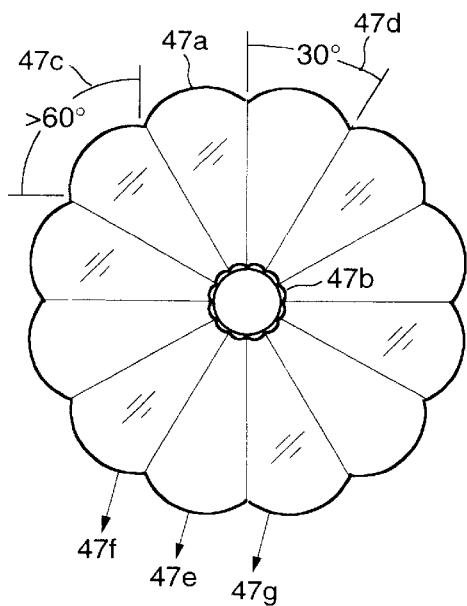
FIGS. 47 through 49 show reflectors having scalloped surfaces.

FIG. 47 is a front view of a scalloped reflector 47a having a central hole 47b, each scallop of said reflector having an included angle of curvature 47c that is more than twice the angle of circumference 47d each scallop occupies on the overall reflector, whereby subject matter in a given direction 47e is imaged at least twice, each image thereof being captured or projected from a different vantage point 47e, 47f, 47g to provide three dimensional information.

Figure 48:
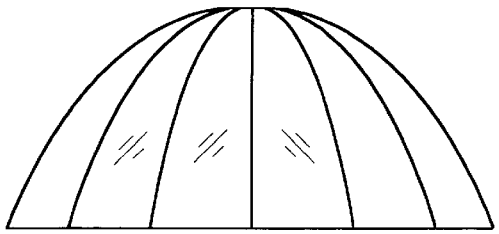

FIG. 48 is a side outline view of a convex reflector having a scalloped figure.

Figure 49:
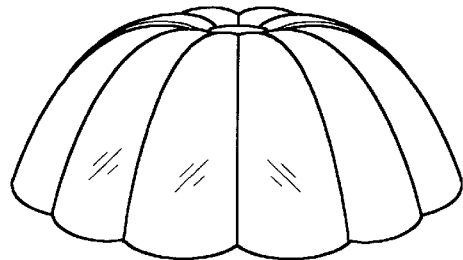

FIG. 49 is an oblique pictorial view of a torroidal convex reflector having a central hole and a scalloped optical figure.

Figure 50:
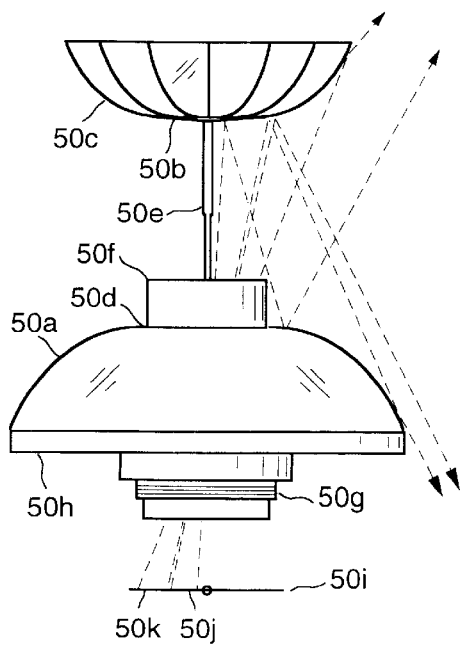
FIGS. 50 and 51 show compound optical systems which each have at least one reflector with a scalloped surface.

FIG. 50 is a compound or "Cassegrain" wide angle optical system having a primary 50a and secondary reflector 50b similar to those of the optical system of FIG. 46, but in which in which said secondary reflector is surrounded by an annular reflector 50c having a scalloped optical surface.

Figure 51:
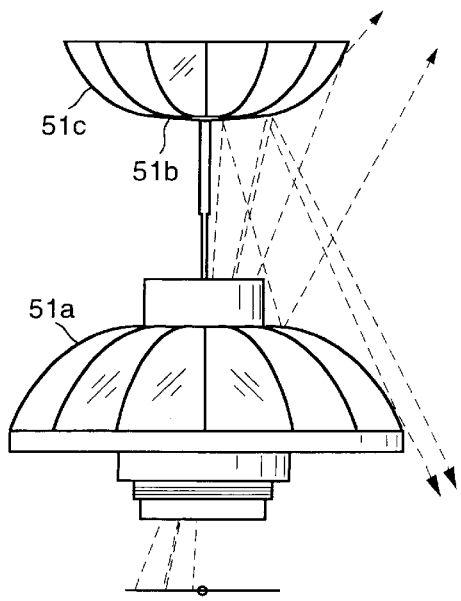

FIG. 51 is a compound optical system in which the primary reflector 51a has scalloped surface and the secondary reflector 51b is surrounded by an annular reflector 51c or reflector assembly having a scalloped surface.

FIG. 52 is a cross sectional view of the elements in a 180 degree fisheye lens such as that which is common in the prior art, said lens system having a strongly curved front element 52a and a set of rear elements 52b which form a real image and substantially correct off-axis aberrations that result from large angles of refraction toward the edge of the field of view of said front element.

FIG. 53 is a side view of the Spiratone (R) Birds Eye (TM) attachment which is common in the prior art and which consists of convex reflector 53a, a glass cylinder 53b, a positive close up lens, and mechanical mounting components.

FIG. 54 is a side cross sectional view of a Cassegrain axial strut wide angle reflector similar to which is the subject of FIGS. 6 through 12 of the applicant's U.S. design Pat. No. D312,263.

FIG. 55 is a front (or top) view of a preferred compound or two reflector "Cassegrain" embodiment of the optical system of the present invention, showing the outer surface 55a of its optical substrate, the secondary reflector cell 55b, and axial 55c and off-axis 55d tilt indicators.

FIG. 56 is a rear (or bottom) view of the Cassegrain embodiment of the apparatus of FIG. 55, also showing the rear cell 56a, imaging optics 56c, aperture adjustment means 56d, interface means 56b for a camera, projector, or similar article, and a removable off-axis tilt indicator 56f which fits in a slot 56e in the rear of the optical housing.

FIGS. 57 through 80 and 83 through 86 are simplified side cross sectional and pictorial views of compound or "Cassegrain" catadioptric embodiments of the optical system of the present invention in which the primary and secondary reflector surfaces are inside surfaces of an optical substrate, said optical substrate occupying the space between said primary and secondary reflector surfaces and the outer refracting surface thereof typically providing modification of the field of view of said primary reflector surface. Cross section lines are not shown in the solid optical substrate of most embodiments in order to permit approximate ray traces to be illustrated more clearly.

FIGS. 57–59 and 61–80 illustrate optical systems of the present invention having two internal reflector surfaces. The optical systems are each typically comprised of a solid optical substrate having a convex outer refracting surface 57a, 62a, 63a, 66a, 88a, that covers most of the front 63r, 66y and side 63s, 66z of said substrate. The substrate also includes an internal convex primary reflector surface 57b, 62b, 63b, 66b, having radial symmetry. The primary reflector surface is in optical communication with a great circle 4a, 13d, 21j, 63k, 64h, 68a, 165h surrounding it, the plane of said great circle being perpendicular to the optical axis 13m, 57m, 62m, 63q, 66aa of the optical system, said optical communication being through the outer refractive surface 57a, 62a, 63a, 66a, 88a of said optical substrate. The primary reflector surface has sufficient curvature to be in optical communication with a substantial angular area in front of 9a, 10a, 13g, 57h, 62k, 63l, 66t, 70bb and behind 9b, 10b, 13j, 57i, 62l, 63m, 66u, 70cc the plane of the great circle intersecting its surface. The primary reflector surface also has an optically transparent or partially reflective central zone 57d, 62g, 63g, 66d, 70g which permits light to pass through the rear central surface of the solid optical substrate.

The optical substrate further comprises an internal secondary reflector surface 57c, 62f, 66c, 70h or a separate secondary mirror 63d, 88c having radial symmetry, said secondary reflector surface being coaxially disposed in front of said primary reflector surface 57b, 62b, 63b, 66b and having its reflective surface facing said primary reflector surface. The secondary reflector surface is in optical communication with the great circle surrounding the primary reflector surface and the angular area in front and behind the plane of said great circle by means of reflection from said primary reflector surface and refraction through the outer surface 57a, 62a, 63a, 66a, 70a, 70bb, 70cc, 88a of the optical substrate, whereby said optical system produces a virtual image near points 65w, 66v, 78q of said great circle and said angular area above and below its plane, said virtual image being annular and visible from a vantage point 57e, 62h, 63i, 66h, 70n behind the optically transparent central zone of said primary reflector. The vantage point is then in optical communication with the great circle surrounding the optical system and the angular area in front and behind the plane of said great circle by means of reflection from the secondary reflector surface 66c, 70h and the primary reflector surface 66b, 70f and refraction through the outer surface of the optical substrate 66a, 70a.

The outer refracting surface 66a and the reflector surfaces may be surfaces of revolution or they may have scalloped optical figures such as those shown in FIGS. 24 through 28 and 95 through 104 which provide for redundant imaging, said redundant imaging being applicable to disciplines which include three dimensional imaging and projection.

A preferred embodiment of the invention further comprises means for mounting the solid optical substrate, said means for mounting providing a protective shield 66r, 99g, 102g behind the perimeter of said optical substrate and providing means for handling the optical system without touching its optical surfaces; said means for mounting also providing stable support and alignment of said substrate without causing deformation thereof. Means for mounting the optical substrate or system facilitate use of said substrate or system in any orientation and provides for attachment of said substrate or system to an article having a focal surface.

In order to provide a real image of the virtual image which is provided by the solid optical substrate, a preferred embodiment of the invention is associated with or incorporates a refracting lens system, said refracting lens system being disposed coaxial to said optical system, and both being associated with the formation of a real image of said virtual image at said focal surface, whereby the overall optical system when combined with said article having a focal surface facilitates the optical geometric conversion of the previously mentioned great circle surrounding the optical system and the area in front and behind the plane of said great circle into a real annular image at the focal surface of said article, or the geometric conversion of a two dimensional annular image into a three dimensional projected image.

In projection applications, the projected image may be projected onto a three dimensional surface which surrounds the invention or into three dimensional media.

Where the application of the optical system permits, the figure of the outer refracting surface is optimized to minimize flare and ghost images. The outer refracting surface and other refracting surfaces and components may have anti reflection coatings. Light baffles are provided by means including blackened annular bores in the optical substrate, coatings that are applied to the optical substrate, or attached parts.

The entire area of the reflecting surfaces in a preferred embodiment of the invention are not oriented in a way that will facilitate imaging by means of total internal reflection. Therefore, the internal convex primary reflector surface and the secondary reflector surface have reflective coatings which facilitate efficient reflection at a wide range of incident angles which include those not subject to total internal reflection. In most embodiments, a zone that would otherwise be at the angle of transition to total internal reflection typically exists on the primary reflector surface, so the reflective coating has sufficient density to prevent visible interference fringes at said zone.

In order for the optical system to effectively "see around" the secondary reflector and any related baffling and thereby increase the angle of view toward the front of the invention, the outer refracting surface of the optical substrate has up to a substantial angle of incidence to the light path at a zone just outside the perimeter of the secondary reflector surface and any related baffle, whereby a greater angle in front of said substrate or even axial point disposed finite distance in front of said substrate is imaged by means of being in optical communication with the primary reflector surface by means of refraction through said zone in said substrate, thereby extending the angle of view up to all the way around an axial point in front of the invention.

In order to increase the angle of view behind the invention, the outer refracting surface of the optical substrate extends to a longitudinal position behind that of the utilized perimeter of the primary reflector surface and has up to a substantial angle of incidence to the light path at a zone outside and behind said utilized perimeter of said primary reflector surface, whereby a greater angle behind said substrate or even an axial point a finite distance behind said substrate is imaged by means of being in optical communication with said primary reflector surface by means of refraction through said zone in said substrate, resulting in coverage up to all the way to an axial point behind the invention.

Where the front part of the outer refracting surface of the forgoing embodiment also refracts light from an inner zone on the primary reflector surface to an axial point in front of the optical substrate, the invention provides an image of up to the entire sphere around itself. Stronger curvature on the primary reflector surface can reduce or eliminate reliance on refraction to extent the field of view and thereby facilitate coverage of up to an entire sphere even in cases where the invention is immersed in liquid. In such an embodiment, the outer refracting surface is typically wider near its longitudinal center than it is at either end.

In cases where one or more zones of the outer refracting surface of the optical substrate refracts light to a significant degree, aberrations which include lateral chromatic aberration can result in the virtual image. This may be corrected by optimizing the corresponding zone of the transparent area in the center of the primary reflector surface to provide an equivalent angle of refraction in the proper direction. This is most practical when the imaging optics behind the central transparent area are relatively distant or have an aperture which is relatively small in relation to said central transparent area of the optical substrate.

Small aperture imaging optics have a further advantage in that the tapered light pencil which exists between the imaging optics, the reflector surfaces, and the subject tends to have a smaller diameter, thereby utilizing a smaller part of each optical surface to image any given point of the subject matter, thereby reducing the degree of visible image defects. Imaging optics of a wide angle nature are advantageous in this regard in that they have a faster numerical f/ratio for a given image format and aperture diameter. In cases where larger aperture imaging optics are utilized, they may include optics which provide complete or supplemental correction of aberrations.

Where the outer refracting surface is utilized to extend the field of view toward both the front 70bb, 120h and rear 70cc, 120i of the optical substrate 70a, 120a, chromatic aberration in the virtual image may have opposite orientations toward the center and perimeter of the image. Such aberrations may be corrected through the use of annular or discontinuous optical figures in the optical substrate 120d or imaging or correcting optics 70p, 70q. Such figures may be similar in concept to a Schmidt corrector, but they are typically have a more significant curvature.

Other optical elements or surfaces which may be utilized in the correction of chromatic aberration include one or more elements 90d between the a separate secondary reflector 90c and the optical substrate 90a; elements 69j, 73e, 123g between the optical substrate 69a, 73a, 123a or a reflector 161a and imaging optics 69k, 73f, 123i 161f; or elements 69m, 69n, 70p, 70q, 139jj, 159d between imaging optics 69k, 70m, 139ff, 159c and a focal surface 69y 70r 139q 159e. These surfaces may also be utilized in the correction of other aberrations which include astigmatism. Furthermore, the secondary reflector 73c, 80c, 82b, 88c, 89c, 90c, 162d, and a combination of other optical elements or surfaces 73a, 73d, 80a, 80f, 82a, 82d, 88a, 88d, 89g, 89h, 90d, 90e, 162a, 162c, are applicable to the correction or control of various aberrations.

One of the simplest means to provide correction of chromatic aberration is to fabricate the optical substrate so that the incident angle of light utilized in the image is increased toward the outer zones. More particularly, the outer refracting surface the solid optical substrate of such an embodiment is nearly perpendicular to the light path at a zone just outside the perimeter of the secondary reflector surface and any related baffle, whereby lateral chromatic aberration at said zone is negligible, whereby lateral chromatic aberration in the virtual image from the overall system will increase as a function of off-axis distance. This facilitates correction of lateral chromatic aberration with relatively conventional correcting optics (including those which are used to correct chromatic aberration in the front element of a fisheye lens) or by separating a real image into separate colors and individually scaling each color separation.

Local correction of chromatic aberration by means of reducing the angle of incidence to incoming or outgoing light at a zone in the optical substrate which is near the perimeter of the secondary reflector reduces the degree to which refraction at said zone may be utilized to extend the field of view toward the front of the substrate. An alternate or supplemental means of increasing the angle of view toward the front of the substrate is to reduce the size of the secondary reflector and any related baffles; however, reduction of the secondary reflector diameter is only useful up to the point where the inner zone of the reflective coating of the primary reflector surface immediately surrounding a central transparent area therein begins to become the limiting factor. At this point, the angle of reflection on the primary reflector at a zone just outside its central transparent area will establish the inner boundary of the annular image.

Yet another means of increasing the field of view is provided by radially enlarging the figure of the primary reflector surface. This permits the primary reflector surface to be closer to perpendicular with the optical axis at a zone which immediately surrounds its transparent central zone, whereby a vantage point behind said transparent central zone of said primary reflector surface is in optical communication with a greater angular area toward the front of the optical substrate, thereby reducing the size of the central angular exclusion zone in front of said primary reflector surface, said radially enlarged primary reflector surface also permitting said transparent central zone to be enlarged without affecting the field of view, thereby permitting the use of large aperture refracting optics.

The shape of the outer refracting surface, the primary reflector surface, the secondary reflector surface, and other optical surfaces or elements influence the global and local radial scale of the final image. In order to obtain an image which does not have excessive radial compression toward the outer zones, the primary reflector surface comprises a prolate aspheric figure which may be continuous or radially enlarged or compressed, or otherwise modified. In principle, a prolate aspheric reflector has a radius of curvature which, in effect, progressively increases toward its outer zones. By contrast, spherical reflector has a constant radius of curvature. A prolate aspheric figure such as a paraboloid or hyperboloid will provide a constant radial image scale. Here, the viewing distance will determine the exact figure which will result in a constant radial image scale.

In embodiments where the outer refracting surface is utilized to extend the field of view of the primary reflector, refraction through said refracting surface can result in radial compression of the image which would not occur otherwise. This is partly counteracted in cases where the central transparent area in the primary reflector surface is utilized in the correction of chromatic aberration due to the local angle of refraction; however, the compression is not usually counteracted to the same degree when additional optical elements are utilized in the correction of chromatic aberration. In order to more fully compensate for the radial compression which results by refraction, a stronger prolate aspheric figure is used for the primary reflector surface.

In applications where it is desirable to limit the radial field of view in order to provide more radial image scale on a given format, the primary reflector or appropriate other optical surfaces are radially compressed inward toward the optical axis. Where the primary reflector figure is radially compressed, its surface is farther from being perpendicular with the optical axis at a zone which immediately surrounds its transparent central zone, whereby the vantage point behind said transparent central zone of said primary reflector surface is in optical communication with a smaller angular area in front of (or behind, in some embodiments) a great circle which surrounds the invention and is on a plane perpendicular to the optical axis, thereby increasing the size of a central angular exclusion zone in front of said primary reflector surface while minimizing the physical size of said obscured area imaged at said focal surface, thereby increasing radial proportions of the imaged area surrounding the plane of said great circle, thereby resulting in a larger radial image scale for said covered area on a given image format. A radially compressed figure also increases radial image scale by reducing the imaged size of any central obscuration area.

The present invention is an improved means for imaging or projecting a field of view which is omnidirectional. The present invention achieves the result of an omniramic or omnidirectional virtual image such as those shown in FIGS. 1 through 29, said images having a distribution similar to a polar map projection and being imaged by means of a solid optical substrate 13a, 70a having outer refractive surface 70a, said surface typically being convex; an internal convex reflector surface 70f; and in some embodiments, an internal secondary reflector surface 70h, said surface typically being convex; and refraction through said solid optical substrate at the axial surface 70g closest to a focal surface 70r; whereby said virtual image is visible from an axial vantage point 70n outside of said optical substrate through said axial surface 70g closest to a focal surface.

Correcting optics or optical surfaces are utilized on most embodiments, said correcting optics typically correcting for curvature of the virtual image 69x; and aberrations including astigmatism which results from low angle reflections 66bb from the primary reflector surface 66b and refraction through the front and rear extremes 66u, 70cc of the outer surface of the solid optical substrate 66a, 70a; and lateral chromatic aberration resulting from refraction through the front 66t, 70bb and rear 66u, 70cc zones of the outer surface of said solid optical substrate.

Imaging optics 65l, 117g are utilized between the exit aperture 65d, 117d of the solid optical substrate and a focal surface 65n, 117h in embodiments providing a real image of the subject matter surrounding the optical system at said focal surface by imaging said virtual image at said focal surface, said virtual image which is typically beyond the surface of the apex of the secondary reflector surface, said virtual image being a reflection of the virtual image behind the apex of the primary reflector surface; said virtual image behind the apex of said primary reflector surface being imaged directly by said imaging optics in embodiments not having a secondary reflector surface. Correcting optics in most embodiments are typically integrated with imaging optics in some embodiments of the invention which provide a real image at a focal surface.

In some embodiments, the secondary reflector surface 66c, 82b, 88c, 102c is utilized to control off-axis aberrations which include astigmatism, said figure being hyperbolic in some embodiments, said hyperbolic figure being effective in the control of astigmatism with some combinations of a primary reflector surface and outer refracting surface, provided the other reflective surface and the outer refracting surface are configured to compensate for the radial distribution of the image which would otherwise result from said secondary reflector surface; said means for control of astigmatism being analogous to the control of some off-axis aberrations in a Cassegrain telescope, except that the light cone for any given imaged point in the subject matter utilizes a relatively small part of each reflector in the present invention rather than utilizing almost the entire reflector surface as in the case of said Cassegrain telescope; said correcting means resulting in coma in some cases, said coma being corrected with a commercial coma corrector or a similar optical system.

Refracting optics and the outer refracting surface of the substrate are applicable to correction of aberrations in some embodiments, particularly those not having secondary reflector surface, said refracting optics having characteristics similar to those in a fisheye lens, sans its front element, said characteristics most resembling elements behind the front element of a fisheye lens having a shallow curvature on the front optical surface of said front element.

In most embodiments, the outer refracting surface reduces astigmatism at a given angle of view by means of extending the field of view of the primary reflector surface, thereby causing the angle of reflection at outer zones of said primary reflector surface to be closer to perpendicular to its surface. Appropriate utilization of said outer refracting surface of said solid substrate can also result in a reduction in distortion of the entrance pupil of the overall optical system, particularly in embodiments covering less than a full sphere, wherein said refracting surface or a separate refracting element either reduces or increases the coverage of said primary reflector, with a decrease in coverage being applicable to reducing the distance between the 180 degree zone of entrance pupils for systems utilizing two opposing optical systems.

Angular distribution of the image is influenced by all of the optical surfaces, with the figure of the primary reflector surface and outer refracting surface having the greatest influence; many of the preferred embodiments producing an image having a constant radial image scale, said embodiments typically utilizing a prolate aspheric primary reflector surface;

The present invention utilizes the elegance of a solid optical substrate 57a, 63a, 70a for optical surfaces utilized in the formation of a virtual image 65w, 66x of subject matter surrounding it, said substrate also providing alignment and protection of the reflector surfaces.

The present invention provides a wider field of view than external reflector systems or the Peri-Apollar by means of utilizing the outer surface 70bb of its optical substrate to extend the field of view of an inner zone its primary reflector surface 70f toward the front of the invention 13g, and to extend the field of view 13j of an outer zone of its primary reflector surface by means of refraction from the outer surface 70cc of said substrate, thereby enabling the invention to cover the entire sphere around itself. The solid optical substrate provides compactness and improved durability over many external reflector systems.

Some embodiments provide redundant imaging by means of a refracting optical surface or optical system that is in optical communication with a focal surface by means of a central transparent area in the center of the secondary reflector surface. The optical system further includes baffles to eliminate stray light and means to accurately indicate the limits of coverage in the image. A preferred embodiment for attended image capture also includes a grip surface to facilitate handling of the optical system without touching its optical surfaces; and means for attachment of accessories including those for the occultation of an excessively bright light source such as the sun to reduce or eliminate flare. The optical system is compatible with a wide array of cameras and other instruments by means of modular optical cells having compatibility with a plurality of common adapters and interfaces for articles having a focal surface. Said adapters may include one having interfaace threads with a 42 mm diameter and a 0.75 mm pitch.

The solid optical substrate is compatible with a wide array of fabrication modes and use in a wide range of applications and environments. In some embodiments, the area directly behind the optical system is redundantly covered by means of one or more auxiliary off-axis optical systems facing in the opposite direction of the primary reflector surface, said auxiliary optical system having relay optics and reflective means to produce a final image at the focal plane, said image being on a common surface with the annular image, disposed in the center of or immediately beside said annular image. Other areas may be covered by an auxiliary optical system through the use of pointing means which include a steerable housing to facilitate redundant imaging of selected off-axis subject areas at various image scales.

A basic embodiment of the present invention utilizes a convex reflector surface. This results in exclusion of a conical area in front of the primary reflector surface, which is caused by obscuration by a secondary reflector surface 66c, a baffle 66x, a camera 177k, or a transparent zone 66d in the primary reflector surface.

A front exclusion zone is completely eliminated by means of a torroidal primary reflector surface and a small convex secondary reflector or reflector surface having a diameter less than the diameter inside of the apex of the torroid of said primary reflector that is utilized for imaging central or axial subject matter. Elimination of the front conical exclusion zone is accomplished by redundantly imaging the part of the subject a finite distance directly in front of the primary reflector at the radial zone of the annular image circle which is closest to the center by means of a primary reflector having a torroidal figure combined with a secondary reflector assembly having a diameter smaller than the torroidal apex of said primary reflector. The remainder of the subject matter is progressively imaged toward the outer edge of the annular image. Optical surfaces used to accomplish this consist of a strongly curved convex primary reflector surface, a moderately convex secondary reflector surface, and rear imaging optics. The secondary reflector surface is in optical communication with both the primary reflector surface and the imaging lens system which is located behind a central transparent zone in said primary reflector surface.

A miniature version of the invention is applicable to articles such as medical instruments, dental instruments, bore sights or scopes, and other articles; the present invention being very useful for applications in the realm of laparascopic surgery, due to its omnidirectional field of view.

Images having various radial distribution characteristics are produced according to the profile of the internal reflecting surfaces and the external refracting surface(s) of the solid optical substrate. Some embodiments cover all the way to an axial point a finite distance in front of the primary reflector by refracting light around the secondary reflector surface and any associated baffles. Another does not cover the central area but there is little or no refraction toward central zones of its outer refracting surface, thereby minimizing or eliminating chromatic aberration, and particularly lateral chromatic aberration at said zones.

Where required, central coverage is provided by a central refracting optical system which is in optical communication with a focal surface or observational vantage point by means of a central transparent area in the center of the secondary reflector surface. Where a torroidal primary reflector surface is utilized, the inner zones of said primary reflector surface can be in optical communication with an axial point a finite distance in front of its surface with minimal or no refraction in the applicable zones of the outer refractive surface in an embodiment where said refracting surface is relatively perpendicular to the local light path, thereby reducing or eliminating lateral chromatic aberration at the applicable zones and facilitating central coverage even when the optical system is used under water or in other environments where it is physically immersed.

Embodiments not having a secondary reflector surface can utilize a central refracting optical system which is in optical communication with a focal surface or observational vantage point by means of a central transparent area in the center of the reflector surface to provide central coverage.

The invention is also applicable to a self-contained electronic or film imaging system, said self contained system being very advantageous in small embodiments having full sphere coverage, since the perimeter of a full sphere system having a contiguous image must be larger than the width of a camera or similar article which is used with it in order to prevent obscuration of the subject by said camera or article.

The invention is further associated with an electronic imaging sensor capable of exposure and readout without mechanical shuttering, said optical system being capable of imaging up to the entire sphere area around itself, said imaging being accomplished without the need for any moving parts.

Electronic imaging embodiments of the invention may also have the provision and interface capability to facilitate real time digital processing of at least 23 images per second, whereby said optical system may also be associated with an integral or separate full motion imaging system to provide immersive panoramic motion pictures.

Figure 57:
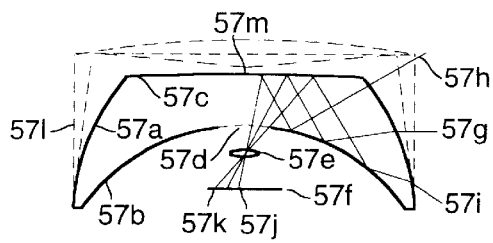
FIGS. 57 through 63 are simplified cross sectional views of basic embodiments of the present invention. In these and most of the following figures, cross section lines are not shown in the solid optical substrate of each embodiment in order to permit approximate ray traces to be illustrated more clearly.

FIG. 57 is a simplified side cross sectional view of a basic compound catadioptric embodiment of the optical system of the present invention in which the primary and secondary reflector surfaces are inside surfaces of an optical substrate and said primary reflector surface has a shallow curvature, said optical substrate having a truncated hemispherical figure and occupying the space between said primary and secondary reflector surfaces. A simplified view of imaging optics is shown at the rear are shown for illustrative purposes. The imaging optics provide a real annular image of the virtual image provided by reflective surfaces of the optical system. Approximate ray traces are shown for the inner and outer limits of coverage.

Figure 58:
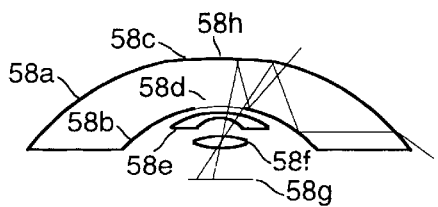

FIG. 58 is a simplified side cross sectional view of a compound catadioptric embodiment of the present invention in which the primary and secondary reflector surfaces are inside surfaces of an optical substrate, all of the optical surfaces of said substrate having relatively shallow curvature, said optical substrate having a spherical figure and occupying the space between said primary and secondary reflector surfaces. The transparent central area in the primary reflector surface in this and many other views is indicated as a thinner line than that used for the surrounding part of the optical surface.

Figure 59:
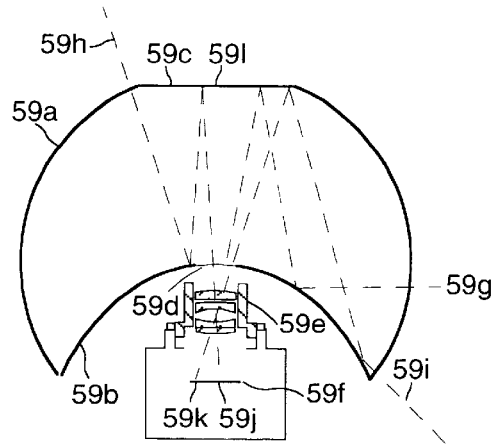

FIG. 59 is a simplified side cross sectional view of a basic compound embodiment of a catadioptric version of the optical system of the present invention in which the primary and secondary reflector surfaces are inside surfaces of an optical substrate, said optical substrate having a spherical outer surface.

Figure 60:
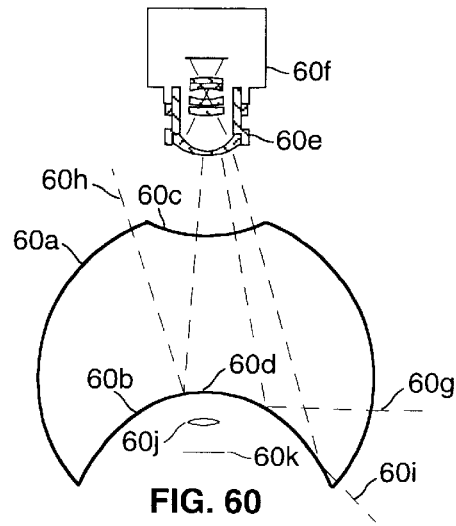

FIG. 60 is a simplified side cross sectional view of a basic embodiment of a catadioptric version of the optical system of the present invention in which the primary and secondary reflector surfaces are inside surfaces of an optical substrate, said optical substrate having a spherical outer surface.

Figure 61:
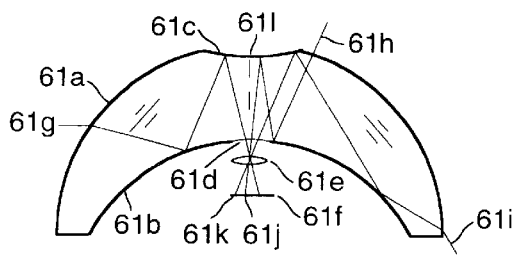

FIG. 61 is a simplified side cross sectional view of a basic compound embodiment of a catadioptric version of the optical system of the present invention in which the primary and secondary reflector surfaces are inside surfaces of an optical substrate, said optical substrate having a hemispherical outer surface.

Figure 62:
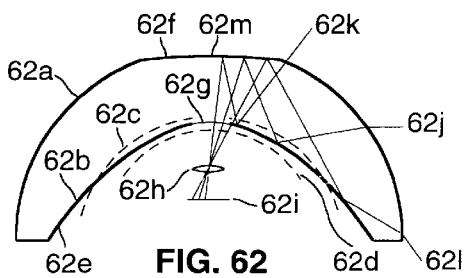

FIG. 62 is a simplified side cross sectional view of a basic compound embodiment of a catadioptric version of the optical system of the present invention in which the primary and secondary reflector surfaces are inside surfaces of an optical substrate, said optical substrate having a hemispherical outer surface and said secondary reflector being effectively concave.

Figure 63:
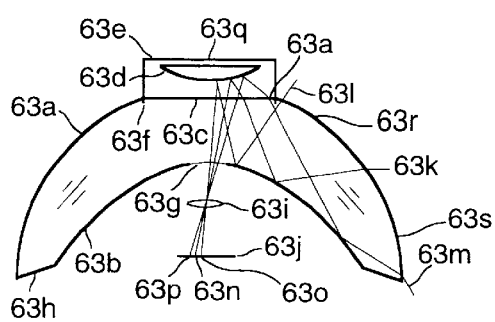

FIG. 63 is a simplified side cross sectional view of a basic compound embodiment of a catadioptric version of the optical system of the present invention in which the primary and reflector surface is the inside surface of an optical substrate and the secondary reflector is a separate optical component, said optical substrate having a hemispherical outer surface and said secondary reflector being convex. The part of the optical surface near the secondary reflector has a figure which compensates for chromatic aberration at its outer refracting surface. These optical surfaces may also be optimized to reduce aberrations including those from the reflecting surfaces and imaging lens systems. A flat or concave secondary reflector can be used in other embodiments, particularly if said secondary reflector is enlarged. The secondary reflector cell fits into an annular groove in the optical substrate and may be held in place with compliant adhesive. A cell may be attached entirely by adhesive means in the absence of such a groove.

Figure 64:
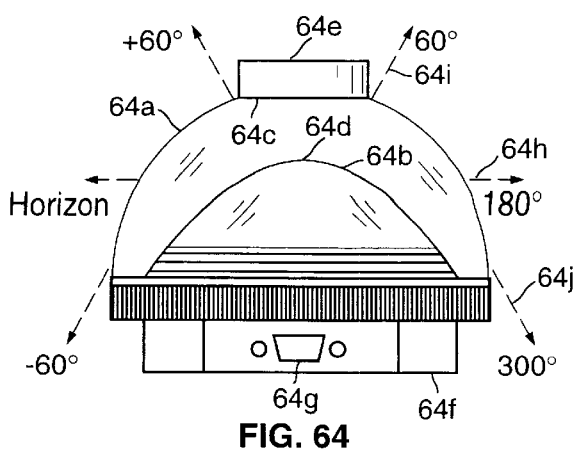
FIG. 64 is a pictorial view of the optical system of FIG. 63, also showing computer interface means. In this and other pictorial views, refraction of the outer refracting surface is not fully accounted for in the shown profile of the internal reflecting surface.

FIG. 64 is a pictorial view of the optical system of FIG. 63, also showing computer interface means.

Figure 65:
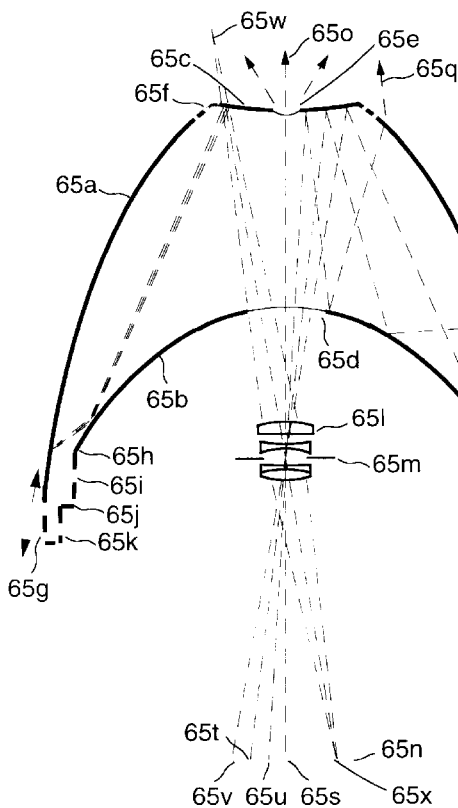

FIG. 65 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces and having a rearward extension which serves as a handling and mounting surface. The outer refracting surface of the optical substrate has a prolate aspheric or radially compressed figure and the central part of the secondary reflector surface has a refracting surface which acts as a wide angle lens or the front element of a wide angle lens to cover the area directly in front of the optical system. Imaging optics at the rear are shown for illustrative purposes and approximate ray traces are shown in broken lines.

Figure 66:
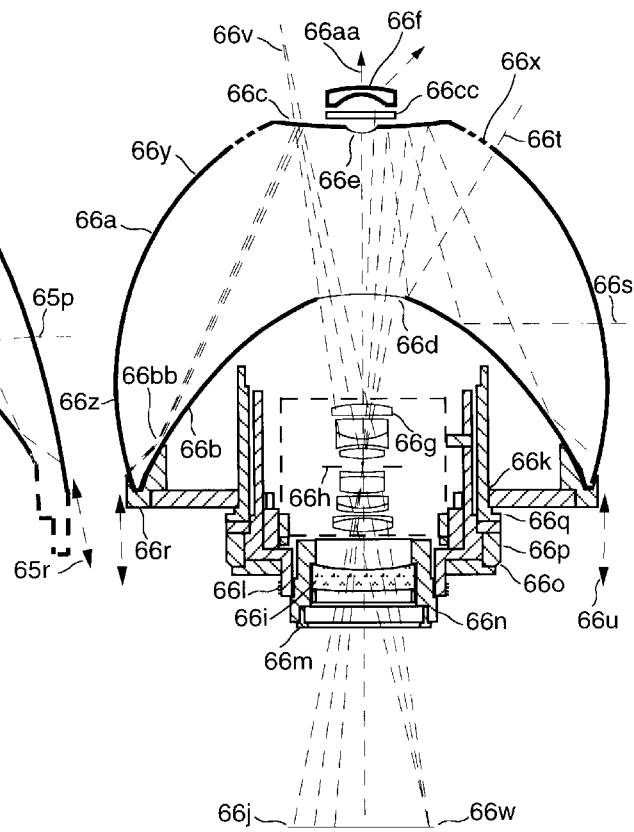

FIG. 66 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, the outer refracting surface thereof having a spherical or aspheric hyper hemispherical figure which extends the field of view of its primary reflector surface to cover the entire sphere around itself except for a conical area in front, the central part of the secondary reflector surface having transparent refracting surface which coincides with the area thereof that would otherwise be occupied by the reflection of a central hole in the reflective coating of the primary reflector, said transparent area in secondary reflector providing means for optical communication between imaging optics and a front central wide angle lens, the coverage of said wide angle lens being the same as the conical area excluded from the coverage of said primary reflector, whereby the overall optical system provides a circular 4 pi steradian image of the entire sphere around itself, the circular image from said wide angle lens being inside the annular image from the reflective elements of the optical system.

Longitudinal positioning of the central wide angle lens provides proper merging of the inner and outer images at different subject distances and lateral positioning thereof provides proper merging when subject matter at the transition zone is at more than one distance. Where the reflecting surfaces of the optical system are less efficient than the front central wide angle lens, said wide angle lens or associated optical surfaces may include neutral density filtration or be used with separate filters of various types. Imaging optics at the rear are shown for illustrative purposes and approximate ray traces are shown in broken lines.

Central or supplemental imaging is provided by means of a transparent area in the center of the secondary reflector surface. The transparent area may have an optical figure which is used to determine its effective field of view. The transparent area or its figure may also be supplemented by a front central lens system which is positioned in front of the central transparent area in the secondary reflector surface. Where the front central transparent area or lens system has a field of view that is the same or slightly larger than the angular exclusion zone in front of the secondary reflector, the central image therefrom may be merged with the surrounding annular image, providing a continuous field of view in a circular image versus an annular one.

In cases where it the image from the central optics would be brighter than that from the solid optical substrate, the central optics may incorporate neutral density filtration to equalize the brightness of both images. Where is desirable for the images of nearby subject matter to be properly merged, the central optics may include longitudinal positioning means for one or more elements to effectively widen their angle of view to a degree that they image all of the subject matter which is excluded in the image from the optical substrate.

Figure 67:
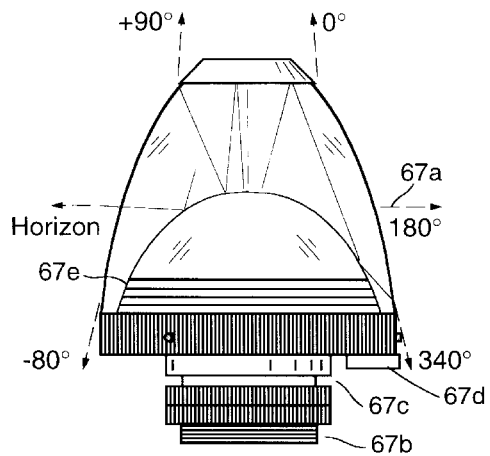

FIG. 67 is a side pictorial view of the optical system of FIG. 65, also showing interface means for a motion picture film camera, video camera, digital camera, laser, or similar article. The slot around the rear cell facilitates the attachment of accessories or storage in a case without any contact with optical surfaces.

Figure 68:
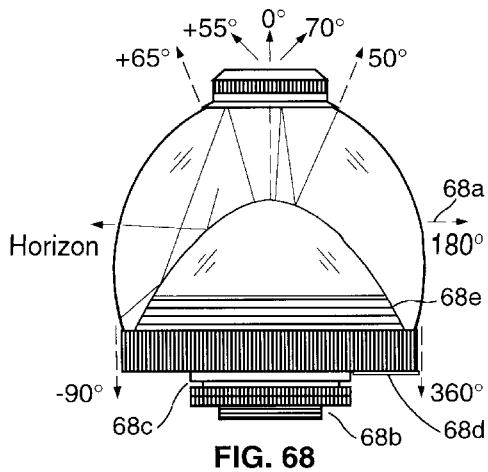

FIG. 68 is a side pictorial view of the optical system of FIG. 67, also showing interface means for a film camera, digital camera, or similar article.

Figure 69:
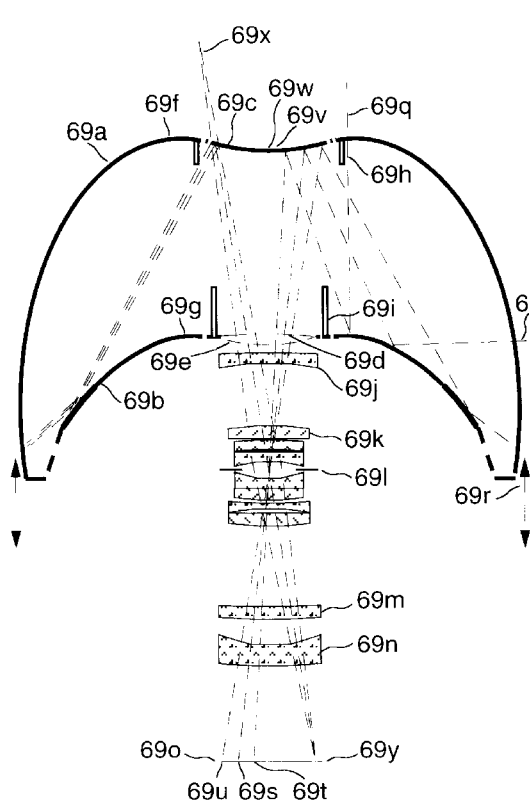

FIG. 69 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said primary reflector surface and the outer refracting surface of said optical substrate being torroidal, said outer refracting surface having a prolate aspheric figure and extending the field of view of the said primary reflector to provide full sphere 4 pi steradian coverage. Imaging optics and field flattening and correcting optics at the rear are shown for illustrative purposes and approximate ray traces are shown in broken lines.

Radial enlargement of the primary reflector surface provides means to increase the field of view all the way up to an axial point which is disposed at a finite distance in front of the optical substrate. In particular, when the primary reflector surface is radially enlarged a significant degree outward from the optical axis and its new figure is extended inward toward the optical axis, said primary reflector will become torroidal as a result of its surface curving backward in the zone surrounding the optical axis.

In embodiments where the secondary reflector surface, any related baffles, and the transparent central zone in the primary reflector surface are all smaller than the zone on the primary reflector surface that facilitates imaging from light that is parallel to the optical axis, the field of view will be increased all the way up to an axial point which is disposed at a finite distance in front of the optical substrate; whereby said vantage point behind said transparent central zone of said primary reflector surface is in optical communication with the entire area in front of said great circle up to an axial point disposed at a finite distance in front of the optical substrate, thereby eliminating the central angular exclusion zone in front of said primary reflector surface when said optical system is used in air or immersed in a liquid media, the only excluded area being confined to a narrow conical area extending from the perimeter of said secondary reflector surface and any associated mounting and shielding, to said axial point disposed a finite distance in front of the optical substrate. Where the outer refracting surface is also torroidal, there is little or no chromatic aberration at the zone immediately surrounding any central obscuration.

While a torroidal reflector provides coverage all the way up to an axial point in front of the optical substrate and may even provide redundant coverage of central subject matter, it does not necessarily reduce the comparative size of the central void in the annular image. In such a system, this central void typically includes an image of the central transparent area in the primary reflector surface, as reflected to the focal surface by the secondary reflector. This central void may be reduced or eliminated by utilizing a secondary reflector surface having a radially compressed figure. A simple embodiment of such a reflector surface has a point at its center.

The diameter of a central transparent zone in the primary reflector surface can be increased or its surface can have negative optical power, facilitating unobstructed optical communication between a relatively large secondary reflector surface and an imaging lens system which is closer to the focal plane, thereby facilitating a faster numerical f/ratio for said imaging lens system; where the figure of the primary reflector surface is radially enlarged, said larger central transparent area will not result in any reduction of coverage.

Figure 70:
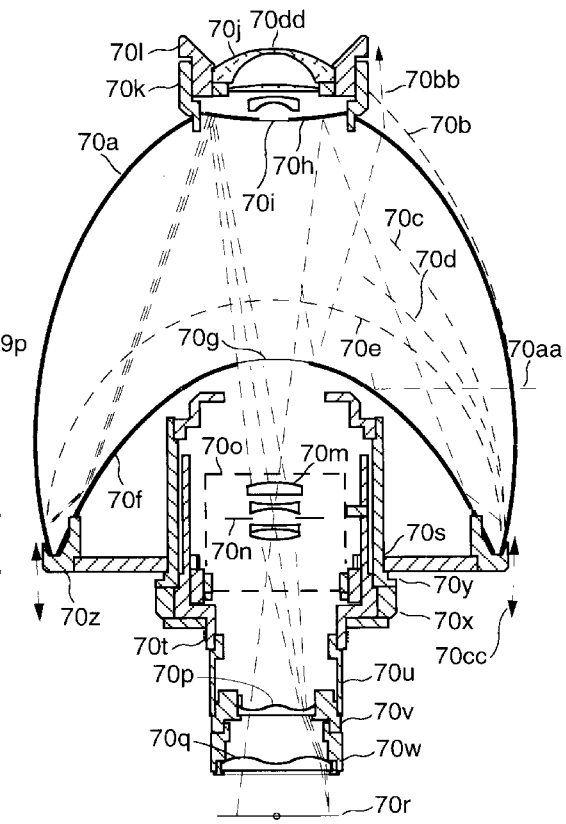

FIG. 70 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, the outer refracting surface thereof having a prolate aspheric or radially compressed spherical figure which extends the field of view of its primary reflector surface toward the front and back to cover the entire sphere around itself, the central part of the secondary reflector surface having transparent refracting surface which coincides with the area thereof that would otherwise be occupied by the reflection of a central hole in the reflective coating of the primary reflector, said transparent area in secondary reflector providing means for optical communication between imaging optics and a front central wide angle lens, the coverage of said wide angle lens being redundant with the inner zone of said primary reflector and outer refracting surface, whereby the overall optical system provides an annular 4 pi steradian image of the entire sphere around itself, and a central circular image of subject matter in front of the invention. Longitudinal positioning of the wide angle lens or selected elements thereof provides for variations in its field of view and focusing means. Interchangeable front lenses and attachments such as a tilt indicator provide additional flexibility. Imaging and correcting optics at the rear are shown for illustrative purposes, the rear elements thereof having discontinuous or annular figures which may include an exaggerated form of a Schmidt corrector plate, said elements being useful in the correction of astigmatism and chromatic aberration in the optical system of the present invention as well as many other types of optical systems. Approximate ray traces are shown in broken lines.

Figure 71:
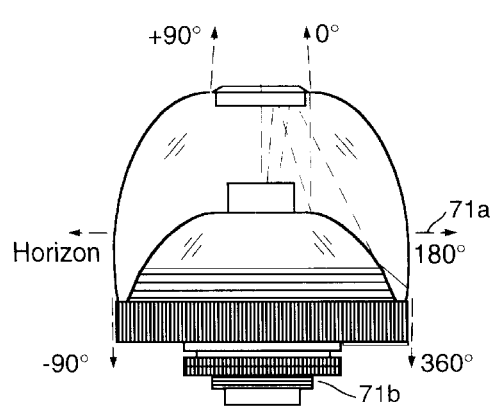

FIG. 71 is a side pictorial view of the optical system of FIG. 69, also showing interface means for a film camera, digital camera, or similar article.

Figure 72:
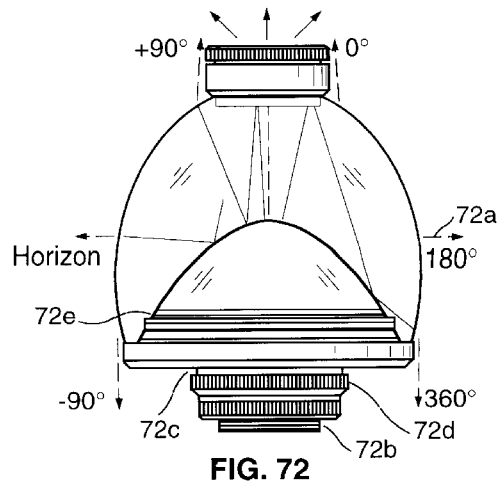

FIG. 72 is a side pictorial view of the optical system of FIG. 70, also showing interface means for a film camera, digital camera, or similar article and additional means to provide accurate indication of the limits of coverage.

Figure 73:
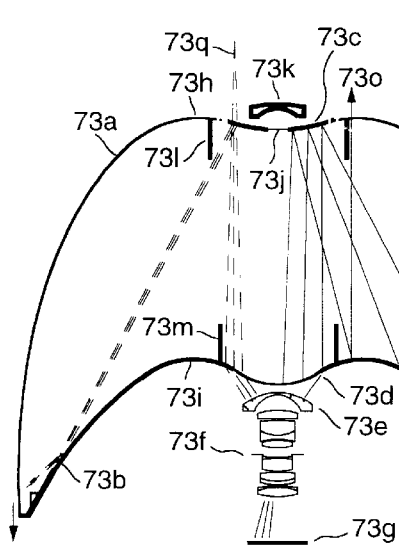

FIG. 73 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said primary reflector surface and the outer refracting surface of said optical substrate being prolate aspheric and torroidal, said outer refracting surface extending the rearward field of view of the said primary reflector to provide full sphere 4 pi steradian coverage. The transparent central area in the primary reflector surface is curved to provide a substantial angle of incidence near the edge of coverage for the rear imaging optics which have a relatively wide angle of view, said angle of incidence providing refractive means to correct chromatic aberration from the outer refracting surface, the greatest correction being required for the outer rear zones due to an increasing angle of refraction toward the outer zones. Also shown is a front central wide angle lens. Approximate ray traces of various types are shown in broken lines.

Figure 74:
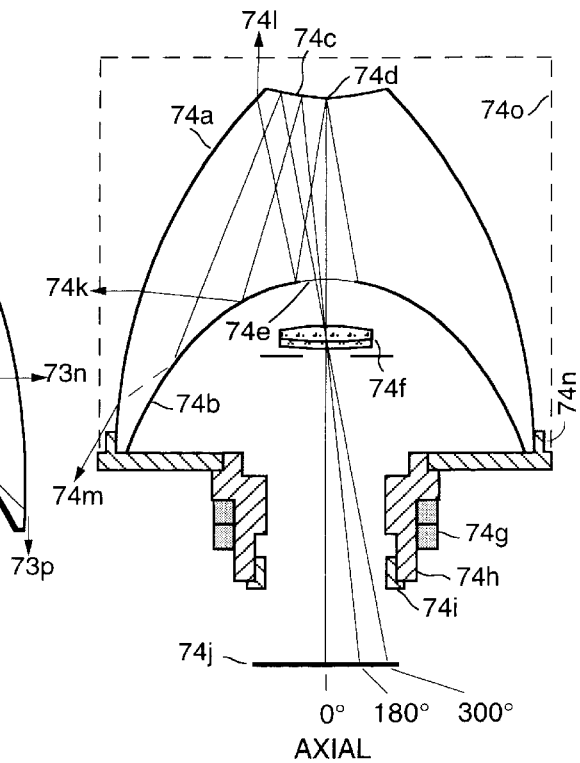

FIG. 74 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said secondary reflector being radially compressed so its apex forms a point, thereby eliminating the reflection of a central obscuration in the image, the outer refracting surface of said optical substrate being prolate aspheric or a radially compressed spherical figure, said outer refracting surface extending the rearward field of view of the said primary reflector. Shown in broken lines is a lens cap which surrounds and protects the solid optical substrate.

Figure 75:
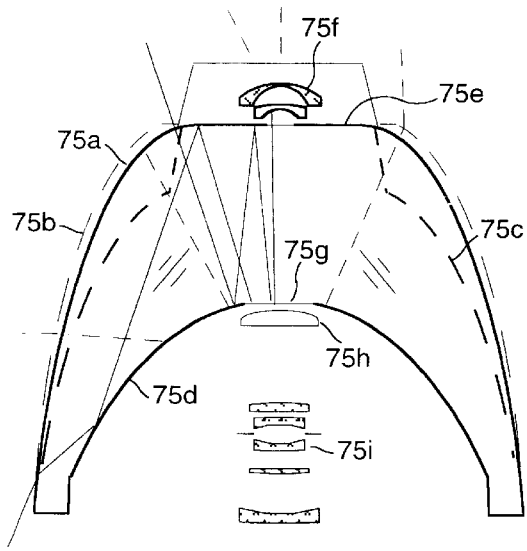

FIG. 75 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said secondary reflector surface being flat, the outer refracting surface of said optical substrate having a prolate aspheric figure, with a alternate figures for said outer refracting surface being shown in broken lines, said outer refracting surface extending the rearward field of view of the said primary reflector.

Figure 76:
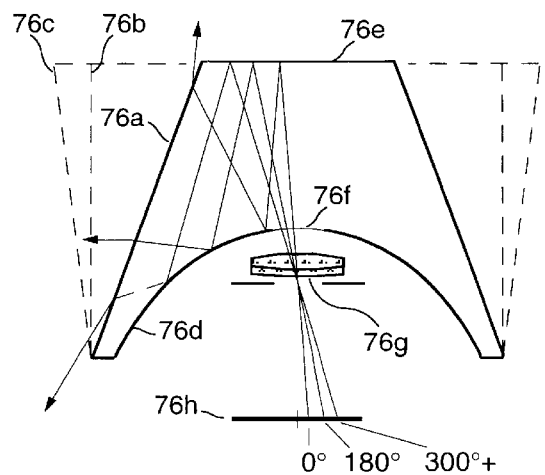

FIG. 76 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said secondary reflector surface being flat, the outer refracting surface of said optical substrate having a truncated conical figure, said outer refracting surface extending the rearward field of view of the said primary reflector. The outer refracting surface may also be cylindrical or have a conical figure which is the inverse of that shown in the figure; either of these alternatives will permit the se of a larger secondary reflector, said secondary reflector figures including concave as seen from the inside of the optical system. The same alternatives may be applied to systems not having a secondary reflector surface.

Figure 77:
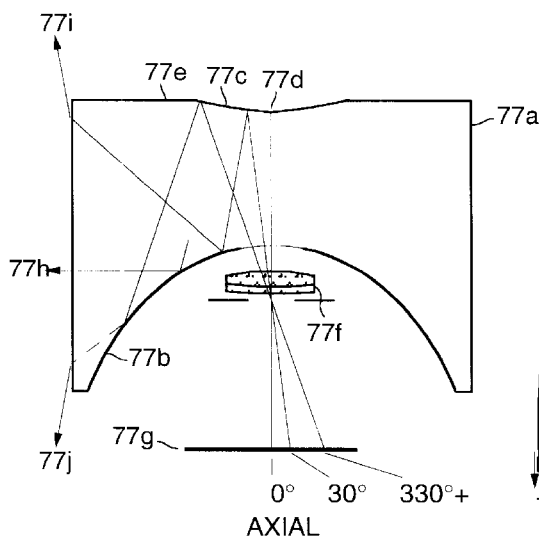

FIG. 77 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said secondary reflector surface being convex as seen from inside of the optical system, the outer refracting surface of said optical substrate being cylindrical. Alternate figures for the front of said outer refracting surface include a curved figure and alternate figures for the secondary reflector surface include convex as seen from the inside of the optical system or flat or hybrid.

Figure 78:
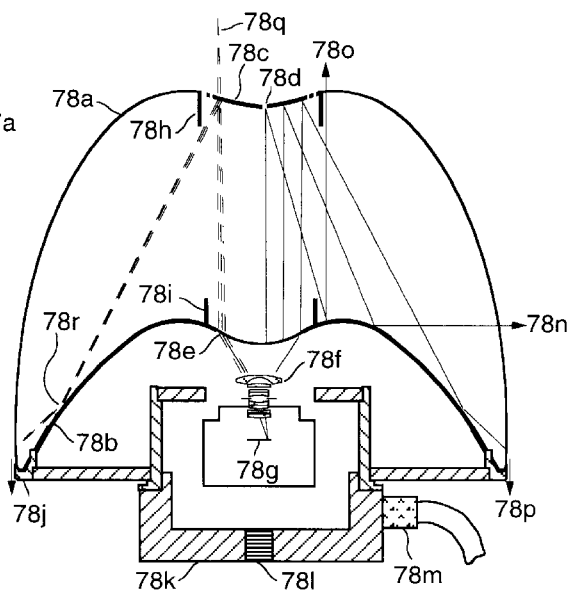

FIG. 78 is a simplified side cross sectional view of an optical system similar to that of FIG. 73, also showing an electronic imaging camera and a weather resistant hosing which may be used on a tripod, pole, or similar article. The hort focal length lens in front of the camera has a small absolute aperture diameter for a given f/ratio, thereby permitting the light pencil to be smaller where it intersects each optical surface of the catadioptric substrate, thereby providing a sharper image for a given degree of sophistication in any correcting optics which may be used.

Figure 79:
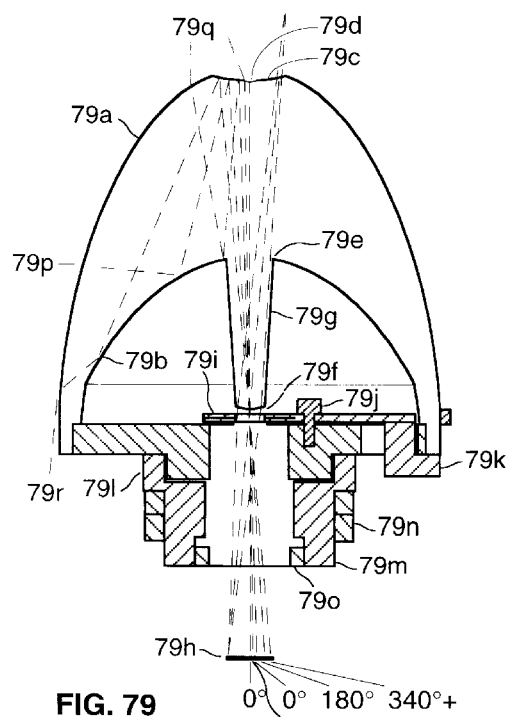

FIG. 79 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said secondary reflector having a small transparent area at its center, said transparent area having a concave figure as seen from the outside to permit it to act as the front element of a wide angle lens; said optical substrate having an extension behind the transparent area in its primary reflector surface, the rear surface of said extension serving as an imaging optical system, the outer refracting surface of said substrate extending the forward and rearward field of view of the said primary reflector.

Figure 80:
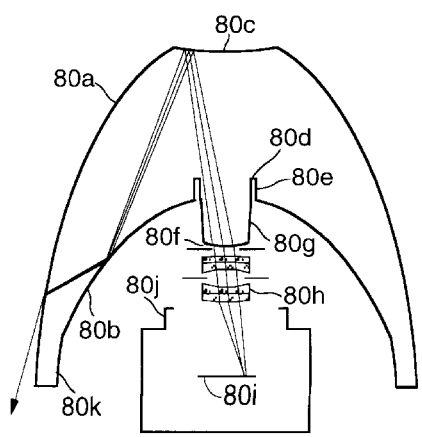

FIG. 80 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said optical substrate having an extension behind the transparent area in its primary reflector surface, the rear surface of said extension serving as an afocal imaging or correcting element in an imaging optical system, the outer refracting surface of said substrate extending the field of view of the said primary reflector.

In most two reflector (Cassegrain) embodiments, the optical substrate occupies the entire area between the primary and secondary reflector surfaces. A two reflector system results in an unreversed image and allow the camera and photographer to be behind the primary reflector, where exclusion of said camera and photographer from the image is easier in embodiments not having full sphere coverage. Reflective coatings are typically used on both reflector surfaces. These coatings can be aluminum for many applications, but rhodium is applicable to certain environments and god or other coatings are optimal for selected wavelengths. The optical system is also applicable to a two reflector (Cassegrain) wide angle reflector system in which only one of the reflector surfaces is internal.

FIG. 81 is a simplified side cross sectional view of a compound embodiment of a catadioptric version of the optical system of the present invention in which only the secondary reflector surface is the inside surface of a transparent optical substrate and the primary reflector is a separate optical component, said transparent optical substrate having a transparent surface facing said primary reflector and a central transparent extension which serves as a support strut, said central extension being integral with the optical substrate or consisting of a separate piece. Where a separate piece is used, said extension may be a tube, consist of a solid piece of transparent material, or consist of a tube having separate optical elements inside.

FIG. 82 is a simplified side cross sectional view of a compound embodiment of a catadioptric version of the optical system of the present invention in which only the secondary reflector surface is the inside surface of a transparent optical substrate and the primary reflector is a separate optical component, said transparent optical substrate having a transparent surface facing said primary reflector; said optical system also including a tube which is affixed to said transparent substrate and said primary reflector, said tube enclosing a camera which is in front of said primary reflector surface.

FIG. 83 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said substrate having a spherical outer refracting surface and depression in front of a central transparent area in its primary reflector surface, said depression having a concave surface as seen from the rear outside of the optical system.

FIG. 84 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said secondary reflector surface having a diameter which may be up to a size larger than that of said primary reflector surface, said secondary reflector surface having a concave or a concave or convex annular figure as seen from inside the optical system; said primary reflector having a deep curvature; the outer zone of said outer refracting surface extending the field of view of said primary reflector to cover all the way back to an axial point only a short distance behind the optical system, and all the way forward to an axial point only a short distance in front of the optical system, whereby the field of view of the overall optical system exceeds 360 degrees by a substantial margin and provides redundant coverage toward the front and back when used in air, whereby the optical system provides full sphere 4 pi steradian coverage when immersed in water or other liquid having a similar or lesser refractive index. The secondary reflector in this and other embodiments may be optimized to provide characteristics like or similar to those of one or more elements in corrective imaging optics.

FIG. 85 is a simplified side cross sectional view of a compound catadioptric embodiment of an optical system similar to that of FIG. 84, the secondary reflector thereof being smaller than the primary reflector surface and the outer refracting surface having a substantial prolate aspheric figure; the central transparent area in its primary reflector surface being surrounded by an annular bore which serves as a light baffle.

FIG. 86 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, the primary and secondary reflector surfaces thereof having central transparent areas, said secondary reflector and said transparent area in primary reflector surface each being surrounded by an annular bore which serves as a light baffle, said transparent areas providing optical communication between cameras and reflective surfaces of the optical system, whereby cameras can be used at either of both ends.

Figures 87, 88:
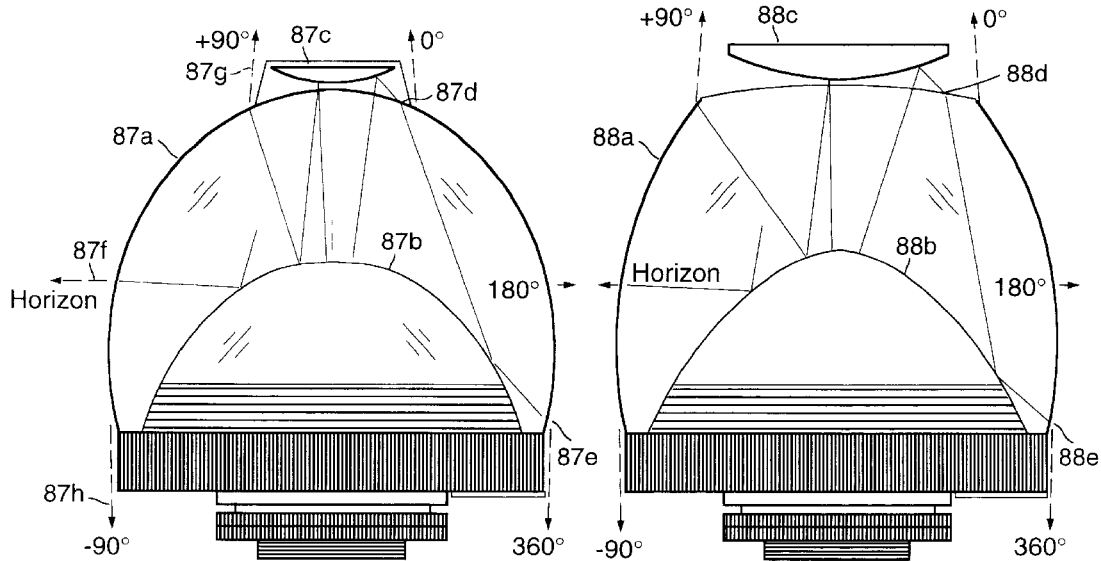

FIG. 87 is a simplified side cross sectional view of a compound embodiment of a catadioptric version of the optical system of the present invention in which the primary and reflector surface is the inside surface of an optical substrate and the small secondary reflector is a separate optical component, the part of the optical surface near the secondary reflector having a figure which compensates for chromatic aberration from the outer refracting surface of said optical substrate.

FIG. 88 is a simplified side cross sectional view of a compound embodiment of a catadioptric version of the optical system of the present invention in which the primary and reflector surface is the inside surface of an optical substrate and the large secondary reflector is a separate optical component, the part of the optical surface near the secondary reflector having a figure which compensates for chromatic aberration from the outer refracting surface of said optical substrate.

Figures 89, 90:
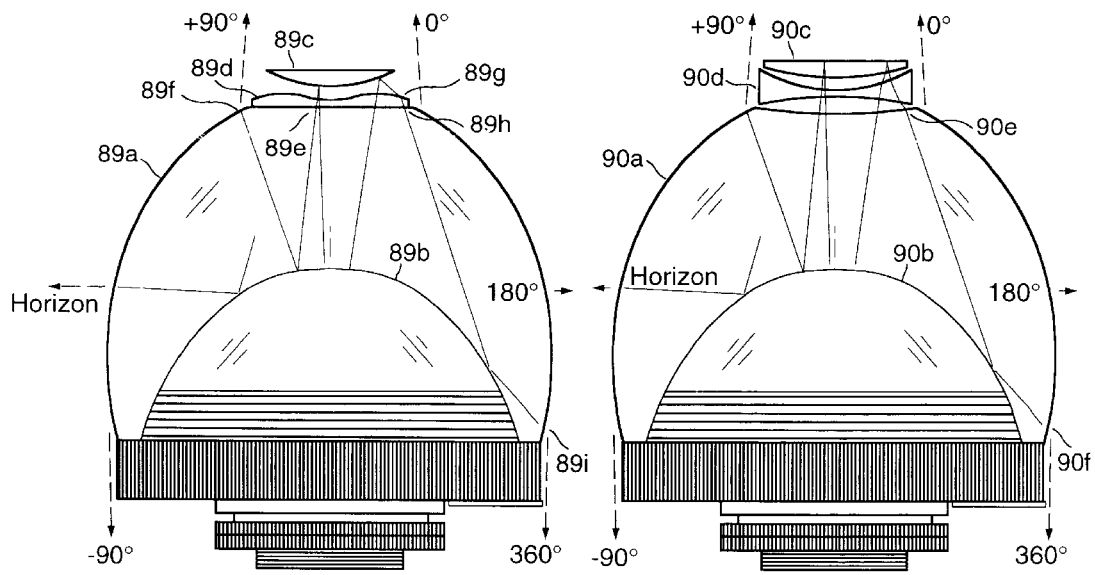

FIG. 89 is a simplified side cross sectional view of a compound embodiment of a catadioptric version of the optical system of the present invention in which the primary and reflector surface is the inside surface of an optical substrate and the small secondary reflector is a separate optical component, the optical element between the secondary reflector and said optical substrate having a figure which compensates for chromatic aberration from the outer refracting surface of said optical substrate. The front of the substrate may instead have a figure similar to that of the front of the separate refracting element.

FIG. 90 is a simplified side cross sectional view of a compound embodiment of a catadioptric version of the optical system of the present invention in which the primary and reflector surface is the inside surface of an optical substrate and the small second surface secondary reflector is a separate optical component, the transparent surface of said secondary reflector and the optical element between the secondary reflector and said optical substrate having a figure which compensates for chromatic aberration from the outer refracting surface of said optical substrate.

FIGS. 91 through 113 are cross sectional views, front views, and pictorial views of embodiments of the present invention which provide images having three dimensional information, some figures also including approximate ray traces.

Three dimensional imaging means are provided by opposing reflector surfaces, facing reflector surfaces, tandem reflector surfaces, steerable reflector surfaces or lenses, a reflector surface nested inside a partially reflective optical surface, optical clusters, one or more scalloped optical surfaces which may include the primary reflector, or a combination thereof. Where clustered or scalloped optics and axially separated optics are combined, the resulting images include three dimensional information in multiple axes.

A scalloped optical surface may be utilized in many parts of the invention, including the primary reflector, an annular reflector which surrounds the secondary reflector, or the outer refracting surface. The principles of a scalloped optical surface will be better understood through a more detailed description thereof. In order to provide three dimensional information for the area of coverage, the area of coverage must be imaged at least twice, with each image being obtained from a different effective vantage point. A simple embodiment of a scalloped reflector has a plurality of scallops which form convex protrusions in the perimeter as seen from the front, though the scallops may also be concave as seen from the front.

Where the overall figure of the reflector is convex, its appearance from the side will still be convex regardless of the appearance the scallops have from the front; however, the surface will be interrupted by the lines which define the edge of each scallop. Where the outer refracting surface is utilized to provide redundant imaging, its outline as seen from the front may be either scalloped or it may have the outline of a polygon such as a square, pentagon, or hexagon.

In order to cover the subject matter at least twice, a relatively simple scalloped reflector comprises a surface having scallops which are convex as seen from the front and which form a plurality of identical convex lobes disposed evenly around its circumference, each lobe having more than twice the included angle of coverage as the angular circumference of the reflector surface it occupies. (This would include the effects of the outer refractive surface in cases where the reflector is an internal surface.) For example, as seen from the front, each lobe of a twelve lobe reflector surface would occupy 30 degrees of the circumference; therefore, each of said lobes would have more than 60 degrees of curvature.

The scalloped reflector surface provides a sectored virtual image, said image having the same number of sectors as said reflector surface has lobes, each of said sectors covering a circumferential angle of view of more than twice the circumferential angle occupied by each sector, whereby said virtual image covers each point in said great circle and said area in front and behind the plane of said great circle at least twice, thereby providing fully redundant coverage thereof; said redundantly imaged points having circumferentially separated vantage points and being circumferentially separated in said virtual image. This redundant coverage provides three dimensional information for the entire area of mutual coverage.

Fabrication means for embodiments including scalloped systems which are difficult to manufacture by grinding and polishing may be made with means and materials which include precision molded plastic. Molded plastic construction makes it easier to make the optical substrate with an integral grip surface to facilitate easier handling.

A scalloped optical system is also applicable to the projection of suitable sectored images, whereby said sectored images overlap in the projection and thereby provide three dimensional information in a projected image. Further, the concepts, principles, and geometry of a scalloped optical system are also applicable to image processing techniques, algorithms, and software which are associated with viewing, analyzing, and otherwise utilizing images or data produced and reproduced by said optical system, or to the processing or analysis of other images having similar characteristics.

Two optical systems may be incorporated into a single instrument, said optical systems being pointed in opposite directions in order to provide redundant coverage of the entire subject with opposing image projections, resulting in reduced distortion of many parts of the subject without resorting to external image processing, further providing three dimensional information by means of redundant imaging from different vantage points. For additional versatility, one or more of said optical systems may be independently positionable in order to provide redundant coverage of selected parts of the subject with configurable image projections, resulting in reduced subject distortion without necessarily resorting to external image processing, further providing three dimensional information within the redundantly imaged area by means of imaging from different vantage points.

Where the reflector surface, and in some cases, the outer refracting surface, have substantially more curvature than that required for full sphere coverage in conventional surroundings, up to full sphere coverage may be achieved even when said optical system is immersed in liquid.

Figure 91:
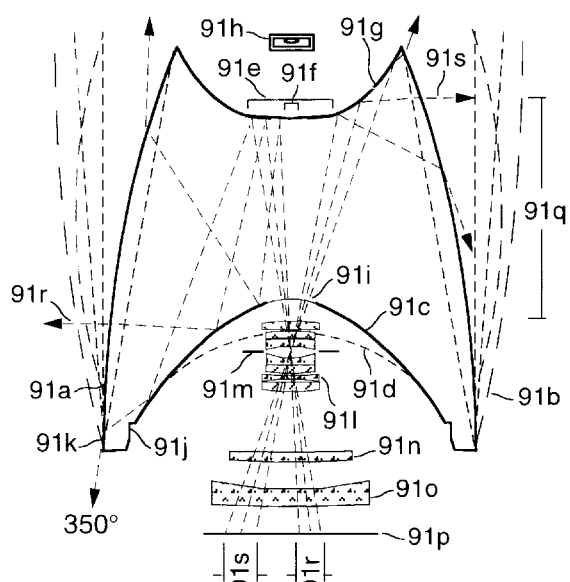

FIG. 91 is a simplified side cross sectional view of a compound catadioptric embodiment of the optical system of the present invention in which the primary and secondary reflector surfaces are inside surfaces of an optical substrate, said optical substrate occupying the space between said primary and secondary reflector surfaces, said optical system providing redundant imaging by means of an annular reflector surface which surrounds said secondary reflector surface, said annular reflector providing an annular image which surrounds an image provided by means of said primary reflector, the vantage points from which the subject matter is imaged with each reflector being axially separated, whereby the resulting images provide three dimensional information. The outer refracting surface in this embodiment has less than 180 degrees of curvature, making its substrate suitable for manufacture as a precision molded optic with the mold for the outer surface being as simple as a single piece.

Figure 92:
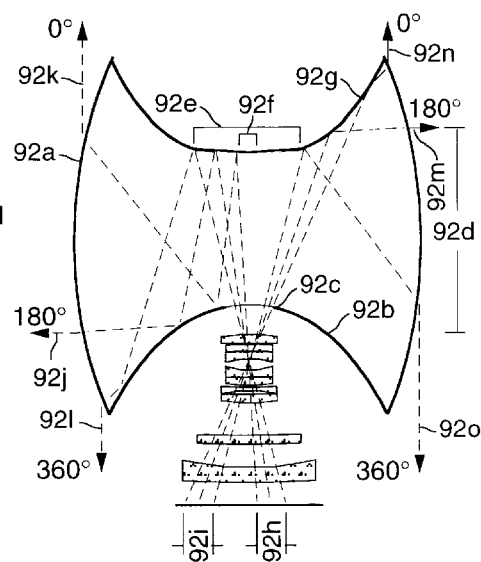

FIG. 92 is a simplified side cross sectional view of an optical system similar to that of FIG. 91, except that the outer refracting surface having a figure that facilitates redundant full sphere coverage for a full sphere imaging having three dimensional information.

Figure 93:
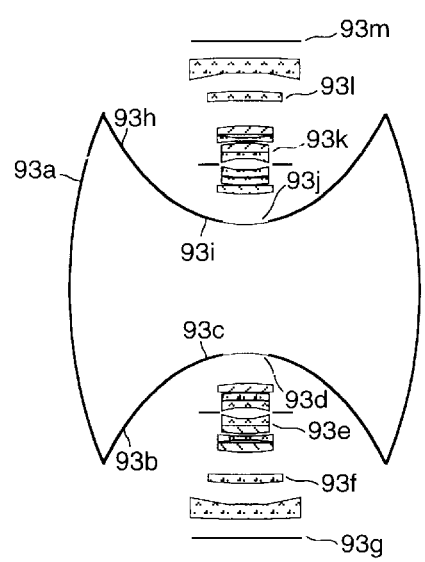

FIG. 93 is a simplified side cross sectional view of an optical system similar to that of FIG. 92, except that the reflector surfaces are symmetrical and each has a transparent central area, thereby facilitating the use of two imaging lens systems and image sensors. With sch an embodiment, each focal surface may be sed for a different purpose or with a sensor that is sensitive to different wavelengths.

Figure 94:
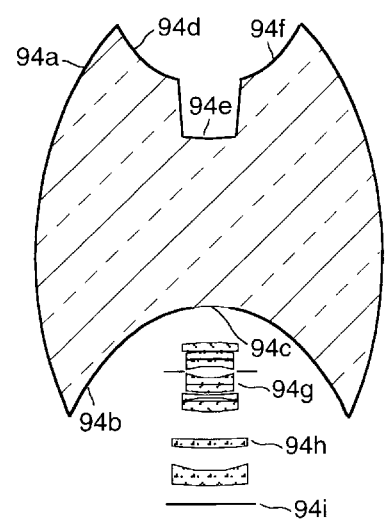

FIG. 94 is a simplified side cross sectional view of an optical system similar to that of FIG. 91, with the secondary reflector surface being axially positioned to facilitate a common focus for the images from each wide angle reflector.

Figure 95:
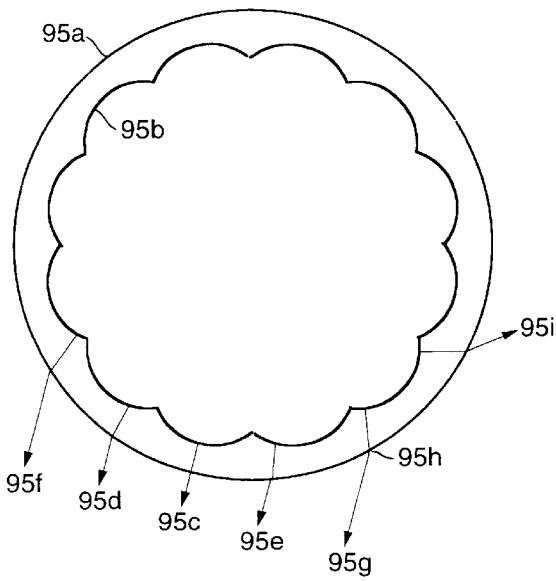

FIG. 95 is a simplified front view of a catadioptric embodiment of the optical system of the present invention in which the primary reflector has a scalloped optical figure, the figure of each scallop being convex as seen from the outside of the optical system.

Figure 96:
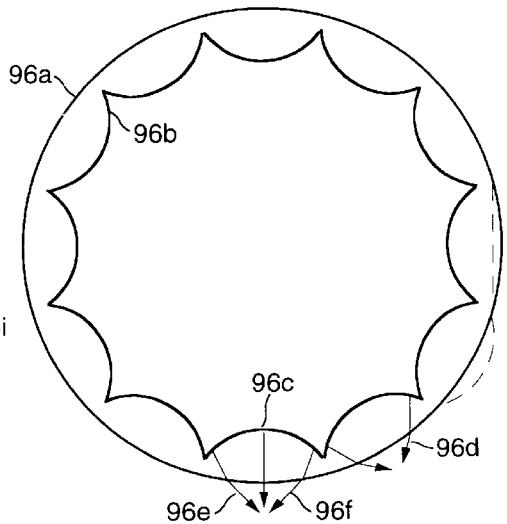

FIG. 96 is a simplified front view of a catadioptric embodiment of the optical system of the present invention in which the primary reflector has a scalloped optical figure, the figure of each scallop being concave as seen from the outside of the optical system.

Figure 97:
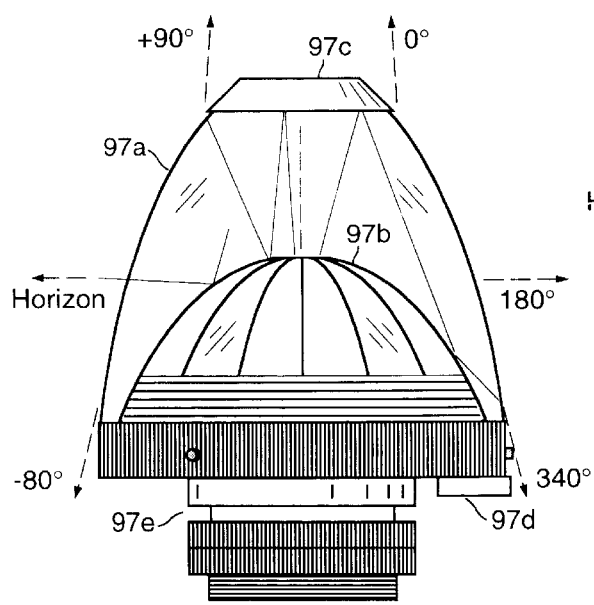

FIG. 97 is a side pictorial view of a compound catadioptric embodiment of the optical system of the present invention in which the primary reflector has a scalloped optical figure.

Figure 98:
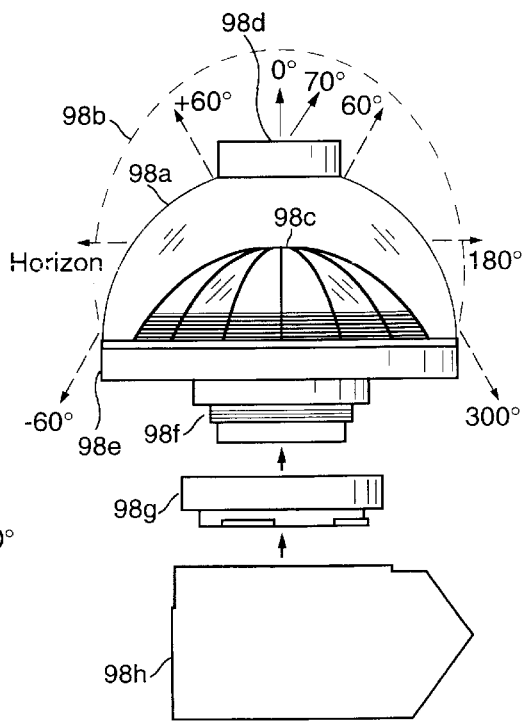

FIG. 98 is a side pictorial view of a compound catadioptric embodiment of the optical system of the present invention in which the primary reflector has a scalloped optical figure and the outer refracting surface has a hemispherical figure. Dashed lines show an alternate figure for the outer refracting surface. Also shown are an adapter for a camera or similar article and a camera body.

Figure 99:
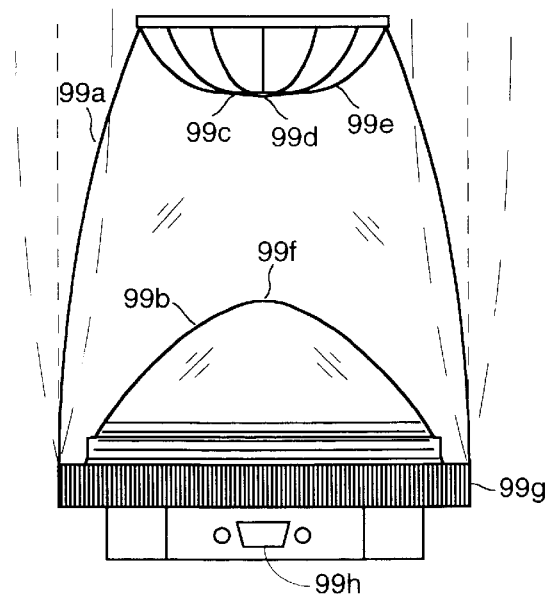

FIG. 99 is a side pictorial view of a compound catadioptric embodiment of the optical system of the present invention in which an annular reflector surrounding the secondary reflector has a scalloped optical figure.

Figure 100:
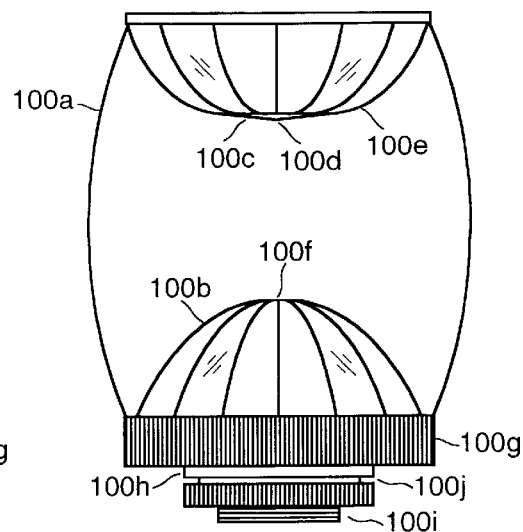

FIG. 100 is a side pictorial view of a compound catadioptric embodiment of the optical system of the present invention in which the primary reflector and an annular reflector surrounding the secondary reflector have a scalloped optical figures.

Figure 101:
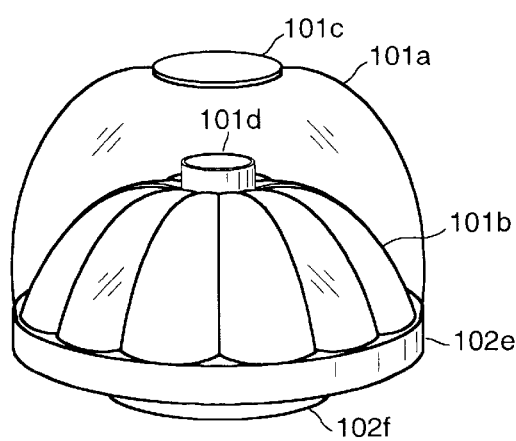

FIG. 101 is a perspective view of a compound catadioptric embodiment of the optical system of the present invention in which the primary reflector has a scalloped torroidal optical figure and the outer refracting surface has a torroidal optical figure.

Figure 102:
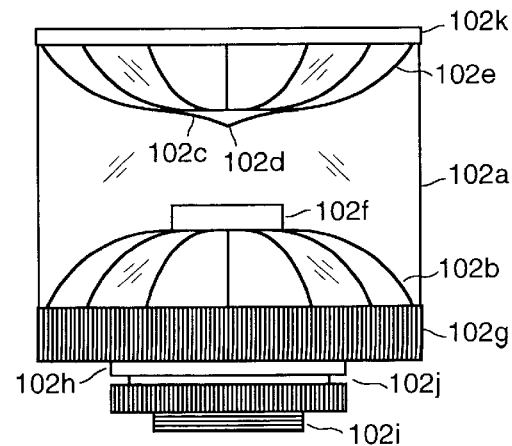

FIG. 102 is a side pictorial view of a compound catadioptric embodiment of the optical system of the present invention in which the outer refracting surface is cylindrical, the primary reflector and an annular reflector surrounding the secondary reflector have a scalloped optical figures, and the secondary reflector has a radially modified figure which protrudes toward the primary reflector but has a concave figure as seen from the side. The outer refracting surface may also be conical or curved. This and other designs are also applicable to and may embody optical systems which are enclosed in a transparent outer hosing or in which elements are supported by axial or side vanes.

Figure 103:
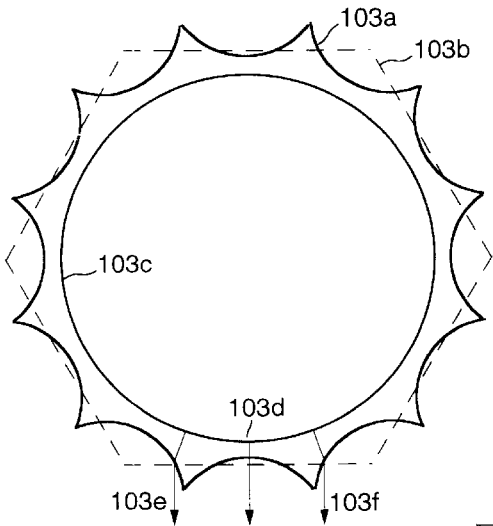
Figure 104:
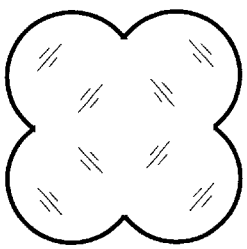

FIG. 103 is a simplified front view of a catadioptric embodiment of the optical system of the present invention in which the outer refracting surface has a scalloped optical figure, the figure of each scallop being concave as seen from the outside of the optical system. HEXAGON FIG. 104 is a front outline view showing the concept of a simple scalloped optic or merged optical cluster.

Figure 105:
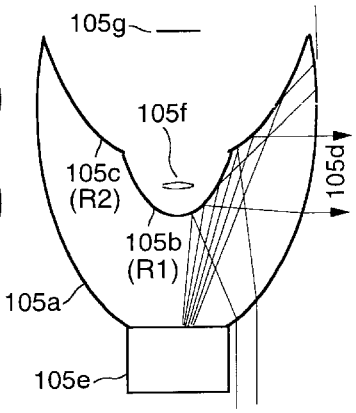

FIG. 105 is a simplified side cross sectional view of a catadioptric embodiment of the present invention in which the reflector surface is an inside surface of an optical substrate, said optical system having two coaxial reflector surfaces which are positioned one in front of the other to provide redundant imaging of a great circle surrounding said optical system from two axially separated vantage points, said redundant images providing three dimensional information.

Figure 106:
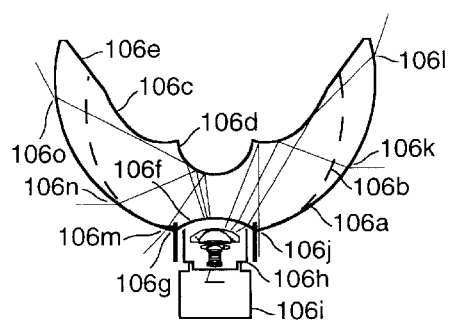

FIG. 106 is a simplified side cross sectional view of an optical system similar to that of FIG. 105, but in which the outer refracting surface has a hemispherical figure. An alternate smaller hemispherical figure is shown in broken lines.

Figure 107:
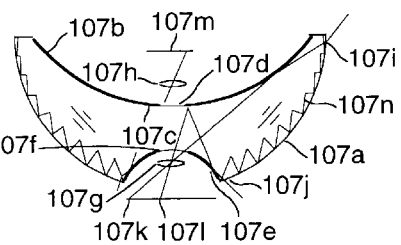

FIG. 107 is a simplified side cross sectional view of a compound catadioptric embodiment of the optical system of the present invention in which two internal wide angle reflector surfaces face each other, each of said wide angle reflector surfaces having a transparent central area to facilitate optical communication between a focal surface and the opposing reflector surface. Most embodiments of the invention have optical surfaces which each comprise a surface of revolution.

Most embodiments of the present invention utilize a smooth optical surface for the outer refracting surface. Other applicable optical surfaces include surfaces having characteristics like those of a formed Fresnel lens. A Fresnel surface on one or more surfaces of a solid optical substrate or an element surrounding an optical system is applicable to some applications.

The Fresnel surface being turned, molded, or produced by other means. Where a Fresnel surface is produced by turning, said Fresnel surface may be turned on a numerically (computer) controlled machine, said machining having a numerically controlled rotating tool for turning said Fresnel surface, whereby a flat or appropriately curved face on said rotating tool is rotated according to the desired angle of a given Fresnel zone, said Fresnel surface being turned concentrically or spirally, said zones on Fresnel surface having a fat profile or one which is slightly curved to produce refraction according to all or part of the radial angle of view covered by the surface of said Fresnel zone.

Figure 108:
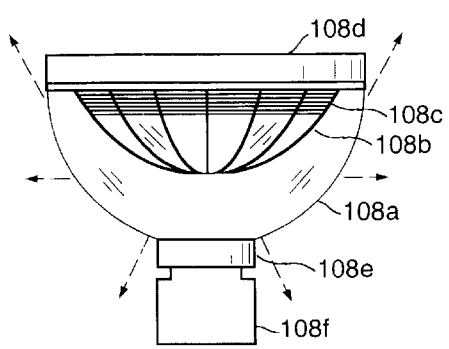

FIG. 108 is a side pictorial view of a catadioptric embodiment of the optical system of the present invention having a scalloped primary reflector surface which may be imaged directly.

Figure 109:
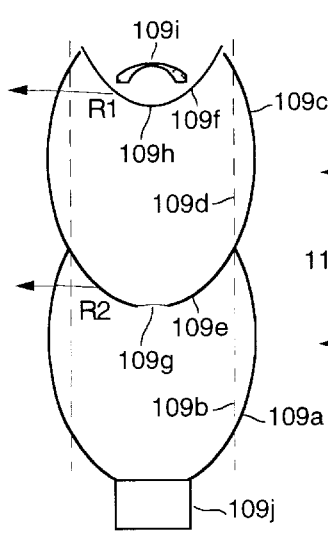

FIG. 109 is a simplified side cross sectional view of a catadioptric embodiment of the optical system of the present invention in which two substrates are used in tandem so that one reflector surface is positioned in front of the other to provide redundant imaging of a great circle surrounding said optical system from two axially separated vantage points, said redundant images providing three dimensional information; the second reflector being in optical communication with a focal surface by means of a central transparent area in the reflector surface closest to said focal surface.

Figure 110:
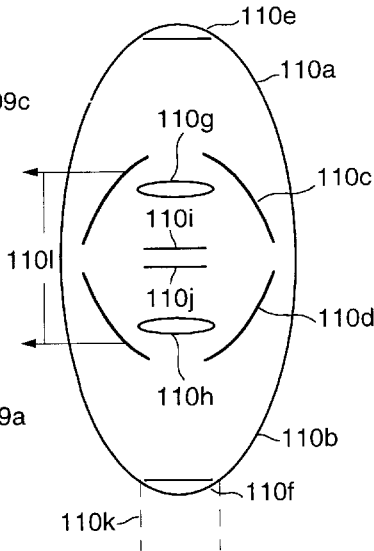

FIG. 110 is a simplified side cross sectional view of two opposing compound catadioptric optical systems and focal surfaces which also face away from each other, the wide angle reflector surfaces thereof being axially separated and providing redundant imaging of a great circle surrounding said optical system from two axially separated vantage points, said redundant images providing three dimensional information.

FIG. 111 is a simplified side cross sectional view of a nested pair of optical surfaces which are integrated into a Cassegrain reflecting system.

FIG. 112 is a simplified side cross sectional view of a nested pair of optical surfaces, one or more of which is reflective and imaged from the front. In embodiments where both surfaces are reflective, the outer surface is only partially reflective.

FIG. 113 is a simplified side cross sectional view of a spherical catadioptric element having an internal reflecting surface, each end thereof being used as a separate wide angle reflector surface, said wide angle reflector surfaces thereof being axially separated and providing redundant imaging of a great circle surrounding said optical system from two axially separated vantage points, said redundant images providing three dimensional information. Two separate reflectors may be used instead of the shown spherical component. External reflector surfaces may also be used.

FIG. 114 is a side view of an embodiment of the invention having two independently positionable optical systems which may have electronic image sensors or fiber optic cables.

FIG. 115 is a simplified cross sectional view of a compound catadioptric embodiment of the optical system of the present invention having a flush mounted central front element which is sealed against moisture and contamination.

The foregoing optical systems and concepts are also applicable to optical systems that have no secondary reflector surface. FIGS. 116 through 120 are cross sectional and simplified profile views of embodiments of the present invention which have only one reflector surface. In this type of embodiment, the single reflector surface of some embodiments has characteristics similar to the primary reflector surface of a two reflector Cassegrain embodiment, except that said reflector surface of the single reflector embodiment need not have a central transparent area in order to image subject matter reflected from itself.

In an embodiment having a single reflector surface, the vantage point from which the virtual image is observed or captured is typically at a axial position in front of the reflector surface. This axial position may include an area which would otherwise have been occupied by a secondary reflector surface or secondary reflector, though in some embodiments, the optimum vantage point may be farther from the optical substrate. In most embodiments having no secondary reflector surface, the "primary reflector surface" will typically be referred to as simply the "reflector surface".

Embodiments not having a secondary reflector tend to be simpler than those which have a secondary reflector. Furthermore, the surface of the solid optical substrate through which the virtual image from the reflector may be observed is typically larger than it can be on an optical system having a secondary reflector. This more easily facilitates the use of a wide angle imaging lens to compensate for lateral chromatic aberration by providing relatively equalized angles of incidence at the refracting surfaces of the optical substrate.

Imaging of an angular zone well in front of the reflector surface or even of an axial point in front of said reflector surface may be facilitated through any of the means utilized with a system having a secondary reflector, so long as said means do not rely on a secondary reflector surface. In such embodiments, imaging of an axial point in front of the reflector surface requires that the utilized zones on the outer refracting surface or said reflector surface be larger than any sensor, camera, projector, or other instrumentation which is used in front of said reflector. These limitations may be effectively overcome when a camera, projector or similar article is used at a relatively long distance in front of the reflector surface, since this can permit the reflected image of said article to have a very small size in the image. In such cases, the camera or other article does not necessarily have to be attached to the optical substrate.

Imaging of a zone well behind the reflector or even of an axial point behind the reflector is accomplished by means of refraction through the outer zones of the optical substrate. A central image of subject matter behind the reflector surface may also be provided by means of a transparent area in the center of said reflector surface. Further, the means used in a system having a secondary reflector surface to manipulate the field of view of any central optics or to image instruments, indicators, or displays may be used with embodiments not having a secondary reflector by utilizing a transparent area in the center of the reflector surface instead of utilizing a secondary reflector.

FIG. 116 is a simplified cross sectional view of a catadioptric embodiment of the optical system of the present invention having a hemispherical outer reflecting surface and a concave refracting surface between the imaging optics and the reflector surface.

FIG. 117 is a simplified cross sectional view of a catadioptric embodiment of the optical system of the present invention in which the reflecting and outer refracting surfaces are radially compressed FIG. 118 is a simplified cross sectional view of a catadioptric embodiment of the optical system of the present invention having a spherical reflector surface and a hemispherical outer refracting surface, also showing a top rain shield and a weather resistant camera housing.

FIG. 119 is a side pictorial view of the optical system of FIG. 118. For clarity in this and other pictorial views, the reflecting surface is illustrated in a way that does not fully compensate for the refracting effects of the outer optical surface of the invention.

FIG. 120 is a simplified cross sectional view of a catadioptric embodiment of the optical system of the present invention in which the reflecting surface is an inside surface of an optical substrate, the refracting surface between a focal surface and said reflecting surface having an annular convex figure as seen from said focal surface, said refracting surface correcting chromatic aberration from the outer refracting surface of said substrate.

FIG. 121 is a simplified cross sectional view of an embodiment of the present invention having one reflector surface, further comprising means to centrally image a tilt indicators or other articles, said tilt indicators being electronic, liquid or mechanical.

FIG. 122 is a cross sectional view of a right angle prism which is used as a rhomboid prism to illustrate the concept of substantial correction of chromatic aberration by utilizing equivalent entrance and exit angles on the outer refracting surface and the refracting surface between a focal surface and the inside reflecting surface.

FIGS. 123 through 126 are cross sectional and pictorial views of the present invention, also showing means for imaging instruments, displays, indicators, or other articles.

FIG. 123 is a simplified cross sectional view of a catadioptric embodiment of the optical system of the present invention in which the reflecting surface is an inside surface of an optical substrate, said reflecting surface being radially enlarged in order to facilitate a wide filed of view while also having a large central transparent area in its surface, the lenses behind said transparent area providing redundant coverage of the area above said optical substrate. The lenses between the camera and the lower refracting surface of said optical substrate provide an angle of refraction at said lower surface of said substrate, said angle of refraction compensating for chromatic aberration from the outer refracting surface of said optical substrate.

FIG. 124 is a simplified cross sectional view of an optical system similar to that of FIG. 123, but in which the reflector surface is not radially enlarged, the central transparent area in said reflector surface providing means to image instruments which may include a clock, thermometer, compass, or tilt indicator. The prism below the off-axis tilt indicator effectively provides a vantage point that is directly below said tilt indicator. Two reflectors may be sed instead of the prism to provide the same effect. Auxiliary prisms or reflectors are not necessary if the tilt indicator is positioned on or very near the optical axis or if it is calibrated to compensate for an oblique vantage point.

FIG. 125 is an oblique pictorial view of an optical system similar to that of FIG. 124, also showing instruments which are imaged through the central transparent area in the reflector surface, said instruments including a thermometer, compass, tilt indicator, and sun dial.

FIG. 126 is an oblique pictorial view of a compound catadioptric embodiment of the optical system of the present invention, also showing instruments similar those of FIG. 125 in front of the secondary reflector surface, a central transparent area in said secondary reflector surface facilitating optical communication between said instruments and a focal surface. The spikes on top are to discourage birds from perching on the optical system.

FIG. 127 is a side view of an omnidirectional embodiments of the present invention which may be imaged from a distance, thereby reducing the imaged size of a camera or similar article which may be disposed in front of the primary reflector. An axial tube and an axial strut (either of which may be used to support the optical system) are shown in broken lines.

FIG. 128 is a side view of an omnidirectional embodiments of the present invention which may be imaged from a distance, also showing a support tube and close up and correcting lenses which facilitate afocal imaging or projection with a fixed or interchangeable lens camera or projector. The left side of the figure shows means for attaching accessories including articles such as a tilt indicator or clock which may be imaged along with other subject matter.

FIGS. 129 through 132 are side views of omnidirectional embodiments of the present invention which may be imaged from a distance, also showing an adjustable stand and a bracket which facilitates mounting of the reflector on a door or other protrusion.

FIG. 129 is a top side view of a catadioptric omnidirectional embodiment of the present invention which may be imaged from a distance and in which the reflector is an inside surface of an optical substrate, also showing an adjustable stand.

FIG. 130 is a top side view of a catadioptric omnidirectional embodiment of the present invention which may be imaged from a distance and in which the reflector is an inside surface of an optical substrate, also showing a pivot block and a bracket which facilitates mounting of the reflector on a door or other protrusion.

FIG. 131 is a side view of a catadioptric omnidirectional embodiment of the present invention which may be imaged from a distance and in which the reflector is an inside surface of a relatively thin hemispherical optical substrate, also showing an adjustable stand.

FIG. 132 is a camera having a moderate to long focal length lens such as may be used to photograph the optical system of FIGS. 129 through 131 or a distant wide angle reflector.

FIGS. 133 through 136 are side views of the end of borescopes, laparascopic instruments, illumination means, and other articles which are associated with or incorporated into the present invention.

The invention may further comprise or be associated with, attached to or incorporated into articles which include medical instrumentation, said articles providing illumination means for the subject matter. The image from such articles may be locally captured with a sensor, be relayed with fiber optics. Where the invention is not physically connected to an outside imager, the image may be relayed by means of electromagnetic signals.

The invention may incorporate or be associated with refracting optics or surfaces which are capable of causing all exiting rays that originate from a given point in the subject matter to be parallel, thereby enabling said optical system to be used in front of a fixed or interchangeable lens of a film camera, video camera, or similar article, where said lens is focused at or at a hyperfocal distance closer than infinity. In a simple or familiar form, such refracting optics typically correspond in concept to a close up lens or an eyepiece.

Figure 133:
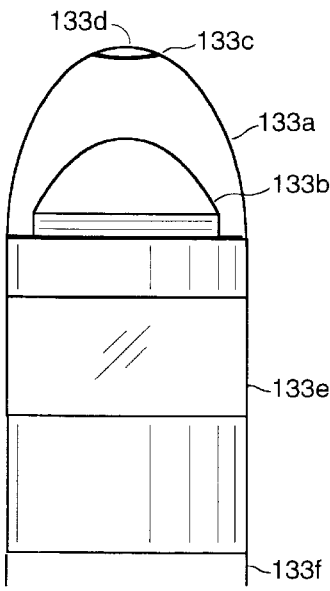
FIGS. 133 through 136 are side views of the end of borescopes, laparascopic instruments, and other articles which are associated with or incorporated into the present invention.

FIG. 133 is a side view of a compound catadioptric embodiment of the optical system of the present invention, showing cylindrical illumination means behind the reflector surface and the association of the optical system with a borescope, laparascopic instrument, or other article. The top of the figure shows a front cap or plug which protects the secondary reflector surface and provides a smooth outer surface.

Figure 134:
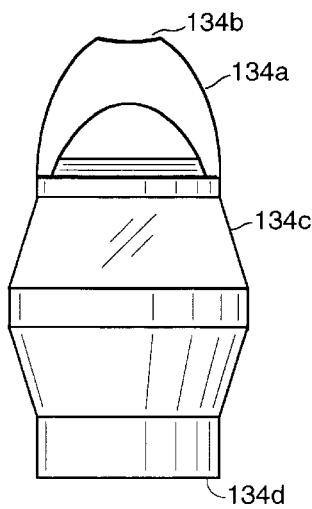

FIG. 134 is a side view of an optical system similar to that of FIG. 133, but in which nothing is attached in front of the secondary reflector to provide a smooth outer surface. Also shown is a beveled light source.

Figure 135:
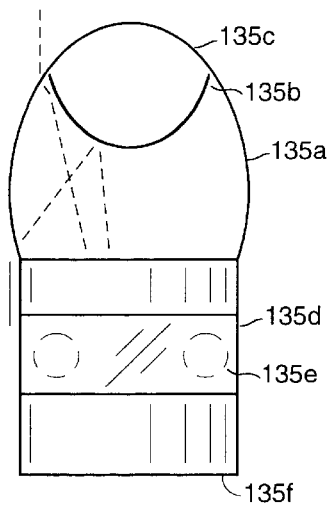

FIG. 135 is a side view of a catadioptric embodiment of the optical system of the present invention having only one internal wide angle reflector surface and a front fixture which provides a smooth front surface, said fixture being passive or including supplemental imaging means or illumination means, of both; some embodiments of illumination means utilizing the outer surface of the wide angle reflector surface as a reflector; the main optical substrate of the optical system having a hyper hemispherical outer refracting surface which facilitates full sphere coverage. The small circles in broken lines in the band behind the optical substrate represent locations for light sources or a ring light source.

Figure 136:
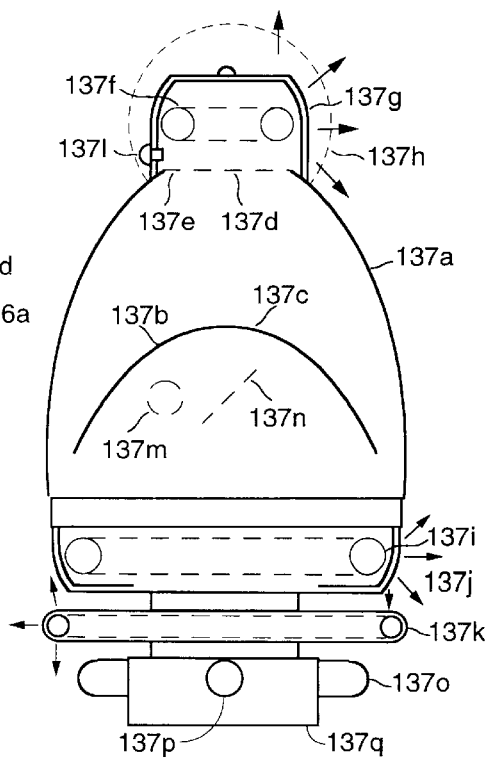

FIG. 136 is a side view of an optical system similar to that of FIG. 135, having a and flush front central element similar to that of FIG. 115, the optical substrate of said optical system being longer than that of FIG. 135 in order to facilitate a wider field of view when said substrate is immersed in liquid media.

Figure 137:
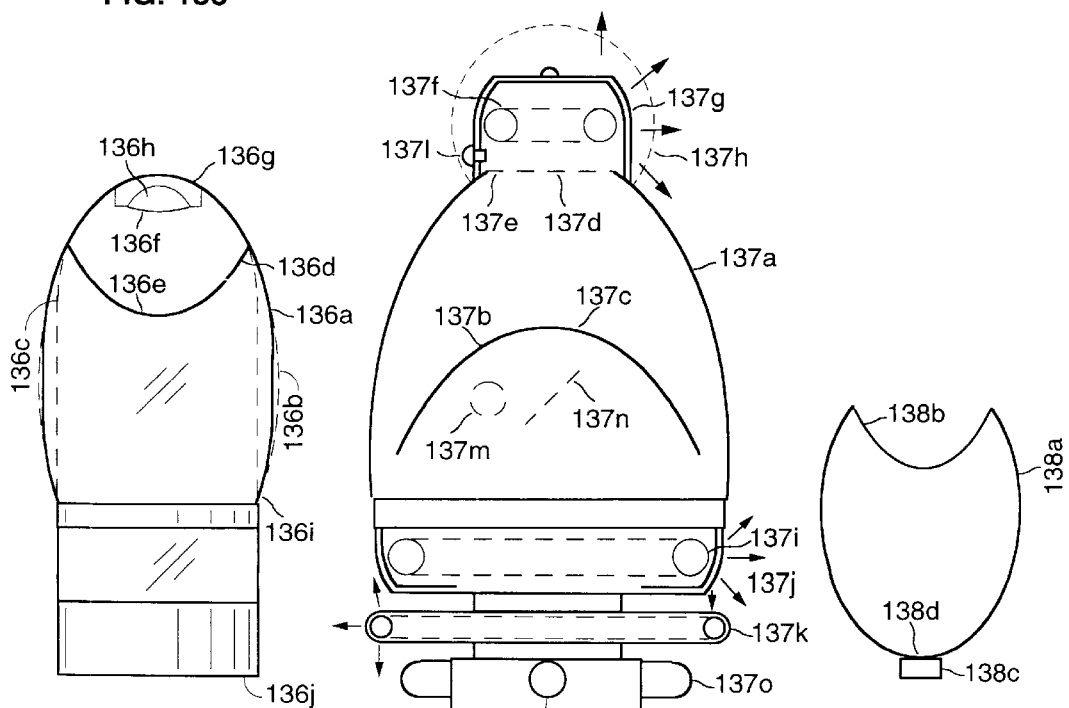
FIG. 137 is a side view of an omnidirectional embodiment of the invention having means for omnidirectional illumination through the use of ring illuminators or multiple conventional illuminators, also showing a camera and a series of microphones.

FIG. 137 is a side view of an omnidirectional embodiment of the invention having means for omnidirectional illumination through the use of ring flashes or multiple conventional illuminators. Locations suitable for ring flash elements are shown as small circles toward the sides of the invention. Also shown are a beamsplitter and a flash element and partially reflective secondary reflector, any of which, when present, may be utilized to distribute light through the optical system, as may be practical in the case of range gated imaging or where the optical system of the invention is otherwise used in providing illumination. A series of microphones are shown near the bottom of the image, said microphones being associated with the optical system, a sound recorder, a camera, or a combination thereof.

A preferred embodiment of the invention further comprises means for illuminating the subject matter when said invention is utilized as an image capture system. Such an embodiment may be attached to, incorporated into, or otherwise associated with, a film or electronic imaging camera, photographic optical system, electronic image system, motion picture system, surgical instrument, endoscope, bore scope, surveillance instrument, robotic device, sensor, or similar article, said article incorporating means for providing illumination of the subject, said illumination means being located behind said primary reflector surface and in front of said secondary reflector surface, said illumination means being shielded so as not to directly illuminate the optics in order to reduce flare. In cases where electronic flash is used in lieu of or in addition to continuous lighting, a flash which may be in front of said secondary reflector surface may be triggered by a photosensitive or radio frequency slave sensor in order to eliminate wiring. Continuous or suitable flash illumination is compatible with both still and motion picture images.

The invention may be further associated with an electronic imaging sensor and provide subject illumination which employs range gated imaging by means of a sensor exposure of up to only a few to a few dozen nanoseconds, whereby a shorter effective exposure is provided for objects nearest the optical system; said illumination being compatible with a system in which illumination is actually directed through said optical system by means of a beam splitter or partially transmissive reflector or reflector surface prior to the initiation on an exposure.

Figure 138:
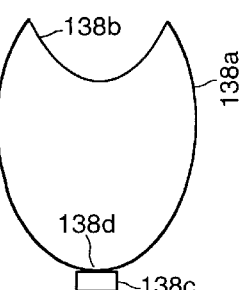
FIG. 138 is a side cross sectional view of an embodiment of the invention which is utilized as a wide angle antenna.

FIG. 138 is a side view of an embodiment of the invention which is utilized as a wide angle antenna, said substrate being foam or another material.

Figure 139:
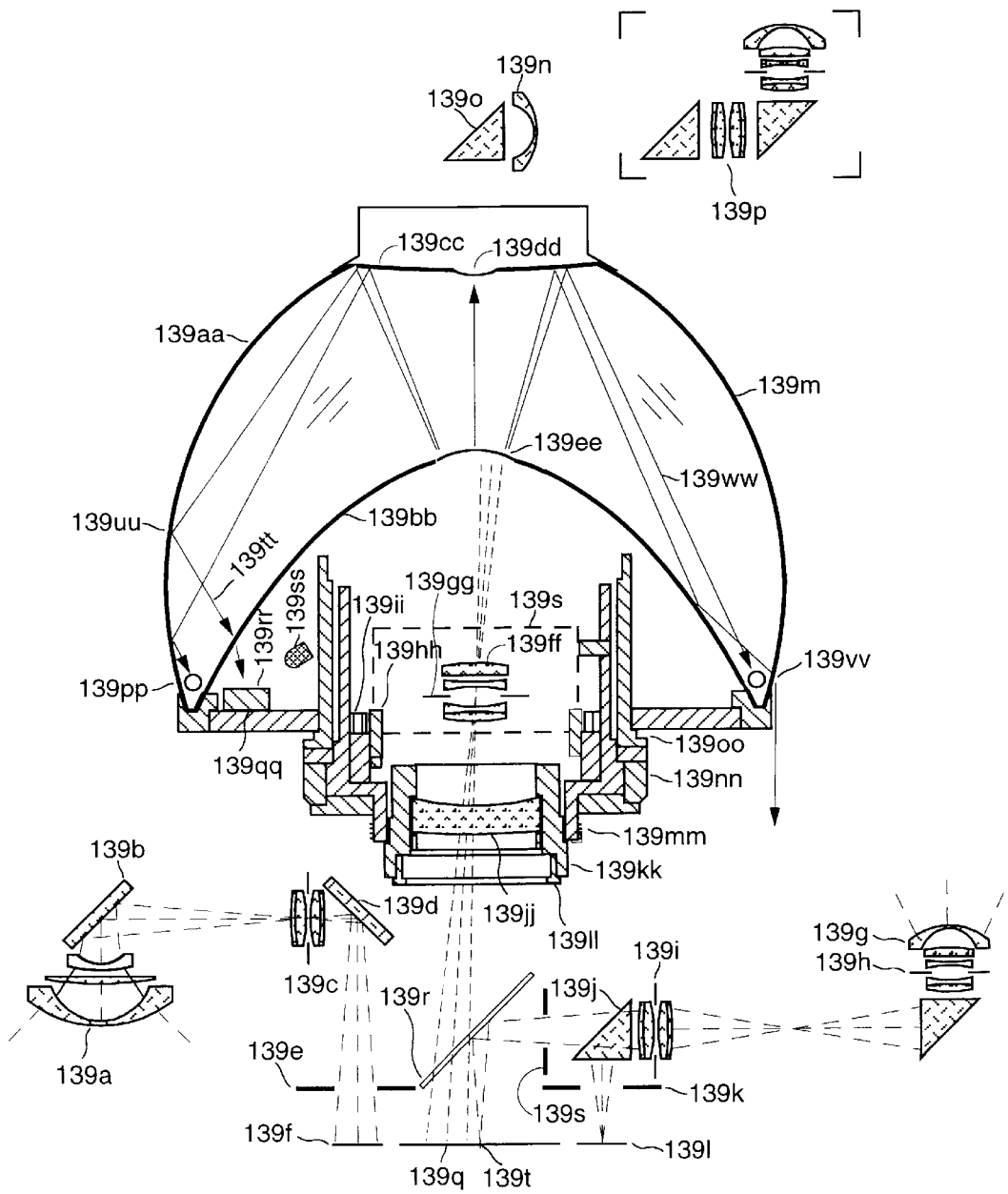
FIG. 139 is a side cross sectional view of an embodiment of the optical system of the invention having periscopic auxiliary optics and appropriate reflectors and baffles to provide supplemental imaging of subject matter or instrumentation. Also shown are means for imaging tilt indicators and other instrumentation which are integrated into the optical system.

FIG. 139 is a side view of an embodiment of the invention having aperture adjustment means and periscopic optics and appropriate baffles to provide supplemental imaging of instrumentation and other subject matter, showing said periscopic optics positioned to cover the area toward the front and rear of the invention. Also shown are means for imaging tilt indicators and other instrumentation which are integrated into the optical system. An image of the instrumentation may appear like that shown in FIG. 22. Also shown is a clear central area in the primary reflector surface which acts as a negative lens, thereby facilitating visibility of the entire secondary reflector through a small aperture, even when the vantage point is a substantial distance behind the optical substrate.

Additional coverage may be provided by off-axis periscopic optics which are also part of the invention and utilize reflectors and relay lenses to provide additional images at the focal surface. These images are most easily provided outside the perimeter of the primary image that is provided through the use of the solid the optical substrate; however, such images may be provided at the center of the primary image by means of an axial beamsplitter.

FIGS. 140 through 146 are pictorial views of the invention with accessory systems.

In applications including those in which the image is electronically processed or distributed (such processing including but not being limited to computer based digital image processing), it is desirable for the image data to include accurate indication of the limits of coverage or the location of specified coordinates within the image.

Data related to the limits of coverage is obtained by imaging attributes of or attachments to the optical system which indicate the limits of coverage. In regard to the outer perimeter of the image, the simplest form of coverage limit information is provided by the absence of imaged subject matter. Such indication may be provided by means which include the perimeter of the optic, a cell which retains the optic, or by a coating on the outer perimeter of the optic; however, the absence of subject matter is not a good indication in cases where the subject matter is dark near the perimeter of the invention.

Therefore, the preferred embodiment of the invention includes coverage limit means which do not rely on the presence or absence of subject matter. More particularly, the perimeter of the utilized portion of the optical system includes concentric light (or transparent, in some embodiments) and dark or colored bands or other indicators which are applied to the optical substrate or incorporated into its mounting. The central limit of the image may also be indicated by similar means which encircle the secondary reflector, its baffle, or the central transparent area in the primary reflector surface.

It is further desirable for the image data or related data to indicate whether the invention was properly leveled when the image was captured. In some cases, it is even more desirable to provide an indication of the degree to which the invention is tilted. This is particularly important when seeking to convert an annular or circular image into an undistorted rectangular panorama or to extract undistorted or minimally distorted views therefrom.

In a basic symmetrical implementation, electronic transformation of an annular or circular image to a rectangular panorama will result in an image in which a flat horizon appears to have a wavelike form when the original image is captured with the optical system was not oriented vertically and when a the perimeter or center of the image is used to establish the point or boundary of reference. The cause of this is obvious when one considers that, when the optical system is tilted, the image circle of a flat horizon must be eccentric with respect to the boundary of the image, thereby making it closer to one side than the other. By instead referencing to points on the image which represent the actual imaged location of a flat horizon or the centroid thereof, or by offsetting from the boundary of the image according to a formula based on the degree of tilt, a basic symmetrical transformation of the image to or from a rectangular format will result in a relatively flat image of the horizon. The remaining distortion relates to the fact that the horizon becomes elliptical rather than circular when the optical system is tilted. This may be compensated for by compressing the image in one dimension prior to transforming it to a rectangular format.

The present invention further comprises a level or tilt indicator which is incorporated therein or which may be attached to a variety of locations which include the front of the invention, where it may be imaged through a central transparent area in the secondary reflector surface. This permits it to be visible in the image without obstructing any part of the surrounding annular image. Off-axis locations include those in close proximity to and slightly behind the perimeter of the primary reflector surface, or any area that is within the field of view of the primary, secondary, or supplemental elements of the invention.

The level or tilt indicator may have easily distinguished indication means when observed from above and below, and where the indicator is well off-axis but within the perimeter of the optical substrate, it may be imaged directly or by means of a secondary reflector surface which is larger than what is required to image said primary reflector surface alone.

Visibility of the level or tilt indicator right in the image provided by the invention also provides means for its observation in a camera viewfinder, thereby facilitating effective hand held use of the invention. Other instrumentation which may be so imaged includes a chronometer, compass, thermometer, sun dial or other weather instruments, and other articles. These enhancements may be attachments for the invention, while other applications may indicate that the invention is an attachment or part for other systems. Such applications include weather stations, robotic vehicles, and theaters.

The optical system may utilize a rotating camera adapter for rotation of the unit to place the aperture control in a convenient position, said adapter consisting of lock rings where focus adjustment is required in an inexpensive system; said camera adapter incorporating a slot around its circumference which facilitates storage and transportation in a case without contact to any optical surfaces; said camera adapter accepting filters and auxiliary imaging optics, whereby different optics are in interchangeable cells which will allow one size and configuration of reflector unit to be adapted to a wide variety of camera formats, projectors, and other instruments, whereby, a short tube of the proper length typically houses a strong positive lens, a slightly long tube houses a weaker positive lens, and an even longer tube would house no lens, and a yet longer tube would house a negative lens, said tubes being used singly or in combination with the solid optical system to adapt same reflector unit to different format cameras while not necessarily requiring recalibration of focus.

A self-contained embodiment having an imaging lens will fit directly on a camera body An embodiment having a weak positive close up lens system may be used in front of a camera having a fixed or interchangeable lens.

Figure 140:
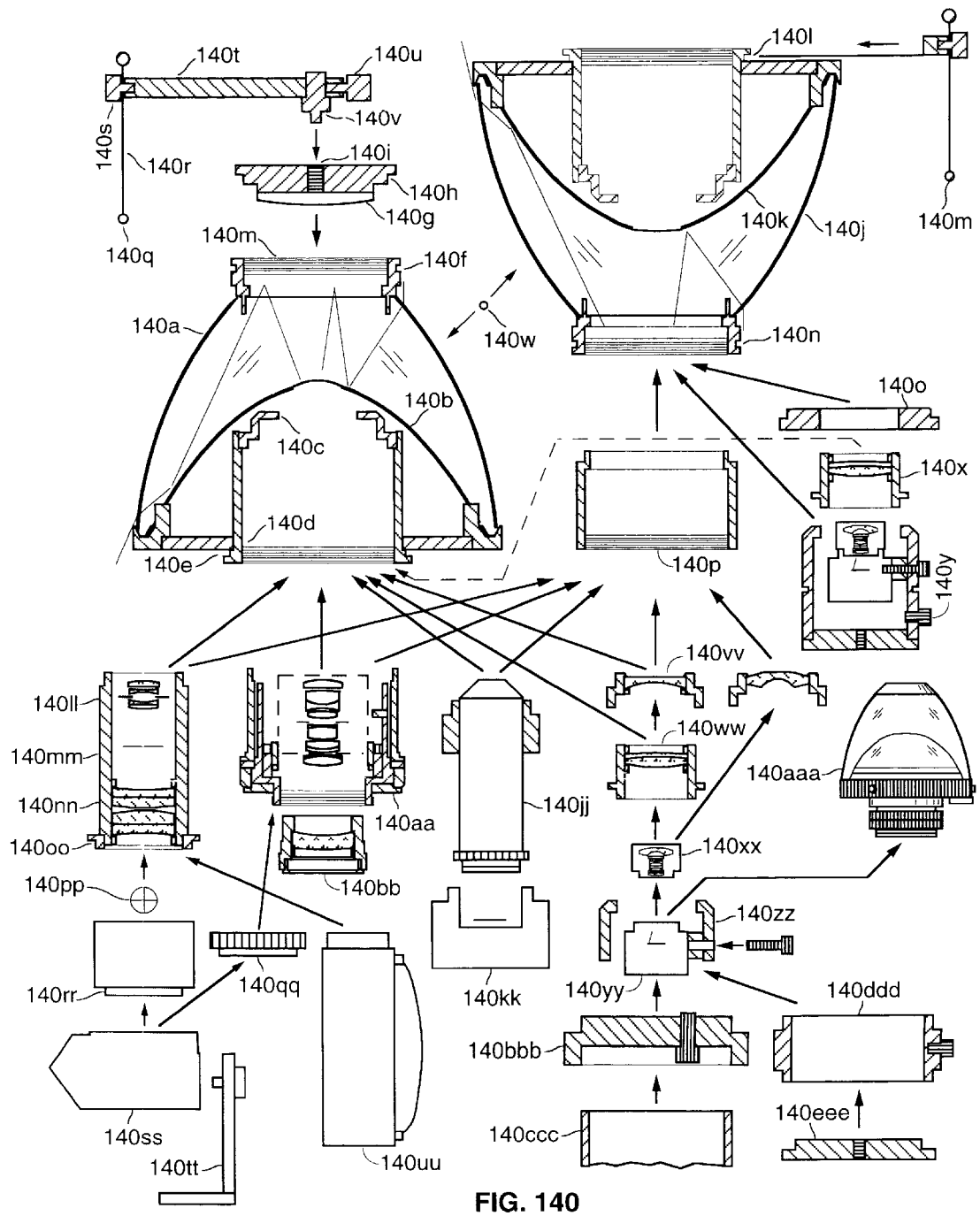
FIG. 140 is an exploded side view of an embodiment of the invention having interchangeable optics, optical cells, reflectors, occulting devices, tilt indicators, brackets, and mounting components which may also comprise the invention. Also shown are film cameras and electronic cameras which include camcorders and digital still cameras and sensors.

FIG. 140 is an exploded side view of an embodiment of the optical system of the present invention having interchangeable optical cells, reflectors, and mounting components which may also comprise the invention. Also shown are film and electronic cameras which include camcorders and digital still cameras having fixed and interchangeable lenses, plus a bracket which facilitates easier mounting of cameras on a tripod, pistol grip, or similar article so that said cameras point up or down. An afocal relay imaging system is shown toward the lower left, an imaging and correcting lens system like that which may be used with an interchangeable lens camera is immediately to its right, and a pinhole type video lens is the next item toward the right. Near the top are means for attaching occulting devices which are supported by wires or adhesives. A smaller embodiment of the optical system is toward the right.

FIG. 141 is an oblique pictorial view of a compound catadioptric embodiment of the optical system of the present invention, also showing a fitted case, a rigid divider in said case having cutout, the sides of said cutout engaging a slot or groove in the rear cell of the optical system, thereby providing means to store the optical system without any contact with its optics and without stressing the optics or any components attached thereto.

In order to facilitate handling of the invention without touching its optical surfaces, the mounting means of a preferred embodiment having a central cell that protrudes behind the perimeter of the rearmost utilized zone of the solid optical substrate. The cell is capable of supporting the weight of the entire optical system and provides means for handling the invention without touching its optical surfaces. Behind the outer perimeter of the invention is a central cell having a slot around its circumference which may be used to facilitate storage of the overall optical system in a fixtured case without any optical surfaces being in contact with said case, thereby minimizing the risk of damaging the optical surfaces. The slot or circumferential groove and other attributes of the cell provide means for the attachment of accessory devices including one or more occulting objects, level or tilt indicators, and data display devices; said indicators and display devices being directly visible from outside of the optical system as well as being imaged at said focal surface of a camera or other article. A preferred embodiment of the optical cell also has provision to accept filters and house said refracting optics or interface with interchangeable optical cells.

FIG. 142 is a side pictorial view of a compound catadioptric embodiment of the optical system of the present invention, also showing a cylindrical cover which may be transparent.

FIG. 143 is a side pictorial view of a compound catadioptric embodiment of the optical system of the present invention, also showing adjustable occulting object attachments.

The invention further comprises attachments and other means to reduce flare, including optimized optical surfaces, anti reflection coatings, and one or more occulting objects for bright light sources. Then occulting object may be comprised of a small darkened occulting body which is affixed to at least one end of a thin wire or rod of sufficient rigidity to prevent oscillation of said occulting body by wind or moderate motion. The wire may be attached in front or behind said solid optical substrate and provide means to adjust the occulting body position. An occulting body or a plurality thereof may also be temporarily or permanently affixed directly to the outer refracting surface of the optical system by means of an adhesive bond. Various embodiments of the occulting body interrupt specular optical communication between a bright light source which may include the sun and the focal surface of a camera, sensor, or other article.

The occulting body typically has an angular subtense that is larger than the occulted light source as seen from the corresponding area of said virtual image from the primary wide angle reflector surface, thereby causing the image of said occulting body to completely cover said light source in the image formed by the optical system, said occultation resulting in a substantial reduction in unwanted reflections and flare.

FIG. 144 is a side pictorial view of a catadioptric embodiment of the optical system of the present invention, also showing adjustable occulting object attachments.

FIG. 145 is an oblique pictorial view of a compound catadioptric embodiment of the optical system of the present invention, also showing adjustable occulting object attachments and their fittings.

FIG. 146 is side pictorial view of a compound catadioptric embodiment of the optical system of the present invention, also showing adjustable occulting object attachments and their fittings.

The optical system is applicable to the omnidirectional expansion of lasers and other light sources for communications, switching, opto isolation, illumination, holographic imaging and projection, and other applications. The invention may further comprise axial expansion optics in association with its reflector surface, said expansion optics expanding the coverage of a lasers or other light sources to cover the entirety of its reflector surface, thereby providing omnidirectional expansion of said light source for applications including holographic imaging and projection. Embodiments of the invention having at least one radially compressed optical surface typically provide the most efficiency in this type of application.

FIG. 147 is a simplified side cross sectional view showing the application of a compound embodiment of the optical system of the present invention to omnidirectional expansion of laser light or other energy. A radially compressed secondary reflector maximizes efficiency by facilitating utilization of the central part of the beam.

FIG. 148 is a simplified side cross sectional view showing the application of an embodiment of the optical system of the present invention having only one reflector surface to omnidirectional expansion of laser light or other energy. A radially compressed reflector maximizes efficiency by facilitating utilization of the central part of the beam.

FIG. 149 is a side view showing the association of the optical system of the invention with a projector, further comprising means to illuminate a surface exactly on the opposite side of the optical system from the projector, thereby preventing the optical system from being visible from below or effectively obstructing the projection.

FIG. 150 is a side view showing the association of the optical system of the invention with a camera or projector, also showing close up lenses and a central mask to control central imaging.

FIG. 151 is a side view showing the association of the optical system of the invention with a camera or projector, also showing a relay lens system which facilitates afocal imaging. The top of the figure shows a flexible transparent film which may be applied to the optical system of the invention to protect it from damage by smoke, wind, moisture, chemical fumes, or other factors.

FIG. 152 is a side view of a catadioptric embodiment of the optical system of the present invention on a mounting having a side support strut, said strut having an adjustable platform which accepts a camera, secondary reflector, or other article. The bottom end of the optical system will also accept a camera, sensor, projector, or similar article.

FIG. 153 is a simplified side view of a fisheye lens having a central mask.

FIG. 154 is an oblique cross sectional and pictorial view of outer image boundary indication means.

Figures 155, 156:
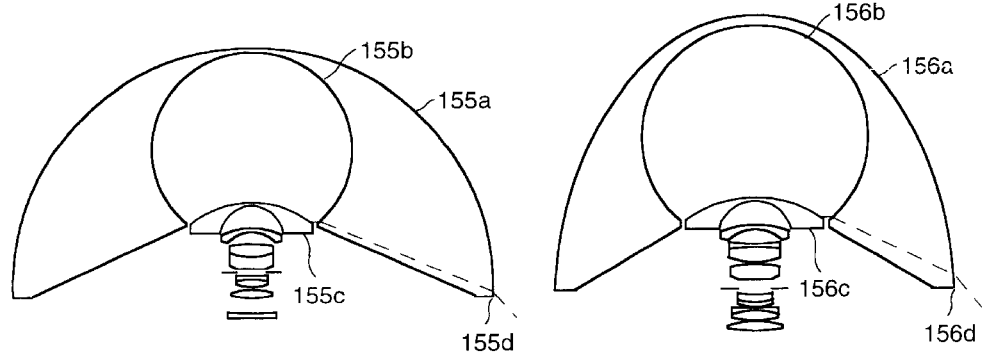
FIGS. 155 through 157 are side cross sectional views of embodiments of the invention which extend the field of view of reflectors and existing or custom wide angle lenses.
Figures 157, 158:
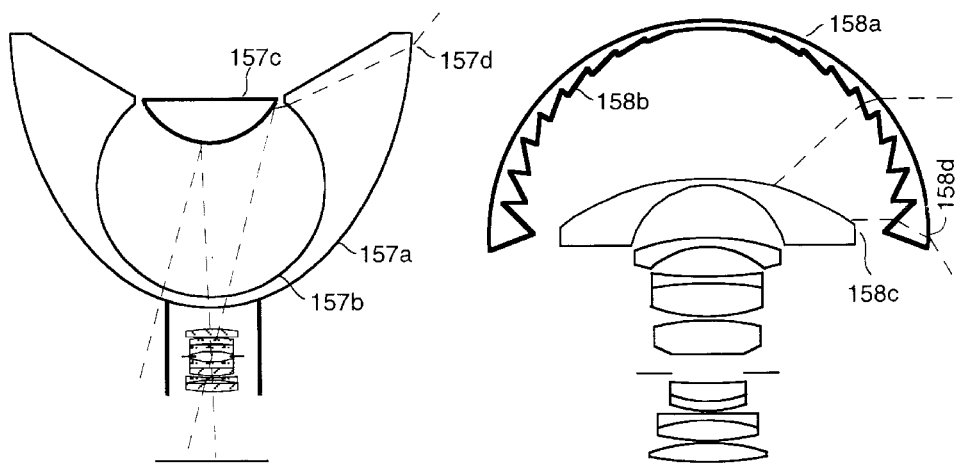
FIG. 158 is a cross sectional view of a formed Fresnel lens which extends the field of view of a fisheye lens. For clarity, the size of the Fresnel zones is greatly exaggerated.

FIGS. 155 through 157 are side cross sectional views of embodiments of the invention which extend the field of view of reflectors and existing or custom wide angle lenses. xxx 59/bef 155

The concept of widening the field of view of a given reflector by means of refraction through an optical substrate is also applicable to the use of refracting elements which are separate from the reflector or another wide angle optical system, such as in an embodiment where a reflector of moderate coverage is surrounded by an annular (or semi-torroidal by some definitions) optical element having a radial cross section similar to that of the front element of a fisheye lens; in some embodiments, the apex of said reflector is positioned near the longitudinal center of said annular optic.

An outer refracting surface or element is applicable to extending the field of view of an existing or custom hyper hemispherical fisheye lens, where the internal surface of the substrate has a hyper hemispherical void rather than a reflecting surface and said fisheye lens is positioned inside, with its front element just in front of the rear limit of said hyper hemispherical curve.

Some embodiments of the invention utilize a separate refracting optical system or element which surrounds a wide angle lens or reflector, said separate refracting optical element or system being utilized to modify the effective field of view of a wide angle reflector in the invention. Optical systems or elements of this type include strong convex, meniscus, or annular elements which may have continuous or formed Fresnel surfaces.

In some embodiments, the optical substrate surrounds a wide angle refracting or reflecting optical system which may include a fisheye lens, said substrate acting entirely as a refracting element and extending the field of view of said wide angle refracting or reflecting optical system. The internal surface of the optical substrate has a refractive hyper hemispherical void rather than a reflecting surface, said wide angle refracting or reflecting optical system being axially positioned inside of said optical substrate, the perimeter of the front element of said wide angle refracting or reflecting optical system being in close longitudinal proximity to the rear limit of said internal hyper hemispherical surface of said optical substrate.

FIG. 155 is a side cross sectional view of a wide angle optical element having a hyper hemispherical void and a hemispherical outer surface, said element substantially increasing the field of view of the fisheye lens shown immediately behind it.

FIG. 156 is a side cross sectional view of a wide angle optical element having a hyper hemispherical void and an aspheric outer surface, said element substantially increasing the field of view of the fisheye lens shown immediately behind it.

FIG. 157 is a side cross sectional view of a wide angle optical element having a hyper hemispherical void and an aspheric outer surface, said element substantially increasing the field of view of the wide angle reflector fisheye lens shown inside it.

FIG. 158 is a cross sectional view of a formed Fresnel lens which extends the field of view of a fisheye lens or other optical system. For clarity, the size of the Fresnel zones is greatly exaggerated.

FIGS. 159 through 163 are side cross sectional views of embodiments of the invention having annular lenses which extend or otherwise modify the field of view of a reflector, said figure also showing imaging and correcting lens systems which may be used with an article having a focal surface.

An embodiment utilizing an outer element to modify the field of view may consist of a convex specular reflector having radial symmetry, said reflector being in optical communication with a great circle surrounding it, the plane of said great circle being perpendicular to the optical axis of said reflector said reflector having sufficient curvature to be in optical communication with a substantial area in front and behind the plane of said great circle, said reflector being surrounded by an annular optical element which may have a radial cross section similar to the diametrical cross section of the front element of a fisheye lens; said annular optical element extending the field of view of said reflector to cover a greater angle in front and behind the plane of said great circle, whereby said optical system produces a virtual image of the said great circle and said area above and below its plane, said virtual image being annular. The virtual image is visible from a vantage point in front of said reflector by means of said vantage point being in optical communication with said great circle and said area in front and behind the plane of said great circle by means of reflection from said convex reflector and refraction through said annular optical element.

A preferred embodiment of an embodiment having a separate outer element includes means for mounting its optical components, said means for mounting providing stable support and alignment of said reflector and annular optical element without causing deformation thereof, said means for mounting providing for attachment or interface of said optical system to an article which may have a focal surface, said article being in front of said reflector, said means for mounting providing a shielding to prevent stray light from entering critical parts of the optical system, said mounting means facilitating optical communication between said article and the utilized radial zones of said convex reflector.

To provide a real image of the virtual image, the optical system is associated with a refracting lens system, said refracting lens system being disposed coaxial to said optical system, both being associated with the formation of a real image of said virtual image at said focal surface, whereby said optical system combined with said article facilitates the geometric conversion of a great circle surrounding the invention and an area in front and behind the plane of said great circle into a real annular image at the focal surface of a camera or other article and the geometric conversion of a two dimensional annular image into an image which is projected onto a three dimensional surface or into three dimensional media.

The optical system is capable of covering up to the entire sphere around itself when the annular optical element extends the field of view from each side of said reflector to at least 180 degrees, or 90 degrees from either side of the plane of a great circle surrounding the invention.

Furthermore, the optical system tends to have a lighter weight for a given diameter than the forgoing embodiments having solid optical substrates.

The subject matter near the horizon may be emphasized in any embodiment of the invention through utilization of a reflector figure in which the effective radius of curvature is decreased toward both the central and edge zones. This type of reflector can also be used to compensate for any radial compression of the image which may be caused by the annular element of the presently described embodiment. As with other embodiments, radially compressed and enlarged reflectors may be utilized in correcting aberrations or influencing the field of view or the apparent size of a central obscuration or exclusion zone.

The present invention may include a reflector having a conical figure or even a reflector surface in which the figure is like that of a convex cone having a concave curvature on its sides, a preferred embodiment of the latter figure causing radial distribution of the image to be the reverse of that produced by reflection from a conventional convex reflector. Such a reflector surface is shaped like a chocolate drop or the front of a trumpet. Where the apex of the reflector is a point, the resulting image may be circular rather than annular.

Embodiments including those having a smaller effective radius of concave curvature toward the outer edge may be optimized to cause the rays from each point radial from the center to intersect at a given point, thereby permitting all rays to intersect at a given annular zone, in turn reducing or eliminating distortion of the entrance pupil. This embodiment may have a housing in which only a thin slit around its circumference is required to admit all light from the imaged subject matter, thereby reducing flare. Reduction of flare is even more dramatic when the slit is made so that its boundaries are defined by sharp edges. The reflector may be supported as a surface if an optical substrate or by means including an axial strut or optical window. Where the reflector surface is an internal surface of an optical substrate or where a surrounding optical element is used, the entrance aperture on the outer optical surface need only consist of a narrow band around its circumference when it is positioned at or near the radial zone in which rays from the reflector surface intersect.

FIG. 159 is a side cross sectional view of an annular wide angle optical element which surrounds a wide angle reflector and substantially increasing the field of view, said annular element having a radial cross section similar to that of the front element of a fisheye lens and said reflector having a spherical or aspheric figure. The optical systems in this and other views are also applicable for use with miniature internal cameras and other articles as well as cameras, projectors, and other articles which are not physically attached. Occulting objects and other accessories may be attached to these optical systems in ways similar to how they are attached to other embodiments of the optical system of the present invention.

FIG. 160 is a side cross sectional view of an annular wide angle optical element which surrounds a wide angle reflector and substantially increasing the field of view, said reflector having a conical figure.

FIG. 161 is a side cross sectional view of an annular wide angle optical element which surrounds a wide angle reflector and substantially increasing the field of view, said reflector having a hybrid figure which is thickest in the center and has a concave annular curvature similar to that on the front of a trumpet or the side of a chocolate drop or golf tee, said hybrid figure causing central rays from each point in a given sector of the subject matter to intersect at one point, whereby the entrance pupil may be an annular ring, whereby distortion of the entrance pupil by said annular optical element are minimized. The hybrid reflector figure is also applicable to solid catadioptric systems and to systems which do not have an outer refracting surface or element, said hybrid figure facilitating 360 degree panoramic imaging through a narrow slit or band of optical surface. Cross section lines are shown only in the outer optical element of FIG. 161 in order to permit approximate ray traces in other views to be illustrated more clearly.

FIG. 162 is a side cross sectional view of a longitudinally asymmetrical annular wide angle optical element which surrounds a compound wide angle reflector and substantially increasing the field of view, said reflector having a conical figure. Also shown is a tilt indicator which is imaged through a central hole in the secondary reflector. Two opposing wide angle reflectors may also be used inside such an annular element.

FIG. 163 is a side cross sectional view of an annular wide angle optical element which surrounds a solid catadioptric wide angle optical system and substantially increasing the field of view, said reflector having a conical figure. The annular optical element, the surfaces of the solid catadioptric optical system, and the imaging optics may be used in the correction of aberrations.

FIG. 164 is a side cross sectional view showing a variety of forms and locations for Fresnel optics which surround a reflector and modify its field of view or correct aberrations.

FIGS. 165 through 174 show the application of the optical system of the prsent invention to immersive projection systems which further comprise the invention. The optical system is applicable to omnidirectional image projection in virtual reality headsets, booths, suites, theaters, work stations, simulators, or other environments.

The invention is further applicable to means to sense motion, or to record, transmit, or distribute environmental or artificially generated phenomena which include sound or sound data.

The optical system of the present invention can be used with digital, video, motion picture, 35 mm, and medium to large format cameras to capture still and motion images, motion images typically being a series of still images or a still image accompanied by a series of images or data that define differences from the first image in a given scene. Some embodiments of the invention (typically larger ones) can be used for projecting 360 degree panoramic images in cylindrical or spherical booths, suites, or theaters which further comprise part of the invention. Some embodiments of panoramic projection of the invention utilize an external reflector which may be supported by an axial strut or other means.

If a curved reflector or an embodiment of the optical system of the present invention having a solid catadioptric substrate is oriented in the same way it was used when the original images were taken, it will facilitate accurate projection of the image it captured when used to project said images onto a spherical projection surface. When projection of the panoramic or full sphere image is the primary form of presentation, an additional advantage stems from the fact that the reflector surface tends to counteract its own distortion when used for this type of projection. In many cases, this can make it relatively practical to utilize relatively inexpensive spherical reflectors or reflector surfaces for both imaging and projection.

Torroidal reflector surfaces and full sphere embodiments of the optical system of the present invention or front and rear supplemental projection or supplemental central optical system similar to those in or associated with the present invention can be used tp facilitate uninterrupted projection coverage. For simplicity, this implies that the reflector should be pointed straight up or down for most projection applications. Downward pointing reflector surfaces may be good for some amusement park rides, which, for example may simulate a balloon flight.

Depending on how the original image is processed, transformed, or redistributed, a reflector or the optical system of the present invention can be used in many projection configurations, including those where the secondary mirror is on a column above the floor; or an embodiment without any secondary mirror may be supported above the column or below the ceiling with rigging or an axial strut. In this type of embodiment, the actual projector can either be above or below the reflector surface, or it can be off to one side, with its image being reflected to the wide angle reflector surface with a tilted or diagonal mirror. This facilitates the use of conventional motion picture projection systems and the reflector surface or surfaces provide a true 360 degree surround experience because of the extraordinarily wide vertical coverage.

The projection designs which were the initial basis for the projection embodiments of the present invention were initially conceived for still photos, but after the applicant saw his first total solar eclipse in 1979, he realized the potential of his optical and projection systems for full motion panoramic movies of such events. The present invention provides a degree of immersive projection coverage that is superior to that of the prior art, particularly since some embodiments of the present invention comprise a suite where participants are free to get up and walk around just like they typically would at a real solar eclipse or any other event. The projection techniques are also applicable to printing images or processing them by electronic means. Other embodiments include cylindrical, conical, spherical and other shapes of projection pr print surfaces which may be viewed from the inside or outside, applications thereof including panoramic lamp shades and surround projection or print booths.

The invention os further applicable to presentation means which may be incorporated into small image viewers which include hand held viewers. When the applicant was using a magnifier to view sections of a high resolution annular panoramic image he transformed from a series of conventional photographs through a photographic process he developed, he was impressed that viewing the image was actually reminiscent of being at the place where he had taken the original panoramic photos. This was particularly true if the print was curled or the magnifier was tilted to reduce distortion from the curved image of the horizon. He soon envisioned a small viewer about the size of a Viewmaster (R) that could be used to view small sections of small circular panoramic transparencies or prints. He further realized that it was possible to make a viewer that would optically refract or reflect the viewed area in such a way that the horizon would appear straight and the proportions of the imaged subject matter would still appear normal. He later conceived a stereo version which would use horizontal rectangular format panoramic images or transformed circular stereo panoramas that could be taken with a stereo panoramic camera he had also developed. Image processing techniques which electronically manipulate an image in the same way as the described optical systems are also applicable to the present invention.

When used in the presentation of various subject matter, a basic embodiment of the invention comprises the optical system, support means, and association with or incorporation into a projector, and a fully or partially surrounding projection surface which may be cylindrical, spherical, or other shapes. One preferred embodiment facilitates the geometric conversion of an annular image into a cylindrical, spherical, or hybrid projection around said optical system, whereby the convex reflector surface of the invention has a strong aspheric figure which, in conjunction with the outer refracting surface, facilitates correct image proportions and substantially constant projection brightness throughout the projection area, said cylindrical projection being applicable to display and printing of an image.

A different embodiment may include one in which the optical system is associated with a projector and a spherical or semi spherical projection surface to facilitate the geometric conversion of an annular image into a projection onto a three dimensional projection surface (which may include a spherical surface) or into three dimensional media around said optical system, whereby said convex reflector surface is at the center of said spherical projection surface, said reflector surface having an aspheric figure which, in conjunction with the figure of the outer refracting surface, facilitates correct image proportions and constant projection brightness throughout the projection area.

A more elegant and effective embodiment is one in which the optical system of the present invention or another wide angle optical system is associated with a projector and a three dimensional projection surface or three dimensional media which surrounds up to the entire area around said optical system. This facilitates the geometric conversion of an annular or circular image into a three dimensional projection which partially or completely surrounds the optical system in all directions. The projection surface or surfaces may be a spherical, semi spherical, quasi spherical, conical, cylindrical, or hybrid. The optical system may be at a point other than the center of the projection area in order to provide more space for participants.

Constant projection brightness is facilitated by means of an optical system having a reflector surface with a strong aspheric figure which, in conjunction with an outer refracting surface or element (where present), may be used to facilitate correct image proportions and constant projection brightness throughout the projection area in spite of the varying distances to said projection area.

The invention further comprises means to reproduce, simulate, or generate real or fictional environmental effects including sound, wind, or odor, said apparatus also facilitating the geometric conversion of an annular or circular image into a three dimensional projection around said optical system, said apparatus being applicable to association with or incorporation into articles including virtual reality headsets, games, simulators, robotic devices, command and control systems, booths, suites, home entertainment systems, conference rooms, and theaters.

A plurality of the optical system of the present invention or a combination of wide angle optical systems which may include said optical system of the present invention may be utilized to project images into multiple rooms, including multiple portal virtual reality suites and theaters; said apparatus providing for the active masking of projection onto doorways where needed. Masking may be accomplished by the manipulation of projection image data or with actual masks which are appropriately positioned in order to obstruct optical communication between an open doorway and the projection source, said masking means having provision to be synchronized with the opening and closing of doors and portals between different rooms. Further, a fixed mask may be used where a doorway is always open, said fixed mask being either a separate part or a coating which is applied to the outer surface of the optical system.

Two or more optical systems of the invention, or masked refracting optical systems, or a combination thereof, may be associated with a projectors and a cylindrical, spherical, or other three dimensional projection surface, said optical systems being off center and typically on opposing ends of said projection area, said arrangement facilitating the geometric conversion of two annular images into a projection which covers the entire inside of said projection area without obstructing the center of said projection area or requiring projector light to pass through the center of said projection area, thereby permitting members of an audience to be positioned at and near the center of said projection area, said optical system also having provision for rear projection or illumination means onto an area surrounding the back surface of its perimeter.

The invention further comprises means to suspend one or more members of an audience at and near the center of said projection area, said suspension means having provision for changing the orientation of one or more audience members, including lowering and raising an audience member to and from the floor or a raised platform or ledge, the surface of said projection area under the audience being comprised of inexpensive modular sections or covers which can be replaced if soiled by a participant's feet or the results of motion sickness.

FIG. 165 is a perspective view illustrating an embodiment of the invention having a cylindrical projection surface to provide a virtual reality display which surrounds the participants. Many shapes are applicable to the projection surface. Also shown are sound and wind generation means. The relative size of the optics and some fixtures. are exaggerated for clarity. The raised participant platform provides a greater sense of total immersion and may be round, linear, or of shapes including a cross or asterisk. The platform may be accessed by means of steps as shown, or by portals on the same level which consist of doors through the projection surface.

FIGS. 166 through 172 are interior side views of virtual reality projection embodiments of the invention. Many shapes are applicable to the projection surfaces, but round projection surfaces are shown for illustrative purposes.

FIG. 166 is a simplified side cross sectional view of an immersive projection system which may be used in the simulation of balloon rides, cruises at sea, and other events or occurrences. The projector may be below the projection surface as shown or be closer to the reflecting optical system. If the optical system is of a Cassegrain embodiment, the projector may be behind it or a right angle reflector may direct light to it from a side projector.

FIG. 167 is a simplified side cross sectional view of an immersive projection system which uses a convex solid catadioptric Cassegrain reflector system and a small central baffle which may be moved along the optical axis to provide a smooth transition of the projected image across the top center of the projection surface. Participants are shown on the bottom platform.

FIG. 168 is a simplified side cross sectional view of an immersive projection system having multiple projectors.

Figure 169:
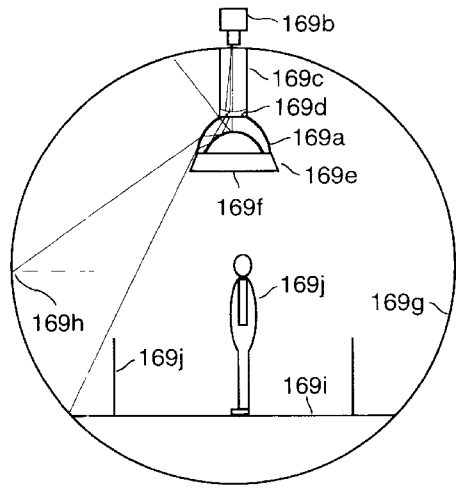

FIG. 169 is a simplified side cross sectional view of a small immersive projection system which utilizes a solid catadioptric reflector substrate and a single projector.

Figure 170:
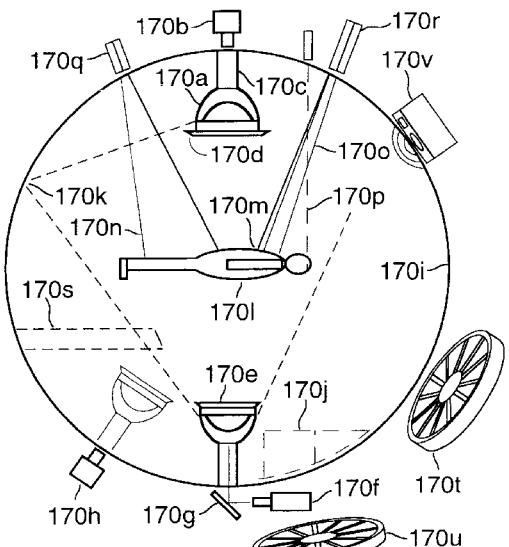

FIG. 170 is a simplified side cross sectional view of an immersive projection system which utilizes one or more reflectors, also showing means to suspend a participant, further showing a retractable ledge and removable floor sections or coverings which may be replaced if soiled by a participant's feet or by motion sickness.

Figure 171:
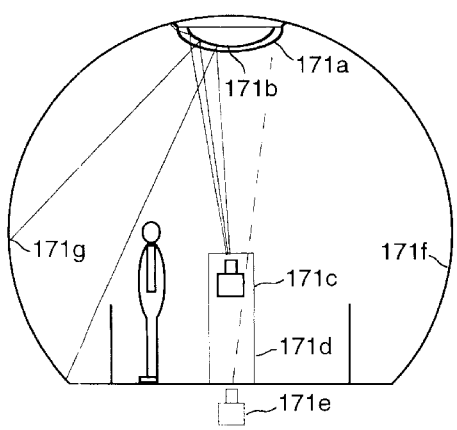

FIG. 171 is a simplified side cross sectional view of an immersive projection system which utilizes an oblate aspheric second surface reflector.

Figure 172:
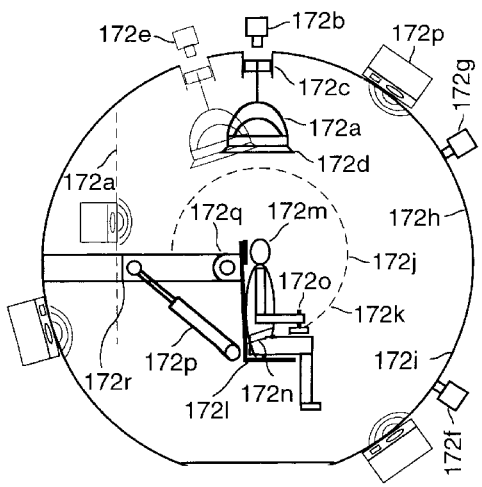

FIG. 172 is a simplified side cross sectional view of an immersive projection system which utilizes a second surface wide angle reflector, also showing a seat having actuators to physically move a participant.

Figure 173:
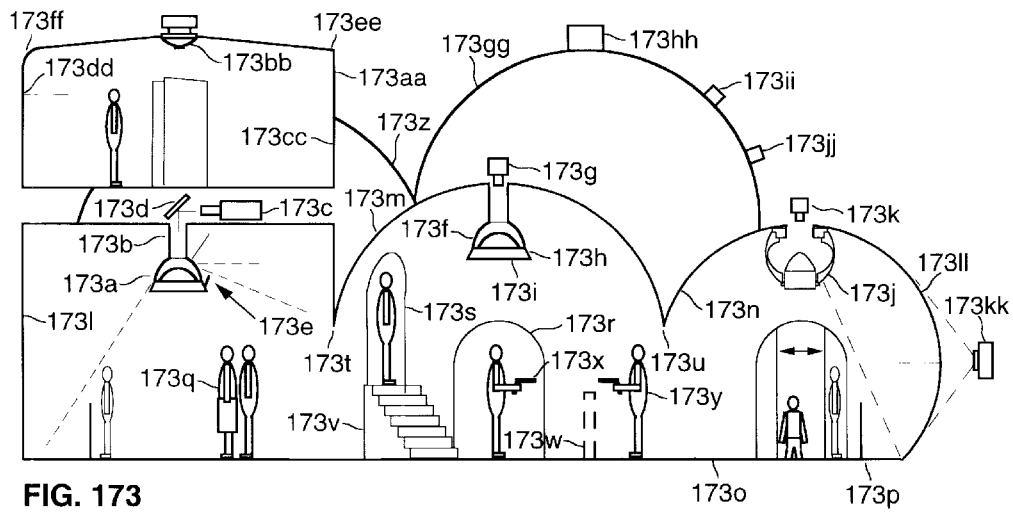
FIGS. 173 and 174 are side interior views of rows of rooms in multiple portal virtual reality projection embodiments of the present invention. Shown are virtual reality projection suites having means for immersive imaging and sound and wind generation. The doors in a matrix of suites may be opened and closed, and the image projection apparatus provides means for the active masking of projection into open doorways.

FIG. 173 is a side cross sectional interior view of a row of rooms in a multiple level multiple portal virtual reality projection suite having means to mask projection into doorways or temporary portals. The doors between rooms or areas in a matrix of suites may be opened and closed, and the image projection apparatus provides means for the active masking of projection into open doorways. Masking means may consist of moving masks near the reflectors or the projection source, liquid crystal or other masking local to the reflector surface, including a "chamaeleon" reflector surface or a portion thereof, software or film masking to provide a lack of projection data in the masked area, or a combination of these and other means. Various embodiments of the optical system of the present invention or the applicant's prior inventions are shown as projection optics.

Figure 174:
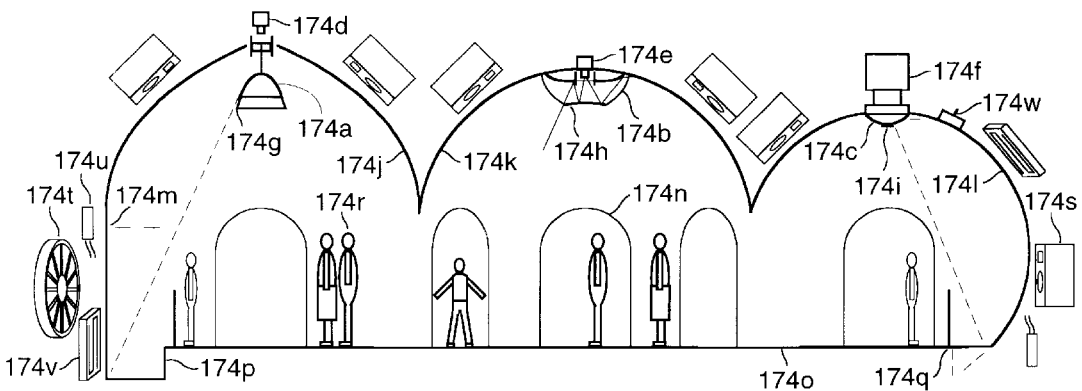

FIG. 174 is a side interior view of a row of rooms in a multiple portal virtual reality projection suite having means for immersive imaging and sound and wind generation. The doors in a matrix of suites may be opened and closed. A reflector, an embodiment of the optical system of the present invention, and a masked fisheye lens are shown as projection optics.

Figure 175:
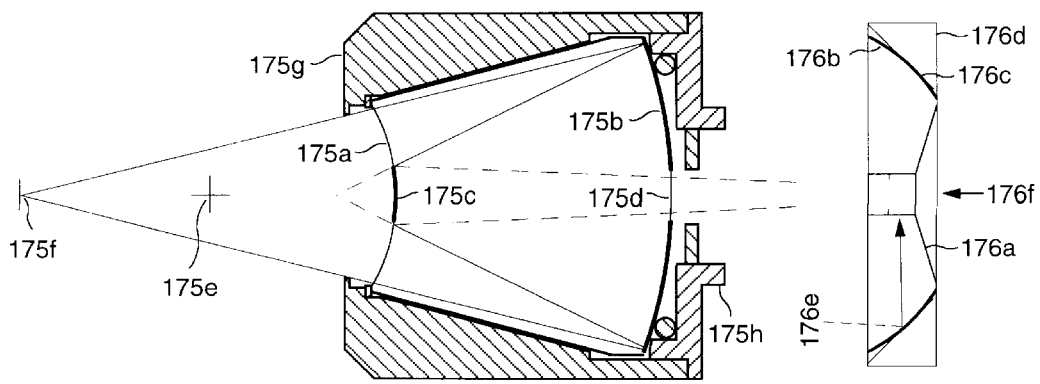
FIG. 175 is a side cross sectional view of a solid catadioptric long distance microscope objective which also comprise the invention.

FIG. 175 is a side cross sectional view of a solid catadioptric long distance microscope objective. The present invention is applicable to long distance microscopy when its optical substrate comprises an annular primary reflector surface that forms a convex outer surface on the rear of said substrate, said primary reflector surface having an annular reflective coating and being concave as seen from the inside the substrate, the front optical surface of said substrate forming a concave surface on the front of the substrate which is smaller than said primary reflector surface, the center of said front optical surface having a reflective coating, wherein the center or centers of curvature for both optical surfaces are in front of said substrate, whereby an axial point beyond the front of the substrate is in optical communication with an axial point outside the substrate and behind the primary reflector surface by means of transmission through the outer zones of the front optical surface, reflection from the primary reflector surface, reflection from the center of the front optical surface, and transmission through the transparent center of the rear optical surface, whereby the optical substrate functions as a long distance microscope objective which may be used in association with a housing, eyepiece, camera, correcting optics, or similar articles. The optical system of this embodiment functions as Cassegrain telescope having a solid optical substrate, said telescope having means to be focused subject matter that is close to its front optical surface.

Figure 176:
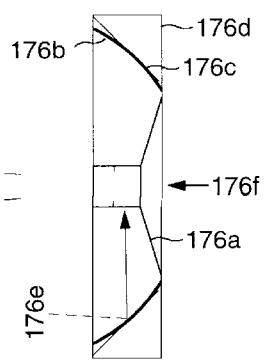
FIG. 176 is a side view of a panoramic objective which images central subject matter.

FIG. 176 is a side view of a panoramic objective which images central subject matter. The present invention is applicable to panoramic microscopy when it includes a reflector surface that is a concave surface of revolution as seen from the inside of its substrate. When the reflector surface is annular and surrounds a central void in the substrate, the optical system provides a real or virtual (depending on the figure of said annular reflector surface) 360 degree annular image of all sides of subject matter which is inside said central void, thereby simultaneously imaging said subject matter from all sides.

FIG. 177 is a side cross sectional view of the optical system of the present invention, showing afocal imaging optics and a video camera having multiple microphones and interface means for image distribution.

The invention may be embodied in any size camera, laparascopic surgical or observation instrument, endoscope, sigmoidoscope, bore scope, projector, home entertainment system, conference infrastructure, surveillance instrument, flight control system, robotic device, sensor, microphone, speaker, or similar article, and, where appropriate, said article or apparatus incorporating means for providing illumination of the subject or recording or transmitting sound originating therefrom or distributing recorded or generated sound therein. Where electronic imaging means are provided, the invention may incorporate or provide means to interface with systems which facilitate substantial real time digital processing of the images produced therewith. Image processing techniques which electronically manipulate an image in the same way as the described optical systems are also applicable to the present invention.

The present invention is also applicable to and comprises electronic image processing including computer based digital image processing and presentation. Software routines can be used alone or in conjunction with popular image processing software to essentially automate the process of converting annular or circular panoramic images to or from a rectangular format or otherwise modifying them. Image processing steps developed by the applicant to reduce distortion in an image which is transformed from polar to rectangular coordinates through the use of a basic polar coordinates filter include cropping the image (or selecting the equivalent image area) to square proportions that completely encompass the utilized part of the that the circular or annular image, then centering the circle in the circular or annular image image which corresponds to a flat horizon in said square image area. This permits the horizon in a final transformed square or rectangular image to be almost straight. Slightly scaling the image in one dimension to change a slightly elliptical horizon circle to a true circle in the circular or annular image prior to conversion to rectangular coordinates facilitates a completely straight image of a flat horizon. After the image is converted from polar to rectangular coordinates, it is scaled in one axis in order to provide normal proportions for at least objects at the horizon.

In addition, digital image processing analogous to the applicants printing and viewing techniques including those for transformation of an annular or circular image to or from a rectangular format or for viewing segments of an annular image may be used to actively correct and view localized areas of annular or circular panoramas, thereby eliminating the need to transform the entire panoramic image and facilitating real time viewing of undistorted sections of panoramic motion picture images. This is useful in virtual reality applications including those where looking straight "up" at the zenith would be desirable.

FIG. 178 is a cross sectional view of an embodiment of the invention having electronic imaging sensor, also showing an image display and interface means for image processing and distribution which further comprise the invention. Shown in the display are . . .

FIG. 179 illustrates the optical system of the invention with of image capture and distribution means which comprise the invention. Also shown are illustrations representing articles which may be used for image capture, distribution, and display with the invention, including computers, intranets, the Internet, closed circuit, cable, and broadcast television, control means for games and robotic devices, interactive input devices, goggles, underwater exploration, and monitoring, command and control for terrestrial, and interplanetary rovers, aircraft, spacecraft.

FIG. 180 is a perspective view illustrating an embodiment of the invention which is interfaced to elements of FIGS. 177, 178, or 179 and having a projection surface to provide a virtual reality display of the appropriate size to surrounds participants in a home or theater setting.

Grinding and polishing, turning, molding, or other means are applicable to fabrication of the solid optical substrate. Where precision molded plastic optics are utilized, the solid optical substrate of some embodiments can be molded with a simple two piece mold or die; other embodiments can be molded with more complex dies or in multiple pieces, said multiple pieces either being separated diagonally, on a plane perpendicular to the optical axis, or on a plane or planes radial to the optical axis; additionally, curved joints can be utilized rather than flat ones, whereby said joints are more easily concealed, said curved joints being symmetrical or asymmetrical with the optical axis; where the substrate is made in three sections separated more or less radial to the optical axis, said joints can be spiral.

This disclosure is considered as illustrative of the principles of the invention. Further, since numerous modifications and changes will readily occur to those skilled in the art, it is not desired to limit the invention to the exact construction, operation, and appearance as shown and described, and accordingly all suitable modifications and equivalents may be resorted to without thereby departing from the basic principles of the invention. It will be further understood that the invention is susceptible of embodiment in many various forms, some of which are illustrated in the accompanying drawings, and that structural details and modes of fabrication herein set forth may be varied and interchanged to suit particular purposes and still remain within the applicant's inventive concept.

What is claimed is:

1. An optical system comprising:
   a solid optical substrate having a convex outer refracting surface, said surface covering most of the front and side of said substrate,
   said substrate having an internal convex primary reflector surface of radial symmetry,
      said primary reflector surface being in optical communication with a great circle surrounding it, the plane of said great circle being perpendicular to the optical axis of said optical system, said optical communication being through the outer refractive surface of said substrate,
      said primary reflector surface having sufficient curvature to be in optical communication with a substantial area in front of and behind the plane of said great circle,
      said primary reflector surface having an optically transparent central zone,
   said substrate also having an internal secondary reflector surface of radial symmetry,
      said secondary reflector surface being coaxially disposed in front of said primary reflector surface, said secondary reflector surface having its reflective surface facing said primary reflector surface, said secondary reflector surface being in optical communication with said great circle surrounding said primary reflector surface and said area in front and behind the plane of said great circle by means of reflection from said primary reflector surface and refraction through the outer surface of said substrate, whereby said optical system produces a virtual image of said great circle and said area above and below its plane, said virtual image being annular, said virtual image being visible from a vantage point behind said optically transparent central zone of said primary reflector surface due to said vantage point being in optical communication with said great circle and said area in front and behind the plane of said great circle by means of reflection from said secondary reflector surface and said primary reflector surface and refraction through the outer surface of said substrate;

means for mounting said substrate, said means for mounting providing a protective shield behind the perimeter of said substrate, said means for mounting also having provision for handling the optical system without touching its optical surfaces;

said means for mounting providing stable support and alignment of said substrate without causing deformation thereof, said means for mounting providing for attachment of said optical system to an article having a focal surface, said mounting means facilitating use of said optical system in any orientation, said optical system being associated with a refracting lens system, said refracting lens system being disposed coaxial to said optical system, both being associated with the formation of a real image of said virtual image at said focal surface, whereby said optical system when combined with said article having a focal surface facilitate the geometric conversion of said great circle and said area in front and behind the plane of said great circle into a real annular image at the focal surface of said article, or the geometric conversion of a two dimensional annular into a three dimensional projected image.

2. Apparatus according to claim 1 where the outer refracting surface of said substrate comprises a surface of revolution, said surface of revolution being nearly perpendicular to the light path at a zone just outside the perimeter of the secondary reflector surface and any related baffle, whereby lateral chromatic aberration at said zone is negligible, whereby lateral chromatic aberration in the virtual image from the overall system will increase as a function of off-axis distance.

3. Apparatus according to claim 1 in which the outer refracting surface of said substrate comprises a surface of revolution, said surface of revolution having an angle of incidence to the light path at a zone just outside the perimeter of the secondary reflector surface and any related baffle, whereby a zone in front of said optical system that would otherwise be obscured by said secondary reflector surface and its baffle is imaged by means of being in optical communication with said primary reflector surface by refraction through said zone in said substrate, thereby extending the angle of view toward the front of the invention.

4. Apparatus according to claim 1 in which the outer refracting surface of said substrate comprises a surface of revolution, said surface of revolution having a substantial angle of incidence to the light path at a zone just outside the perimeter of the secondary reflector surface and any related baffle, whereby an axial point disposed a finite distance in front of said optical system is imaged by means of being in optical communication with said primary reflector surface by refraction through said zone in said substrate, thereby extending the angle of view all the way around the front of the invention.

5. Apparatus according to claim 1 in which the outer refracting surface of said substrate comprises a surface of revolution, said surface of revolution extending to a longitudinal position behind that of the utilized perimeter of said primary reflector surface, said surface of revolution having an angle of incidence to the light path at a zone outside and behind the utilized perimeter of said primary reflector surface, whereby a zone behind said optical system that would otherwise be beyond the limit of coverage for said primary reflector surface is imaged by means of being in optical communication with said primary reflector surface by refraction through said zone in said substrate, thereby extending the angle of view toward the rear of the invention.

6. Apparatus according to claim 1 in which the outer refracting surface of said substrate comprises a surface of revolution, said surface of revolution extending to a longitudinal position behind that of the utilized perimeter of said primary reflector surface, said surface of revolution having an angle of incidence to the light path at a zone outside and behind the utilized perimeter of said primary reflector surface, whereby an axial point a finite distance behind said optical system is imaged by means of being in optical communication with said primary reflector surface by refraction through said zone in said substrate, thereby extending the angle of view all the way around the rear of the invention.

7. Apparatus according to claim 4 in which the outer refracting surface of said substrate comprises a surface of revolution, said surface of revolution extending to a longitudinal position behind that of the utilized perimeter of said primary reflector surface, said surface of revolution having a substantial angle of incidence to the light path at a zone outside and behind the utilized perimeter of said primary reflector surface, whereby an axial point a finite distance behind said optical system is imaged by means of being in optical communication with said primary reflector surface by refraction through said zone in said substrate, resulting in coverage of the entire sphere around said optical system.

8. Apparatus according to claim 1 in which said outer refracting surface is comprised of a plurality of scallops which are concave as seen from the front but convex as seen from the side, refraction through said scallops causing the area occupied by each scallop to have more than twice the included angle of coverage as the angular circumference of the optical surface it occupies, said optical system providing a sectored virtual image, said image having the same number of sectors as said refracting surface has scallops, each of said scallops covering a circumferential angle of view of more than twice the circumferential angle occupied by each sector, whereby said virtual image covers each point in said great circle and said area in front and behind the plane of said great circle at least twice, thereby providing fully redundant coverage thereof; said redundantly imaged points having circumferentially separated vantage points, said redundantly imaged points being circumferentially separated in said virtual image, said redundant coverage providing three dimensional information for the area of coverage; said optical system also being applicable to the projection of sectored images whereby said redundant images overlap and include three dimensional information; the concepts, principles, and geometry of said optical system also being applicable to image processing techniques, algorithms, and software which are associated with viewing, analyzing, and otherwise utilizing images or data produced or reproduced by said optical system, or to the processing or analysis of other images having similar characteristics.

9. Apparatus according to claim 1 in which the figure of said outer refracting surface is optimized to minimize flare and ghost images.

10. Apparatus according to claim 1 in which the outer refracting surface and other refracting surfaces surfaces of said substrate have anti reflection coatings.

11. Apparatus according to claim 1 in which said internal convex primary reflector surface and said secondary reflector surface have reflective coatings which facilitate efficient reflection at a wide range of incident angles, including angles not subject to total internal reflection; said coating having sufficient density to prevent visible interference fringes at what would otherwise be the transition zone or angle for total internal reflection within the substrate.

12. Apparatus according to claim 1 in which the perimeter of said optical system provides means for accurately indicating the limits of the image it produces.

13. Apparatus according to claim 1 in which said primary reflector surface comprises a surface of revolution, said surface of revolution having a prolate aspheric figure.

14. Apparatus according to claim 1 in which said primary reflector surface comprises a surface of revolution, said surface of revolution having a prolate aspheric figure, whereby the image produced by the overall optical system has a constant radial image scale.

15. Apparatus according to claim 1 in which said primary reflector surface comprises a surface of revolution, said surface of revolution being radially compressed inward toward the optical axis, whereby the surface said primary reflector surface is farther from being perpendicular with the optical axis at a zone which immediately surrounds said transparent central zone, whereby said vantage point behind said transparent central zone of said primary reflector surface is in optical communication with a smaller angular area in front of said great circle, thereby increasing the size of a central angular exclusion zone in front of said primary reflector surface while minimizing the physical size of said obscured area imaged at said focal surface, thereby increasing radial proportions of the imaged area surrounding the plane of said great circle, thereby resulting in a larger radial image scale for said covered area on a given image format.

16. Apparatus according to claim 2 in which said primary reflector surface comprises a surface of revolution, said surface of revolution having a prolate aspheric figure, said prolate aspheric figure also being radially enlarged outward from the optical axis, whereby the surface said primary reflector surface is closer to perpendicular with the optical axis at a zone which immediately surrounds said transparent central zone, whereby said vantage point behind said transparent central zone of said primary reflector surface is in optical communication with a greater angular area in front of said great circle, thereby reducing the size of the central angular exclusion zone in front of said primary reflector surface, said radially enlarged primary reflector surface also permitting said transparent central zone to be enlarged without affecting the field of view, whereby said enlarged transparent zone permits the use of large aperture refracting optics, including those associated with a camera or a projector.

17. Apparatus according to claim 2 in which said primary reflector surface comprises a surface of revolution, said surface of revolution having a prolate aspheric figure, said prolate aspheric figure also being torroidal as a result of being radially enlarged outward from the optical axis, whereby said primary reflector surface curves backward in the zone immediately surrounding said transparent central zone, whereby the radial zone of said primary reflector surface by which the inner zone of said secondary reflector surface is in optical communication with an axial point disposed at a finite distance in front of said optical system by means of reflection from said zone of said primary reflector surface has a larger diameter than said secondary reflector surface and its baffle, whereby said vantage point behind said transparent central zone of said primary reflector surface is in optical communication with the entire area in front of said great circle up to the axial point disposed at a finite distance in front of the optical substrate, thereby eliminating the central angular exclusion zone in front of said primary reflector surface when said optical system is used in air or immersed in a liquid media, the only excluded area being confined to a narrow conical area extending from the perimeter of said secondary reflector surface and any associated mounting and shielding to said axial point disposed a finite distance in front of the optical substrate, said torroidal primary reflector surface also permitting said transparent central zone in said primary reflector surface to be enlarged without affecting the field of view, said enlarged transparent zone permitting the use of large aperture refracting optics, including those associated with a camera or projector.

18. Apparatus according to claim 1 in which said primary reflector surface is scalloped, resulting in a plurality of identical convex lobes disposed evenly around its circumference, each lobe having more than twice the included angle of coverage as the angular circumference of the reflector surface it occupies, including the effects of the outer refractive surface; said primary reflector surface providing a sectored virtual image, said image having the same number of sectors as said primary reflector surface has lobes, each of said sectors covering a circumferential angle of view of more than twice the circumferential angle occupied by each sector, whereby said virtual image covers each point in said great circle and said area in front and behind the plane of said great circle at least twice, thereby providing fully redundant coverage thereof; said redundantly imaged points having circumferentially separated vantage points, said redundantly imaged points being circumferentially separated in said virtual image, said redundant coverage providing three dimensional information for the area of coverage; said optical system also being applicable to the projection of sectored images whereby said redundant images overlap and include three dimensional information; the concepts, principles, and geometry of said optical system also being applicable to image processing techniques, algorithms, and software which are associated with viewing, analyzing, and otherwise utilizing images or data produced and reproduced by said optical system, or to the processing or analysis of other images having similar characteristics.

19. Apparatus according to claim 18 in which said scalloped primary reflector surface is comprised of a plurality of scallops which are concave as seen from the front but convex as seen from the side rather than having convex lobes.

20. Apparatus according to claim 1 in which the secondary reflector surface is convex, further comprising an annular reflector surface which is coaxial with said secondary reflector surface, said annular reflector surface having sufficient curvature to cover up to or beyond the same area in front and behind said great circle as said primary reflector surface, including the effects of said outer refracting surface on both reflector surfaces, said annular reflector surface having a longitudinal position which places its virtual image in close longitudinal proximity to that of said virtual image from said primary reflector surface as reflected in said secondary reflector surface, said virtual image from said annular reflector surface being visible from a vantage point behind the optically transparent central zone of said primary reflector surface due to said vantage point being in optical communication with said great circle and said area in front and behind the plane of said great circle by means of reflection from said annular reflector surface, said annular reflector surface providing redundant coverage, said redundant coverage providing three dimensional information for up to the entire area of coverage.

21. Apparatus according to claim 18 in which said secondary reflector surface is convex, further comprising an annular reflector surface which is coaxial with said secondary reflector surface, said annular reflector surface having sufficient curvature to cover up to the same area in front and behind said great circle as said primary reflector surface, including the effects of said outer refracting surface on both reflector surfaces, said annular reflector surface having a longitudinal position which places its virtual image in close longitudinal proximity to that of said virtual image from said primary reflector surface as reflected in said secondary reflector surface, said virtual image from said annular reflector surface being visible from a vantage point behind said optically transparent central zone of said primary reflector surface due to said vantage point being in optical communication with said great circle and said area in front and behind the plane of said great circle by means of reflection from said annular reflector surface, said annular reflector surface providing redundant coverage, said redundant coverage providing three dimensional information in all three axes throughout the area of coverage.

22. Apparatus according to claim 18 further comprising an annular reflector surface which is coaxial with said secondary reflector surface, said annular reflector surface being scalloped, whereby said optical system provides sectored images having redundant coverage of the subject, said redundant coverage providing three dimensional information in all axes of the area of coverage.

23. Apparatus according to claim 1 in which said secondary reflector surface is surrounded by a baffle, said baffle preventing stray light from entering said optical system around the perimeter of said secondary reflector surface, said baffle also providing accurate indication of the inside limit of the annular image produced by said optical system, said baffle being provided by means which include an attached part, an opaque coating applied to said substrate, a blackened annular depression in said substrate surrounding said secondary reflector surface, a blackened annular depression in said substrate surrounding said central transparent area in said primary reflector surface, or concentric rings of different color or density.

24. Apparatus according to claim 1 in which said secondary reflector surface is a convex surface of revolution.

25. Apparatus according to claim 1 in which said secondary reflector surface is a convex surface of revolution having a figure which is radially compressed inward toward the optical axis in order to facilitate an unchanged field of view while not imaging said central transparent area in center of said primary reflector surface, thereby permitting the radial image scale of the covered area to be increased owing to the virtual absence of imaged central obscuration area, said secondary reflector surface also providing for the correction of off-axis aberrations.

26. Apparatus according to claim 1 in which the figure of said secondary reflector surface is an aspheric surface of revolution providing means for the substantial correction of off-axis astigmatism which results from off-axis reflections off of said primary reflector surface and refraction through said outer surface of said substrate, said apparatus further comprising refracting optics which are coaxial with said primary reflector surface and behind said transparent central zone of said primary reflector surface, said refracting optics providing means for correction of residual aberrations from said primary reflector surface and said secondary reflector surface.

27. Apparatus according to claim 1 in which said secondary reflector surface is on a separate optical component, said secondary reflector and the outer surface of said solid optical substrate being between said secondary reflector and said primary reflector surface, said outer surface of said solid optical substrate providing means for correction of off-axis aberrations.

28. Apparatus according to claim 27, in which additional refracting optical components are used between said secondary reflector and said solid optical substrate of said optical system.

29. Apparatus according to claim 1 in which said secondary reflector is a separate optical component, said secondary reflector having a transparent substrate, having its reflective surface on the side opposite said primary reflector surface, the side of said substrate toward said primary reflector surface also having a surface of revolution and acting as a refracting surface, said refracting surface of said secondary combined with the refracting surface of said substrate of said optical system which is between said secondary reflector and said primary reflector surface providing means for the substantial correction of off-axis astigmatism and lateral chromatic aberration, said optical system further comprising refracting optics which are coaxial with said primary reflector surface and in longitudinal proximity to said transparent central zone of said primary reflector surface, said refracting optics correcting for residual aberrations from other optical surfaces.

30. Apparatus according to claim 29, in which additional refracting optical components are used between said secondary reflector and said substrate of said optical system.

31. Apparatus according to claim 2 in which said secondary reflector surface has an optically transparent central zone, said central zone having a concave figure as seen from the front, said central zone refracting light, whereby at least the angle of view and subject matter obscured by said secondary reflector surface and its baffle is covered by said transparent central zone, said coverage being inside the annular image formed by the rest of said optical system.

32. Apparatus according to claim 7 in which said secondary reflector surface has an optically transparent central zone, said central zone having a concave figure as seen from the front, said concave central zone refracting light, whereby a substantial angle of view is covered by said transparent central zone, said coverage being inside the annular image formed by the rest of said optical system, said coverage also being redundant.

33. Apparatus according to claim 1, in which said secondary reflector surface of said solid optical substrate has an optically transparent central zone, said optical system also having a refracting lens or lens system disposed axially in front of said optically transparent central zone in said secondary reflector surface, whereby the angle of view obscured by said secondary reflector surface and any related baffle are covered by said refracting lens system and refraction or transmission through said optically transparent central zone in said secondary reflector surface, said coverage being imaged inside the annular image formed by the rest of said optical system, said refracting lens system also incorporating neutral density filtration to equalize the brightness of images from said central refracting system and the rest of the optical system.

34. Apparatus according to claim 33 in which a wide angle refracting lens or lens system is disposed axially in front of said optically transparent central zone in said secondary reflector surface and attached to the front of said solid optical substrate so that its front edge is flush with the surrounding optical substrate, thereby permitting the front outer surface of the entire optical system to be uninterrupted at the boundary between both optical elements, said boundary being sealed against moisture and other contamination.

35. Apparatus according to claim 33 in which a cell is attached to the front center of said solid optical substrate, said cell having mounting means for said refracting lens system, said mounting means providing calibrated longitudinal positioning means for one or more elements of said central wide angle refracting lens system in order to adjust the radial field of view of said lens or lens system to compensate for parallax in the radial zone of transition between the subject area covered by said refracting lens system and the annular image produced by said solid optical system, said adjustment providing parallax compensation at said transition zone for varying subject distances.

36. Apparatus according to claim 1 in which said secondary reflector surface has an optically transparent central zone, said optical system also having a cell attached to the front center of said solid optical substrate, said cell having mounting means for interchangeable optical systems which can be utilized to image or project the central part of the subject at varying image scales, said interchangeable optical systems having a fixed orientation or incorporating means to be positioned independent of said solid optic in order to image various parts of the subject which are not necessarily at the center, said mounting means being fixed or providing calibrated longitudinal positioning means for one or more elements of said central interchangeable lens system in order to adjust the focus or the radial field of view of said lens system.

37. Apparatus according to claim 11 in which said central transparent zone in said primary reflector surface consists of a hole in the reflective coating, the surface of said substrate being rotationally symmetrical within said hole in said reflective coating.

38. Apparatus according to claim 1 in which refracting surfaces of said substrate are used in the control of aberrations.

39. Apparatus according to claim 1 in which said transparent area in center of said primary reflector surface is curved to act as a negative refracting surface in order to increase the apparent optical distance between said secondary mirror surface and said rear imaging lens system, thereby facilitating an unobstructed view of a larger secondary reflector surface from the vantage point of said rear imaging optics without increasing the diameter of said transparent area in center of said primary reflector surface, said secondary surface being curved or flat.

40. Apparatus according to claim 1, in which said central transparent area in said primary reflector surface comprises a refracting surface of negative optical power, whereby said refracting surface provides for said vantage point behind said optically transparent central zone of said primary reflector surface to be moved a substantial axial distance behind said transparent central zone, thereby facilitating unobstructed optical communication between said moved vantage point and the entirety of said secondary reflector surface without increasing the diameter of said transparent central zone of said primary reflector surface.

41. Apparatus according to claim 1 in which the part of the solid optical substrate that comprises the central transparent area in said primary reflector surface protrudes behind or forms a recess in front of said primary reflector surface.

42. Apparatus according to claim 41 in which said transparent extension of said solid optical substrate which protrudes back from center of said primary reflector surface includes a curved rear refracting surface capable of causing all paraxial rays behind the overall optical system to be parallel, thereby enabling said optical system to be used in front of a camera or other article having a fixed or interchangeable lens which is focused at infinity or at a hyperfocal distance closer than infinity.

43. Apparatus according to claim 1 in which said substrate provides support and alignment of said outer refracting surface, primary reflector surface, and secondary reflector surface.

44. Apparatus according to claim 7 in which the reflection from the primary reflector surface alone covers a field of view of more than 265 degrees when viewed from a point approximately equal to its own diameter above its apex.

45. Apparatus according to claim 1, further comprising a durable rim behind the perimeter of said primary reflector surface, said rim having a larger diameter than said reflector surface and, said rim providing protection for said primary reflector surface and serving as a grip surface to permit handling said optical system without soiling the optical surface, said rim being connected to the mounting means for said article having a focal surface, said mounting means or said rim also having provision for the attachment of accessories which may include a clear storage and composition tube, a solar occulting object, a level indicator, and data display devices, said level indicator and display devices being directly visible or imaged at said focal surface of said article.

46. Apparatus according to claim 1 in which said solid optical substrate is transparent plastic, said substrate also extending behind the perimeter of all reflecting and refracting optical surfaces and providing a protective rim behind said optical surfaces as well as a grip surface to facilitate handling without touching or marring said optical surfaces.

47. Apparatus according to claim 1 in which said solid optical substrate is transparent plastic, the outer refracting surface of said substrate having a total curvature of slightly less than 180 degrees, said substrate being compatible with fabrication from precision molded plastic.

48. Apparatus according to claim 7 in which said solid optical substrate is transparent plastic, the outer refracting surface of said substrate having a total curvature of more than 180 degrees, said substrate also extending behind the perimeter of all reflecting and refracting optical surfaces and providing a protective rim behind said optical surfaces as well as a grip surface to facilitate handling without touching or marring said optical surfaces, the outer refracting surface of said substrate being compatible with fabrication modes which include molding or turning.

49. Apparatus according to claim 1, further comprising refracting optics, said refracting optics being coaxial with and having a diameter smaller than said primary reflector surface, said means for mounting including a cell for said refracting optics, said means for mounting positioning said refracting optics between said transparent central zone in said primary reflector surface and the focal surface of said article, said refracting optics being in unobstructed optical communication with both, said refracting optics being in optical communication with said great circle surrounding said primary reflector surface by means of refraction through the outer surface of said substrate and reflection from said primary reflector surface and said secondary reflector surface and refraction through the transparent central area in said primary reflector surface, said refracting lenses having a longitudinal position corresponding to said vantage point.

50. Apparatus according to claim 49, further comprising a series of refracting lenses in interchangeable cells which are each capable of producing a real image of the virtual image that is formed by the rest of the overall optical system at a focal surface, said interchangeable cells being of appropriate lengths to produce proper focus and image size at said focal surface when used with the compatible articles which may have a focal surface, said interchangeable cells also incorporating adaptation and mounting means for appropriate standardized adapters and camera and instrumentation mounting interfaces.

51. Apparatus according to claim 49 in which said refracting lenses are capable of producing a real annular image of the virtual image resulting from reflections off said primary reflector surface and said secondary reflector surface, said real image being at or relayed to the focal surface of said article; mounting means for said refracting lenses also providing a fixed aperture or aperture adjustment means, fixed focus or focus adjustment means, and a filter holder; said apparatus being associated with or incorporated into a camera, projector, medical instrument, virtual reality headset, game, simulator, booth, suite, home entertainment system, conference room, theater, or other device.

52. Apparatus according to claim 49 in which said refracting lenses are of the zoom type, whereby images of different sizes are produced by adjusting the focal length of said zoom lens, whereby the same optical system can be used advantageously with different formats.

53. Apparatus according to claim 49 in which the refracting lenses serve as a close up lens or relay lens, said relay lens providing an exit pupil for the overall optical system, said refracting optics causing paraxial light rays behind said optical system to be parallel, said optical system being compatible with cameras, projectors, or similar articles having fixed or interchangeable lenses which are focused at or closer than infinity, thereby enabling said optical system to be used afocally in front of said lenses or a person's eye.

54. Apparatus according to claim 1, further comprising a refracting lens system immediately behind said transparent central zone of said primary reflector surface, said lens system having increasing positive optical power toward its perimeter, said refracting lens system correcting for field curvature.

55. Apparatus according to claim 49 in which said refracting optics substantially correct curvature of the virtual image resulting from reflections off said primary reflector surface and said secondary reflector surface, thereby facilitating the optimum use of a flat focal surface, said refracting optics typically comprising at least one lens, at least one of which has negative optical power, said negative lens being in longitudinal proximity to said focal surface.

56. Apparatus according to claim 55 in which an existing achromatic Barlow lens design is used as the field flattener.

57. Apparatus according to claim 49 in which said refracting lenses and other optical surfaces substantially correct aberrations such as off-axis astigmatism which result from off-axis reflections off of said primary reflector surface and said secondary reflector surface.

58. Apparatus according to claim 49 in which said refracting lenses substantially correct primary and residual aberrations from said solid transparent optical substrate, said primary reflector surface and said secondary reflector surface, said corrected aberrations including lateral chromatic aberration; said optics being compatible with applications which include the formation of a real image of said virtual image at said focal surface and or the formation of a projected image which surrounds the optical system.

59. Apparatus according to claim 49, in which one or more elements in said imaging and correcting optics have discontinuous aspheric curves which may include an annular deviation in its figure that is utilized in correcting aberrations from said substrate, said aberrations including bidirectional lateral chromatic aberration and astigmatism, said reflector surfaces having a figures which may be used in the control of astigmatism and correction for spatial distortion in the annular image caused by said annular figure of said imaging and correcting optical element.

60. Apparatus according to claim 49 in which said transparent area in center of said primary reflector surface is concentric with the optical center of said refracting optics.

61. Apparatus according to claim 49 in which said means for mounting include a central cell, said central cell protruding behind said primary reflector surface, said central cell having a slot around its circumference which may be used to attach accessories and facilitate storage of the overall optical system in a case without any optical surfaces being in contact with said case, said cell being capable of supporting the weight of the entire optical system, the attributes of said cell and said slot also providing means to attach devices including a solar occulting object, a level or tilt indicator, and data display devices; said level or tilt indicator and display devices being directly visible and imaged at said focal surface of said article having a focal surface, said cell also having provision to house said refracting optics or interchangeable cells which house said optics, said cell further comprising a filter holder.

62. Apparatus according to claim 49 in which said refracting optics and a focal surface are recessed inside the hollow area behind said primary reflector surface, whereby the position thereof facilitates better performance with a given numerical f/ratio and sophistication of imaging or correcting optics.

63. Apparatus according to claim 49 in which said article having a focal surface and its lens are located behind said transparent area in center of said primary reflector surface, enabling said article and its lens to directly view the virtual image from said secondary reflector surface and form a real image thereof at said focal surface, the longitudinal position of said article and lens being variable in order to permit said camera and lens to either be recessed inside the hollow area behind said primary reflector surface or be positioned behind the overall optical assembly.

64. Apparatus according to claim 1, further comprising an occulting attachment consisting of a small darkened occulting body which is affixed to the end of a thin wire of sufficient rigidity to prevent oscillation of said occulting body by wind or moderate motion, said wire being attached in front or behind said solid optical substrate and providing means for the adjustment of said occulting body position; or an occulting body or a plurality thereof which are temporarily or permanently affixed directly to the outer refracting surface of the optical system by means of an adhesive bond;

said occulting body interrupting specular optical communication between a bright light source which may include the sun and the focal surface of said article, said occulting body having an angular subtense that is larger than said bright light source as seen from the corresponding area of said virtual image from said primary reflector surface, thereby causing the image of said occulting body to completely cover said bright light source in the image formed by said optical system, said occultation resulting in a substantial reduction in unwanted reflections and flare.

65. Apparatus according to claim 1, further comprising a level or tilt indicator which is attached in close proximity to and slightly behind the perimeter of said primary reflector surface, said level or tilt indicator having easily distinguished indication means when observed from above and below, said secondary reflector surface being larger than what is required to image said primary reflector surface alone, said secondary reflector providing means for optical communication between said level and the focal surface of said article, said level being imaged at said focal surface by means of reflection via said secondary reflector, whereby said level is visible in the image and the viewfinder of a camera, thereby facilitating effective hand held use of the optical system.

66. Apparatus according to claim 1, further comprising an integral level indicator or window for viewing a level or tilt indicator, whereby said level or tilt indicator which is visible in an image at the focal surface of said article and from an external position, said visibility in the image being accomplished by said indicator being positioned outside the perimeter of said primary reflector surface but within the perimeter of the outer refracting surface of said substrate, said level or tilt indicator also being behind the longitudinal position of the utilized perimeter of said primary reflector surface, said level indicator being visible in said image by total internal reflection from the solid optical substrate, or, where the vantage point is in optical communication with the camera directly by reflection from secondary reflector surface; said level or tilt indicator also being visible directly by looking through the outer refracting surface of said substrate; or, said level or tilt indicator also being observable through the rear of said invention in embodiments where the rear of said level indicator and its enclosing structure are transparent.

67. Apparatus according to claim 1 in which said secondary reflector surface has an optically transparent central zone, said optical system further comprising a level or tilt indicator or other instrumentation which is visible through said transparent central zone, whereby said level or tilt indicator or other instrumentation is visible in the image produced by the optical system.

68. Apparatus according to claim 1, further comprising one or more periscopic optical systems, at least one of which points directly behind said optical system, said periscopic optical system being attached to said optical system at a point between the back of said primary reflector surface and the front of said article having a focal surface, said attachment means including a hollow tube, mirrors or prisms, and relay optics, said periscopic optical system having a circular field of view greater than the conical exclusion zone behind said primary reflector surface, the image from said periscopic optical system being imaged at a common focal surface with the annular image from said optical system, but in an area not occupied by said annular image, whereby the overall optical system images the entire sphere around itself on a single focal surface, said periscopic optical system also being applicable to imaging an indicator, data display device or similar article; further, where a beam splitter is mounted on a transparent support which is in proximity to said focal surface, said circular image may be imaged in the center of said annular image.

69. Apparatus according to claim 1, associated with a camera, photographic optical system, electronic image system, motion picture system, surgical instrument, endoscope, bore scope, surveillance instrument, robotic device, sensor, microphone, speaker, or similar article, said article incorporating means for providing illumination of the subject, subject illumination means being located behind said primary reflector surface and in front of said secondary reflector surface, said lighting means being shielded so as not to directly strike the optics in order to reduce flare; and said means providing a shielding to preventing stray light from entering, said mounting means facilitating unobstructed optical communication between said article and the utilized radial zones of said convex reflector, said optical system being associated with a refracting lens system, said refracting lens system being disposed coaxial to said optical system, both being associated with the formation of a real image of said virtual image at said focal surface, whereby said optical system combined with said article facilitates the geometric conversion of said great circle and said area in front and behind the plane of said great circle into a real annular image at the focal surface of said article and the geometric conversion of a two dimensional annular into an image which is projected onto a three dimensional surface or into three dimensional media.

70. Apparatus according to claim 69, associated with an electronic imaging sensor, provision of subject illumination means also employing a range gated imaging by means of a sensor exposure of up to only a few to a few dozen nanoseconds, whereby a shorter effective exposure is provided for objects nearest the optical system; said illumination being compatible with a system in which illumination is actually directed through said optical system by means of a beam splitter or partially transmissive reflector prior to the initiation on an exposure.

71. Apparatus according to claim 1, further comprising an electronic imaging sensor capable of exposure and readout without mechanical shuttering, said optical system being capable of imaging the entire area around itself; said imaging being accomplished without any moving parts.

72. Apparatus according to claim 71, said combination also having provision and interface capability to facilitate real time digital processing of more than 23 images per second, whereby said optical system may also be associated with a separate full motion immersive imaging system.

73. Apparatus according to claim 4 further comprising a round baffle which may be attached to said substrate, said round baffle having longitudinal positioning means, whereby longitudinal adjustment of said round baffle causes its shadow to change the distance to the axial point imaged by the optical system which is disposed a finite distance in front of said solid optical substrate, thereby providing means for said axial point to coincide with a front projection surface, thereby resulting in a seamless projection across the central part of a projection surface, said apparatus being associated with the projection of images having coverage up to that which completely surround the viewing participant or participants.

74. Apparatus according to claim 1, whereby said optical system is associated with a projector and a spherical, semi spherical, quasi-spherical, conical, cylindrical, or hybrid projection surface to facilitate the geometric conversion of an annular image into a projection around said optical system, said convex primary reflector surface having a strong aspheric figure which, in conjunction with said outer refracting surface, facilitates correct image proportions and constant projection brightness throughout the surface of a spherical or semi-spherical projection area, said primary reflector surface compensating for varying distances to said projection area and the position and angle of said primary reflector surface relative to said projection surface, said apparatus being applicable to applications including virtual reality headsets, games, simulators, booths, suites, home entertainment systems, conference rooms, and theaters.

75. Apparatus according to claim 1, embodied in any size laparascopic surgical or observation instrument, endoscope, sigmoidoscope, bore scope, camera, projector, home entertainment system, conference infrastructure, surveillance instrument, flight control system, robotic device, sensor, microphone, speaker, or similar article, and, where appropriate, said article incorporating means for providing illumination of the surrounding area or recording or transmitting sound originating therefrom or distributing recorded or generated sound therein.

76. Apparatus according to claim 1 in which the apparatus or said article having a focal surface include electronic imaging means and provide means for adaptation and interface to computer systems which facilitate substantial real time digital processing of images which include those produced or projected therewith.

77. Apparatus according to claim 1 in which two optical systems are incorporated into a single instrument, said optical systems being pointed in opposite directions in order to provide redundant coverage of the subject with opposing image projections, resulting in reduced distortion of many parts of the subject without resorting to external image processing, further providing three dimensional information by means of redundant imaging from different vantage points.

78. Apparatus according to claim 77 in which two optical systems are incorporated into a single instrument, one or more of said optical systems being independently positionable in order to provide redundant coverage of selected parts of the subject with configurable image projections, resulting in reduced subject distortion without resorting to external image processing, further providing three dimensional information by means of redundant imaging from different vantage points.

79. Apparatus according to claim 1 in which said mounting means provide for translating the overall optical system in front of a camera or similar article in order to allow a larger overall image to be photographed in two or more separate pictures on a rectangular format, facilitating a larger image scale in the resulting images.

80. Apparatus according to claim 1 in which said outer refracting surface is covered with a thin layer of removable transparent material, said material being in contact with said outer refracting surface of said solid optic and capable of protecting it from abrasion, erosion, or chemical influence.

81. Apparatus according to claim 1 in which said outer optical surface encloses only the secondary reflector surface and does not occupy the entire area between said secondary reflector surface and said primary reflector surface, said optical surface between said reflector surfaces comprising the outer surface of a second surface secondary reflector; whereby said vantage point is in optical communication with said great circle and said area in front and behind said great circle by means of reflection from said primary reflector surface, refraction through said substrate, reflection from said secondary reflector surface, transmission toward the rear central area of said substrate, refraction through the rear surface of said substrate, and refraction by said imaging and correcting lens system.

82. An optical system comprising:
   a solid optical substrate having a convex outer refracting surface, said surface covering most of the front and side of said substrate,
      said substrate having an internal convex reflector surface of radial symmetry,
         said reflector surface being in optical communication with a great circle surrounding it, the plane of said great circle being perpendicular to the optical axis of said reflector surface, said optical communication being through the outer refractive surface of said substrate,
         said reflector surface having sufficient curvature to be in optical communication with a substantial area in front of and behind the plane of said great circle,
      whereby said optical system produces a virtual image of said great circle and said area above and below its plane, said virtual image being annular,
         said virtual image being visible from an axial vantage point outside said substrate and in front of said reflector surface, said vantage point being in optical communication with said great circle and said area in front and behind the plane of said great circle by means of reflection from said reflector surface and refraction through the surface of said substrate;
   means for mounting said substrate,
      said means for mounting having provision for handling said optical system without touching its optical surfaces;
      said means for mounting providing stable support and alignment of said substrate without causing deformation thereof,
      said means for mounting providing for attachment of said optical system to an article having a focal surface,
      said article being in front of said reflector surface,
      said mounting means facilitating use of said optical system in any orientation,
      said optical system being associated with a refracting lens system, said refracting lens system being disposed coaxial to said optical system, both being associated with the formation of a real image of said virtual image at said focal surface,
   whereby said optical system when combined with said article having a focal surface facilitate the geometric conversion of said great circle and said area in front and behind the plane of said great circle into a real annular image at the focal surface of said article and the geometric conversion of a two dimensional annular into an image which is projected onto a three dimensional surface or into three dimensional media.

83. Apparatus according to claim 82 wherein the outer refracting surface of said substrate comprises a surface of revolution, said surface of revolution being nearly perpendicular to the light path at a zone just outside the perimeter of said article and any related baffle, whereby lateral chromatic aberration at said zone is negligible, whereby lateral chromatic aberration in the virtual image from the overall system will increase as a function of off-axis distance.

84. Apparatus according to claim 82 in which the outer refracting surface of said substrate comprises a surface of revolution, said surface of revolution having an angle of incidence to the light path at a zone just outside the perimeter of said article and any related baffle, whereby a zone in front of said optical system that would otherwise be obscured by said article and any related baffle is imaged by means of being in optical communication with said reflector surface by refraction through said zone in said substrate, thereby extending the angle of view toward the end of the invention to which said article is attached.

85. Apparatus according to claim 82 in which the outer refracting surface of said substrate comprises a surface of revolution, said surface of revolution having a substantial angle of incidence to the light path at a zone just outside the perimeter of said article and any related baffle, whereby an axial point disposed a finite distance in front of said optical system is imaged by means of being in optical communication with said reflector surface by refraction through said zone in said substrate, thereby extending the angle of view all the way around the end of the invention to which said article is attached.

86. Apparatus according to claim 82 in which the outer refracting surface of said substrate comprises a surface of revolution, said surface of revolution having an angle of incidence to the light path at a zone outside and behind the perimeter of said reflector surface, whereby a zone behind said optical system that would otherwise be beyond the limit of coverage for said reflector surface is imaged by means of being in optical communication with said reflector surface by refraction through said zone in said substrate, thereby extending the angle of view toward the end of the invention that is opposite said article.

87. apparatus according to claim 82 in which the outer refracting surface of said substrate comprises a surface of revolution, said surface of revolution having an angle of incidence to the light path at a zone just outside and behind the perimeter of said reflector surface, whereby an axial point a finite distance behind said optical system is imaged by means of being in optical communication with said reflector surface by refraction through said zone in said substrate, thereby extending the angle of view all the way around the end of the invention that is opposite said article.

88. Apparatus according to claim 85 in which the outer refracting surface of said substrate has an angle of incidence to the light path at a zone just outside and behind the perimeter of said reflector surface, whereby an axial point a finite distance beyond the end of said optical system opposite said article is imaged by means of being in optical communication with said reflector surface by refraction through said zone in said substrate, thereby extending the angle of view all the way around the end of the invention opposite said article, resulting in coverage of the entire sphere around said optical system.

89. Apparatus according to claim 82 in which said outer refracting surface is comprised of a plurality of scallops which are concave as seen from the front but convex as seen from the side, refraction through said scallops causing the area occupied by each scallop to have more than twice the included angle of coverage as the angular circumference of the optical surface it occupies, said optical system providing a sectored virtual image, said image having the same number of sectors as said refracting surface has scallops, each of said scallops covering a circumferential angle of view of more than twice the circumferential angle occupied by each sector, whereby said virtual image covers each point in said great circle and said area in front and behind the plane of said great circle at least twice, thereby providing fully redundant coverage thereof; said redundantly imaged points having circumferentially separated vantage points, said redundantly imaged points being circumferentially separated in said virtual image, said redundant coverage providing three dimensional information for the area of coverage; said optical system also being applicable to the projection of sectored images, whereby said redundant images overlap and include three dimensional information; the concepts, principles, and geometry of said optical system also being applicable to image processing techniques, algorithms, and software which are associated with viewing, analyzing, and otherwise utilizing images produced and reproduced by said optical system, or to the processing or analysis of other images having similar characteristics.

90. Apparatus according to claim 82 in which the figure of said outer refracting surface is optimized to minimize flare and ghost images.

91. Apparatus according to claim 82 in which the outer refracting surface of said substrate has anti reflection coatings.

92. Apparatus according to claim 82 in which said internal reflector surface has reflective coatings which facilitate efficient reflection at a wide range of incident angles, including angles not subject to total internal reflection.

93. Apparatus according to claim 82 in which the perimeter of said optical system provides means for accurately indicating the limits of the image it produces.

94. Apparatus according to claim 82 in which said reflector surface comprises a surface of revolution, said surface of revolution having a prolate aspheric figure, whereby the image produced by the overall optical system has a constant radial image scale.

95. Apparatus according to claim 82 in which said internal reflector surface comprises a surface of revolution, said surface of revolution being radially compressed inward toward the optical axis, whereby the apex of said reflector surface comprises a point, whereby said vantage point in front of said reflector surface is in optical communication with the same angular area or a smaller angular area in front of said great circle, thereby maintaining or increasing the size of a central angular exclusion zone in front of said reflector surface while eliminating or reducing the image area occupied by said exclusion zone, thereby increasing the radial proportions of the imaged area surrounding the plane of said great circle, thereby resulting in a larger radial image scale for said covered area on a given image format.

96. Apparatus according to claim 82 in which said internal convex reflector surface comprises a surface of revolution, said surface of revolution having a prolate aspheric figure, said prolate aspheric figure also being radially enlarged outward from the optical axis, whereby the surface of said convex reflector surface is closer to perpendicular with the optical axis at a zone which immediately surrounds the reflection of said article having a focal surface, whereby said focal surface is in optical communication with a greater angular area in front of said great circle, thereby reducing the angular size of the central exclusion zone in front of said convex reflector surface caused by said article after accounting for refraction by the outer surface of said optical system.

97. Apparatus according to claim 82 in which said internal convex reflector surface comprises a surface of revolution, said surface of revolution having a prolate aspheric figure, said prolate aspheric figure also being torroidal as a result of being radially enlarged outward from the optical axis, whereby said torroidal reflector surface curves backward in the zone immediately surrounding an area the size of a central obstruction, whereby the radial zone of said torroidal reflector surface by which the focal surface of said article is in optical communication with an axial point disposed at a finite distance in front of said optical system by means of reflection from said zone of said torroidal reflector surface has a larger diameter than the obstruction of said article, thereby eliminating the central angular exclusion zone in front of said reflector surface, the only excluded area being confined to a narrow conical area extending from the perimeter of said article with any associated mounting and shielding to said axial point disposed a finite distance in front of said torroidal reflector surface after accounting for refraction by the outer surface of said optical system.

98. Apparatus according to claim 82 in which said internal convex reflector surface has a scalloped surface, resulting in a plurality of convex lobes disposed evenly around its circumference, each lobe having more than twice the included angle of coverage as the angular circumference of the reflector surface it occupies, said scalloped reflector surface providing a sectored virtual image, said image having the same number of sectors as said scalloped reflector surface has lobes, each of said sectors covering a circumferential angle of view of more than twice the circumferential angle occupied by each sector, including the effects of the outer refractive surface; whereby said virtual image covers each point in said great circle and said area in front and behind the plane of said great circle at least twice, thereby providing fully redundant coverage thereof; said redundantly imaged points having circumferentially separated vantage points and being circumferentially separated in said virtual image, said redundant coverage providing three dimensional information for the area of coverage, said optical system also being applicable to the projection of sectored images whereby said redundant images overlap and include three dimensional information; the concepts, principles, and geometry of said optical system are also being applicable to image processing techniques, algorithms, and software which are associated with viewing, analyzing, and otherwise utilizing images produced and reproduced by said optical system, or to the processing or analysis of other images having similar characteristics.

99. Apparatus according to claim 82, in which only the side of said outer refracting surface is utilized between said reflector surface and the imaged area surrounding said optical system, the front of said substrate having a large surface through which the entirety of said reflector surface can be seen from a distant axial viewpoint, said optical system facilitating use at a distance from a camera or observer, whereby the image may be observed or recorded with an optical system having magnification that need not be physically connected to said apparatus.

100. Apparatus according to claim 99, in which said optical system is supported in front of said article having a focal surface by means of an axial tube or strut.

101. Apparatus according to claim 82 in which the entirety of said outer refracting surface is a continuous surface of revolution which is close to said reflector surface, the combination comprising a second surface reflector in which said outer refractive surface is utilized in the correction of aberrations and distortion, said article having a focal surface typically being disposed in front of or at a distance from the front of said outer refracting surface.

102. Apparatus according to claim 82 in which said reflector surface is a hemisphere and said outer reflective surface comprises a hyperhemispherical spherical or aspheric surface which is coaxial or concentric with said reflector surface, said optical system being applicable to observation or projection of an image from a remote or nearby vantage point.

103. Apparatus according to claim 82, further comprising refracting lenses, said refracting lenses being coaxial with said reflector surface, said lenses providing imaging means or correcting for curvature of the virtual image and aberrations resulting from oblique reflections off said convex reflector surface, said means for mounting positioning said refracting lenses between said reflector surface and the focal surface of said article, said means for mounting having means for attachment to said substrate, said means for mounting including a cell for said refracting lenses and facilitating unobstructed optical communication between said lenses, said article which may have a focal surface, and said reflector surface, said refracting lenses being in optical communication with said great circle surrounding said reflector surface by means of reflection from said reflector surface and refraction through said outer refracting surface, said refracting lenses having a longitudinal position corresponding to said axial vantage point which is in optical communication with said great circle and said area in front and behind the plane of said great circle.

104. Apparatus according to claim 103, further comprising a filter holder.

105. Apparatus according to claim 103, further comprising a series of refracting lenses in interchangeable cells which are each capable of producing a real image from the overall optical system at a focal surface, said cells being of appropriate lengths to produce proper focus and image size at said focal surface when used with the intended article having a focal surface, said cells also incorporating adaptation and mounting means, including those for standardized adapters and camera and instrumentation mounting interfaces.

106. Apparatus according to claim 103 in which said refracting lenses are capable of producing a real annular image of the virtual image which is provided by means of reflection from said reflector surface and refraction through said outer refracting surface, said real image being at the focal surface of said article, mounting means for said refracting lenses having a fixed aperture or providing means for aperture adjustment.

107. Apparatus according to claim 103 in which said reflector surface said associated refracting optics are capable of causing all paraxial rays from the overall optical system to be parallel, thereby enabling said optical system to be used in front of a fixed or interchangeable lens of a film camera, video camera, or similar article, where said lens is focused at infinity or at a hyperfocal distance closer than infinity.

108. Apparatus according to claim 82, whereby said optical system is associated with a projector and a cylindrical projection surface to facilitate the geometric conversion of an annular image into a cylindrical projection around said optical system, whereby said convex reflector surface has a strong aspheric figure which, in conjunction with said outer refracting surface, facilitates correct image proportions and substantially constant projection brightness throughout the projection area, said cylindrical projection being applicable to display and printing of an image.

109. Apparatus according to claim 82, whereby said optical system is associated with a projector and a spherical or semi spherical projection surface to facilitate the geometric conversion of an annular image into a projection onto a three dimensional projection surface or into three dimensional media around said optical system, whereby said convex reflector surface is at the center of said spherical projection surface, said reflector surface having an aspheric figure which, in conjunction with said outer refracting surface, facilitates correct image proportions and constant projection brightness throughout the projection area.

110. Apparatus according to claim 82, whereby said optical system is associated with a projector and a spherical, semi spherical, conical, cylindrical, or hybrid projection surface to facilitate the geometric conversion of an annular image into a three dimensional projection around said optical system, whereby said convex reflector surface is at a position other than the center of said projection surface, said reflector surface having a strong aspheric figure which, in conjunction with said outer refracting surface, facilitates correct image proportions and constant projection brightness throughout the projection area in spite of the varying distances to said projection area, said apparatus being applicable to applications including virtual reality headsets, games, simulators, booths, suites, home entertainment systems, conference rooms, and theaters.

111. Apparatus according to claim 82, whereby said optical system is used to image, display, simulate various phenomena, including those associated with a total solar eclipse, said optical system being associated with a projector for display of said subject matter by projection, whereby said convex reflector surface is at a position other than the center of a spherical or semi spherical projection surface, said reflector surface having a strong aspheric figure which, in conjunction with any refractive effects from said outer refracting surface, facilitates correct image proportions and constant projection brightness throughout the projection area in spite of the varying distances to said projection area.

112. Apparatus according to claim 110, in which a plurality of said optical systems or other wide angle optical systems are utilized to project images into multiple rooms, including multiple portal virtual reality suites and theaters; said apparatus providing for the active masking of projection onto doorways which may be opened and closed, said masking accomplished by means of projection image data or masks which are positioned in order to obstruct optical communication between an open doorway and the projection source, said masking means having provision to be synchronized with the opening and closing of doors and portals between different rooms; further, a fixed mask may be used where a doorway is always open, said fixed mask being either a separate part or a coating which is applied to the surface of said outer refracting surface.

113. Apparatus according to claim 10, whereby two of said optical systems are associated with a projector and a spherical, semi spherical quasi-spherical, conical, cylindrical, or hybrid projection surface, said optical systems being off center and on opposing ends of said projection area, said arrangement facilitating the geometric conversion of two annular images into a projection which covers the entire inside of said projection area without obstructing the center of said projection area or requiring projector light to pass through the center of said projection area, thereby permitting members of an audience to be positioned at and near the center of said projection area, said reflector surface also having provision for rear projection means onto an area surrounding the back surface of its perimeter.

114. Apparatus according to claim 113, further comprising means to suspend one or more members of an audience at and near the center of said projection area, said suspension means having provision for lowering and raising an audience member to and from the floor or a raised platform or ledge, the surface of said projection area under the audience being comprised of inexpensive modular sections which can be replaced if soiled by a participant's feet or the results of motion sickness.

115. Apparatus according to claim 82, embodied in any size laparascopic surgical or observation instrument, endoscope, sigmoidoscope, bore scope, camera, projector, home entertainment system, conference infrastructure, surveillance instrument, flight control system, robotic device, sensor, microphone, speaker, or similar article, and, where appropriate, said article or apparatus incorporating means for providing illumination of the subject or recording or transmitting sound originating therefrom or distributing recorded or generated sound therein.

116. Apparatus according to claim 115 in which said apparatus, instrument or article includes electronic imaging means and has means to interface with systems facilitating substantial real time digital processing of the images produced therewith.

117. Apparatus according to claim 115 in which two optical systems are incorporated into a single instrument or article, said optical systems being pointed in opposite directions in order to provide redundant coverage of the entire subject with opposing image projections, resulting in reduced distortion of many parts of the subject without resorting to external image processing, further providing three dimensional information by means of redundant imaging from different vantage points.

118. Apparatus according to claim 115, in which two optical systems are incorporated into a single instrument, one or more of said optical systems being independently positionable in order to provide redundant coverage of selected parts of the subject with configurable image projections, resulting in reduced subject distortion without resorting to external image processing, further providing three dimensional information within the redundantly imaged area by means of imaging from different vantage points.

119. Apparatus according to claim 82, in which said reflector surface and said outer refracting surface have substantially more curvature than that required for full sphere coverage in conventional surroundings, whereby full sphere coverage is achieved when said optical system is immersed in liquid.

120. Apparatus according to claim 95, further comprising axial expansion optics in front of said reflector surface, said expansion optics expanding the coverage of a lasers or other light sources to cover the entirety of said reflector surface, thereby providing omnidirectional expansion of said light source for applications including holographic imaging and projection.

121. Apparatus according to claim 82 in which said convex reflector surface comprises a surface of revolution, said surface of revolution having a prolate aspheric figure.

122. Apparatus according to claim 82 in which said optical substrate surrounds a wide angle refracting or reflecting optical system, said substrate acting entirely as a refracting element and extending the field of view of said wide angle refracting or reflecting optical system, the internal surface of said optical substrate having a refractive hyperhemispherical void rather than a reflecting surface, said wide angle refracting or reflecting optical system being axially positioned inside of said optical substrate, the perimeter of the front element of said wide angle refracting or reflecting optical system being in close longitudinal proximity to the rear limit of said internal hyperhemispherical surface of said optical substrate.

123. An optical system comprising:
  a convex specular reflector having radial symmetry,
    said reflector being in optical communication with a great circle surrounding it, the plane of said great circle being perpendicular to the optical axis of said reflector said reflector having sufficient curvature to be in optical communication with a substantial area in front and behind the plane of said great circle, said reflector being surrounded by an annular optical element, said annular optical element extending the field of view of said reflector to cover a greater angle in front and behind the plane of said great circle, whereby said optical system produces a virtual image of the said great circle and said area above and below its plane, said virtual image being annular, said virtual image being visible from a vantage point in front of said reflector by means of said vantage point being in optical communication with said great circle and said area in front and behind the plane of said great circle by means of reflection from said convex reflector and refraction through said annular optical element, means for mounting and said optical system, said means for mounting providing stable support and alignment of said reflector and annular optical element without causing deformation thereof, said means for mounting providing for attachment of said optical system to an article having a focal surface, said article being in front of said reflector, said means providing a shielding to preventing stray light from entering, said mounting means facilitating unobstructed optical communication between said article and the utilized radial zones of said convex reflector, said optical system being associated with a refracting lens system, said refracting lens system being disposed coaxial to said optical system, both being associated with the formation of a real image of said virtual image at said focal surface, whereby said optical system combined with said article facilitates the geometric conversion of said great circle and said area in front and behind the plane of said great circle into a real annular image at the focal surface of said article and the geometric conversion of a two dimensional annular into an image which is projected onto a three dimensional surface or into three dimensional media.

124. Apparatus according to claim 123 in which said annular optical element extends the field of view from each side of said reflector to more than 180 degrees, whereby said optical system covers the entire sphere around itself.

125. Apparatus according to claim 123 in which the effective radius of said reflector increases toward both the central and edge zones, whereby reflection from said reflector compensates for radial compression of the image caused near the limits of coverage for said annular lens.

126. Apparatus according to claim 123 in which the figure of said reflector is radially compressed, the apex of said reflector being a point, whereby a visible reflection of the area occupied by said article having a focal surface and its mounting structures are excluded from the field of view, thereby providing a larger radial image scale for the image produced by said optical system on a given format, whereby said reflector facilitates a circular image at said focal surface.

127. Apparatus according to claim 123 in which the figure of said reflector is conical.

128. Apparatus according to claim 123 in which the figure of said reflector is like that of a convex cone having a concave curvature on its sides, whereby said figure causes radial distribution of the image to be the reverse of that produced by reflection from a conventional convex reflector.

129. Apparatus according to claim 123 in which the figure of said reflector is configured to cause the virtual center of all utilized reflections from it to be at the same axial point, thereby optimizing it to minimize distortion of the entrance pupil for the overall optical system.

130. Apparatus according to claim 123 in which said reflector consists a solid catadioptric substrate having an internal reflector surface, the outside surface thereof being utilized to reduce distortion and aberrations.

131. Apparatus according to claim 123, also having imaging optics or imaging and correcting optics between said reflector and said focal surface.

132. Apparatus according to claim 131, wherein one or more elements in said imaging and correcting optics has an annular deviation in its figure which is utilized in correcting aberrations from said annular lens, said aberrations including bidirectional lateral chromatic aberration and astigmatism, said reflector having a figure which is used in the control of astigmatism and correction for spatial distortion in the annular image caused by said annular figure of said imaging and correcting optical element.

133. Apparatus according to claim 131, in which said means for mounting includes an axial cell for said imaging optics, said means for mounting also providing attachment means for devices including as a solar occulting object, a level indicator, and data display devices; said level indicator being internal or external, said means for mounting also providing attachment means for a camera, projector, or similar article.

134. Apparatus according to claim 123 in which said annular lens is longitudinally asymmetrical in order to compensate for attributes of said reflector which influence angular distribution in the image and distortion of the entrance pupil.

135. Apparatus according to claim 123 in which said reflector is the primary reflector of a Cassegrain system, said primary reflector having a hole in its center, said optical system having a secondary reflector, said article having a focal surface being behind said primary reflector.

136. Apparatus according to claim 123 in which said annular lens is scalloped in order to provide redundant coverage, said redundant coverage providing three dimensional information.

137. Apparatus according to claim 123 in which the longitudinal position of the apex of said reflector is in longitudinal proximity to the longitudinal center of said annular optical element.

* * * * *